United States Patent
Ng-Thow-Hing et al.

(10) Patent No.: US 10,215,583 B2
(45) Date of Patent: Feb. 26, 2019

(54) MULTI-LEVEL NAVIGATION MONITORING AND CONTROL

(71) Applicant: Honda Motor Co., Ltd., Toyko (JP)

(72) Inventors: Victor Ng-Thow-Hing, Sunnyvale, CA (US); Cuong Tran, Hanoi (VN); Karlin Bark, Menlo Park, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/856,596

(22) Filed: Sep. 17, 2015

(65) Prior Publication Data

US 2016/0003636 A1 Jan. 7, 2016

Related U.S. Application Data

(63) Continuation-in-part of application No. 14/321,105, filed on Jul. 1, 2014, which is a continuation-in-part (Continued)

(51) Int. Cl.
*G01C 21/36* (2006.01)
*G08G 1/16* (2006.01)
(Continued)

(52) U.S. Cl.
CPC ......... *G01C 21/3658* (2013.01); *G02B 27/01* (2013.01); *G06K 9/00315* (2013.01);
(Continued)

(58) Field of Classification Search
CPC ............... G01C 21/36; G01C 21/3608; G01C 21/3415; G01C 21/3635; G01C 21/365;
(Continued)

(56) References Cited

U.S. PATENT DOCUMENTS 5,051,735 A 9/1991 Furukawa
5,115,398 A 5/1992 De Jong
(Continued)

FOREIGN PATENT DOCUMENTS

CN 103129466 6/2013
DE 10130046 A1 1/2003
(Continued)

OTHER PUBLICATIONS

Young-Woo (http://www.cs.cmu.edu/~youngwoo/research.html, Sep. 24, 2006).*

(Continued)

*Primary Examiner* — Darryl J Collins
*Assistant Examiner* — Journey Sumlar
(74) *Attorney, Agent, or Firm* — Rankin, Hill & Clark LLP

(57) ABSTRACT

Multi-level navigation monitoring and control is provided. A system includes a lane marking manager determining a first boundary line, a second boundary line, and a centerline of a current lane of travel. The system also includes a confidence level determiner assigning a first confidence level to the first boundary line, a second confidence level to the second boundary line, and a third confidence level to the centerline. Further, the system includes a user interface outputting representations of the first boundary line, the second boundary line, and the centerline based, at least in part, on the first confidence level, the second confidence level, and the third confidence level.

15 Claims, 32 Drawing Sheets

Related U.S. Application Data of application No. 14/041,614, filed on Sep. 30, 2013, which is a continuation-in-part of application No. 13/832,918, filed on Mar. 15, 2013, now Pat. No. 9,164,281.

(51) Int. Cl.
    *G02B 27/01*     (2006.01)
    *G06K 9/00*     (2006.01)
    *H04N 7/18*     (2006.01)

(52) U.S. Cl.
    CPC ..... *G06K 9/00791* (2013.01); *G06K 9/00798* (2013.01); *G08G 1/167* (2013.01); *H04N 7/188* (2013.01); *G02B 2027/014* (2013.01); *G02B 2027/0127* (2013.01); *G02B 2027/0138* (2013.01); *G02B 2027/0187* (2013.01)

(58) Field of Classification Search
    CPC ............ G01C 21/3667; G01C 21/3664; G01C 21/3676; G01C 21/3658; G01C 21/3446; G02B 27/01; G02B 2027/0154; G02B 2027/0141; G05D 1/021; B60W 30/12; G06K 9/0078
    USPC ......................................................... 701/23
    See application file for complete search history.

(56) References Cited

U.S. PATENT DOCUMENTS

| | | |
|---|---|---|
| 5,368,309 A | 11/1994 | Monroe et al. |
| 5,440,428 A | 8/1995 | Hegg et al. |
| 5,519,536 A | 5/1996 | Hoehn |
| 6,222,583 B1 | 4/2001 | Matsumura et al. |
| 6,285,317 B1 | 9/2001 | Ong |
| 6,574,555 B2 | 6/2003 | Mochizuki et al. |
| 6,708,087 B2 | 3/2004 | Matsumoto |
| 6,735,517 B2 | 5/2004 | Engelsberg et al. |
| 6,774,772 B2 | 8/2004 | Hahn |
| 6,947,064 B1 | 9/2005 | Hahn et al. |
| 7,124,027 B1 | 10/2006 | Ernst |
| 7,190,260 B2 | 3/2007 | Rast |
| 7,216,035 B2 | 5/2007 | Hortner et al. |
| 7,379,813 B2 | 5/2008 | Kubota |
| 7,519,471 B2 | 4/2009 | Shibata et al. |
| 7,565,230 B2 | 7/2009 | Gardner et al. |
| 7,627,419 B2 | 12/2009 | Yoshida |
| 7,647,170 B2 | 1/2010 | Sawaki et al. |
| 7,783,422 B2 | 8/2010 | Tanaka |
| 7,815,313 B2 | 10/2010 | Ito et al. |
| 7,920,102 B2 | 4/2011 | Breed |
| 8,135,536 B2 | 3/2012 | Matsunaga et al. |
| 8,208,208 B2 | 6/2012 | Schwab |
| 8,305,444 B2 | 11/2012 | Hada |
| 8,352,181 B2 | 1/2013 | Hagiwara |
| 8,358,224 B2 | 1/2013 | Seder et al. |
| 8,406,990 B2 | 3/2013 | Barkowski et al. |
| 8,411,245 B2 | 4/2013 | Lee et al. |
| 8,620,575 B2 | 12/2013 | Vogt et al. |
| 8,633,810 B2 | 1/2014 | Luo et al. |
| 8,633,979 B2 | 1/2014 | Szczerba et al. |
| 8,660,735 B2 | 2/2014 | Tengler et al. |
| 8,686,872 B2 | 4/2014 | Szczerba et al. |
| 8,686,922 B2 | 4/2014 | Breed |
| 8,725,342 B2 | 5/2014 | Ferguson et al. |
| 2004/0193347 A1 | 9/2004 | Harumoto et al. |
| 2005/0004723 A1 | 1/2005 | Duggan et al. |
| 2005/0071082 A1 | 3/2005 | Ohmura et al. |
| 2005/0195383 A1 | 9/2005 | Breed et al. |
| 2006/0116816 A1* | 6/2006 | Chao ................... G01C 21/3415 701/414 |
| 2006/0262140 A1 | 11/2006 | Kujawa et al. |
| 2007/0087756 A1 | 4/2007 | Hoffberg |
| 2007/0185644 A1 | 8/2007 | Hirose |
| 2008/0046150 A1 | 2/2008 | Breed |
| 2008/0318676 A1 | 12/2008 | Ham |
| 2009/0005961 A1 | 1/2009 | Grabowski et al. |
| 2009/0210257 A1 | 8/2009 | Chalfant et al. |
| 2009/0268946 A1 | 10/2009 | Zhange et al. |
| 2010/0027768 A1 | 2/2010 | Foskett |
| 2010/0131188 A1* | 5/2010 | Yeh .................... G01C 21/3664 701/532 |
| 2010/0192110 A1 | 7/2010 | Carter et al. |
| 2010/0201894 A1 | 8/2010 | Nakayama et al. |
| 2010/0253349 A1 | 10/2010 | Seder et al. |
| 2010/0253541 A1 | 10/2010 | Seder et al. |
| 2010/0253601 A1 | 10/2010 | Seder et al. |
| 2010/0274480 A1 | 10/2010 | McCall et al. |
| 2010/0292886 A1 | 11/2010 | Szczerba et al. |
| 2010/0332266 A1 | 12/2010 | Tamir et al. |
| 2011/0018903 A1 | 1/2011 | Lapstun et al. |
| 2011/0022393 A1 | 1/2011 | Wäller et al. |
| 2011/0052042 A1 | 3/2011 | Ben Tzvi |
| 2011/0075257 A1 | 3/2011 | Hua et al. |
| 2011/0093190 A1 | 4/2011 | Yoon |
| 2011/0106428 A1 | 5/2011 | Park et al. |
| 2011/0199376 A1 | 8/2011 | Salemann |
| 2011/0251768 A1 | 10/2011 | Luo et al. |
| 2012/0019557 A1 | 1/2012 | Aronsson et al. |
| 2012/0041632 A1 | 2/2012 | Bordes |
| 2012/0072105 A1 | 3/2012 | Feyereisen et al. |
| 2012/0083964 A1 | 4/2012 | Montemerlo et al. |
| 2012/0109521 A1* | 5/2012 | Rothschild ............. G08G 1/167 701/487 |
| 2012/0154441 A1 | 6/2012 | Kim |
| 2012/0162255 A1 | 6/2012 | Ganapathy et al. |
| 2012/0173069 A1 | 7/2012 | Tsimhoni et al. |
| 2012/0212405 A1 | 8/2012 | Newhouse et al. |
| 2012/0224060 A1 | 9/2012 | Gurevich et al. |
| 2012/0249589 A1 | 10/2012 | Gassner et al. |
| 2012/0263154 A1 | 10/2012 | Blanchflower et al. |
| 2012/0268351 A1* | 10/2012 | Sasaki ................ G01C 21/365 345/8 |
| 2012/0283942 A1 | 11/2012 | T'Siobbel et al. |
| 2012/0287284 A1 | 11/2012 | Jacobsen |
| 2012/0310531 A1 | 12/2012 | Agarwal et al. |
| 2013/0050258 A1 | 2/2013 | Liu et al. |
| 2013/0083291 A1 | 4/2013 | Smithwick et al. |
| 2013/0151145 A1 | 6/2013 | Ishikawa |
| 2013/0158778 A1 | 6/2013 | Tengler et al. |
| 2013/0261871 A1 | 10/2013 | Hobbs et al. |
| 2013/0262997 A1 | 10/2013 | Markworth et al. |
| 2013/0293582 A1 | 11/2013 | Ng-Thow-Hing et al. |
| 2014/0005857 A1 | 1/2014 | Heisterkamp |
| 2014/0019913 A1 | 1/2014 | Newman et al. |
| 2014/0036374 A1 | 2/2014 | Lescure et al. |
| 2014/0063064 A1 | 3/2014 | Seo et al. |
| 2014/0114845 A1 | 4/2014 | Rogers et al. |
| 2014/0121883 A1 | 5/2014 | Shen |
| 2014/0139524 A1 | 5/2014 | Nilsson et al. |
| 2014/0267263 A1 | 9/2014 | Beckwith et al. |
| 2014/0267398 A1 | 9/2014 | Beckwith et al. |
| 2015/0226570 A1* | 8/2015 | Takei ................ G01C 21/3484 701/454 |

FOREIGN PATENT DOCUMENTS

| | | |
|---|---|---|
| DE | 10131720 | 1/2003 |
| DE | 102006008981 | 8/2007 |
| DE | 102008040467 | 1/2010 |
| DE | 102008042734 | 4/2010 |
| DE | 102009045169 A1 | 3/2011 |
| DE | 102012210145 A1 | 12/2012 |
| DE | 102012221762 | 6/2013 |
| EP | 1862988 B1 | 11/2009 |
| EP | 2618108 A1 | 7/2013 |
| JP | 8197981 | 8/1996 |
| JP | 2005128607 | 5/2005 |
| JP | 2006284458 | 10/2006 |
| JP | 2006309552 | 11/2006 |
| JP | 2007017340 | 1/2007 |
| JP | 2007200274 | 8/2007 |

(56) References Cited

FOREIGN PATENT DOCUMENTS

| JP | 2007333995 | | 12/2007 |
|---|---|---|---|
| JP | 2009007087 | | 1/2009 |
| JP | 2012058689 | | 3/2012 |
| JP | 2012508933 | | 4/2012 |
| JP | 201324921 | | 2/2013 |
| WO | 2010040589 | A3 | 4/2010 |
| WO | 2011108091 | A1 | 9/2011 |

OTHER PUBLICATIONS

Office Action of U.S. Appl. No. 14/465,049 dated Nov. 19, 2015, 63 pages.
Autoblog, GM's Full-Windsheild HUD Technology | Autoblog, YouTube, Mar. 17, 2010, http://www.youtube.com/watch?v=wR5EAEGM4-U&feature=youtu.be&t+1m15s.
MVS California,2_Work_Demo.mov, YouTube, May 16, 2011, http://www.youtube.com/watch?v=pdtcyaF6bTl.
"BMW Technology Guide: Adaptive Brake Assistant", http://www.bmw.com/com/en/insights/technology/technology_guide/articles/adaptive_brake_assistant.html.
"Adaptive Cruise Control and Collision Warning with Brake Support", http://ophelia.sdsu.edu:8080/ford/09-29-2013/doc/Adaptive_Cruise.pdf, Jul. 2012.
Alves, P.R. et al "Forward Collision Warning System Using Heads-up Displays: Testing Usability of Two New Metaphors," Intelligent Vehicles Symposium (IV), 2013 IEEE, pp. 1-6, https://web.fe.up.pt/~niadr/PUBLICATIONS/2013/HFIV13_ForwardCollision.pdf.
Gray R. et al. "A Comparison of Different Informative Vibrotactile Forward Collision Warnings: Does the Warning Need to be Linked to the Collision Event?", PloS One, 9(1), e87070, Jan. 27, 2014, http://journals.plos.org/plosone/article?id=10.1371/journal.pone.0087070.
Tai et al. "Bridging the Communication Gap: A Driver-Passenger Video Link" dated Apr. 15, 2010, http://www.hcilab.org/wp-content/uploads/tai2009bridging.pdf.
"Future Car Technologies" dated Dec. 19, 2013 https://www.carcoversdirect.com/car-lovers/resources/fact-friday/future-car-technologies/#.VgPyAXmFOUk.
Office Action of U.S. Appl. No. 13/832,918 dated Jan. 2, 2015.
Office Action of U.S. Appl. No. 14/041,614 dated Aug. 6, 2015.
Office Action of U.S. Appl. No. 13/832,209 dated Jan. 30, 2015.
Office Action of U.S. Appl. No. 13/832,918 dated May 8, 2015.
Office Action of U.S. Appl. No. 13/832,209 dated Jul. 16, 2015.
Office Action of U.S. Appl. No. 14/321,105 dated Sep. 24, 2015, 37 pages.
Office Action of U.S. Appl. No. 14/041,614 dated Feb. 3, 2016, 45 pages.
Office Action of U.S. Appl. No. 14/460,478 dated Feb. 8, 2016, 70 pages.
Office Action of U.S. Appl. No. 14/463,618 dated Feb. 23, 2016, 58 pages.
Office Action of U.S. Appl. No. 14/465,049 dated Feb. 24, 2016, 31 pages.
Office Action of U.S. Appl. No. 14/321,105 dated Apr. 20, 2016, 37 pages.
Office Action of U.S. Appl. No. 14/460,478 dated Apr. 25, 2016, 18 pages.
Notice of Allowance of U.S. Appl. No. 15/162,836 dated Jul. 28, 2016, 32 pages.
Office Action of U.S. Appl. No. 14/465,049 dated Aug. 9, 2016, 27 pages.
Search Report of DE Application No. 102014219575.6 dated Dec. 16, 2015, 12 pages.
Examination Report of DE Application No. 102014219575.6 dated Dec. 17, 2015, 10 pages.
Office Action of U.S. Appl. No. 14/321,105 dated Sep. 1, 2016, 29 pages.
Office Action of U.S. Appl. No. 14/465,049 dated Dec. 23, 2016, 30 pages.
Office Action of U.S. Appl. No. 14/515,620 dated Aug. 30, 2017, 22 pages.
Office Action of U.S. Appl. No. 14/321,105 dated Mar. 1, 2017, 26 pages.
Office Action of U.S. Appl. No. 14/515,620 dated Apr. 20, 2017, 31 pages.
Office Action of Japanese Serial No. 2014-048389 dated Nov. 21, 2017, 12 pages.
English version of Office Action of Japanese Serial No. 2014-048389 dated Nov. 21, 2017, 9 pages.
Office Action U.S. Appl. No. 14/515,620 dated Jun. 7, 2018, 40 pages.
Search Report of Chinese Serial No. 201410514641.9 dated Jun. 14, 2018, 2 pages.

\* cited by examiner

700

710

900

910

MULTI-LEVEL NAVIGATION MONITORING AND CONTROL

CROSS-REFERENCE TO RELATED APPLICATIONS

This application is a continuation-in-part (CIP) of, and claims the priority of, pending U.S. Non-Provisional patent application Ser. No. 14/321,105 entitled "ENHANCED 3-DIMENSIONAL (3-D) NAVIGATION," filed on Jul. 1, 2014, which is a continuation-in-part (CIP) of pending U.S. Non-Provisional patent application Ser. No. 14/041,614 entitled "3-DIMENSIONAL (3-D) NAVIGATION", filed on Sep. 30, 2013, which is a continuation-in-part (CIP) of pending U.S. Non-Provisional patent application Ser. No. 13/832,918 entitled "VOLUMETRIC HEADS-UP DISPLAY WITH DYNAMIC FOCAL PLANE", filed on Mar. 15, 2013. The entirety of the above-noted applications are incorporated by reference herein.

BACKGROUND

When a vehicle is being driven, various information may be important to the driver as well as the other vehicle occupants. Such information may include maps and related mapping information, as well as other information that may be useful to assist the driver/occupants to travel from place to place. From the perspective of a driver/occupant, the information may be difficult to obtain or may be cumbersome to use in a moving vehicle.

SUMMARY

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

An aspect relates to a system for multi-level navigation monitoring and control. The system may include a memory and a processor that executes computer executable components stored in the memory. The computer executable components may include a navigation manager generating a route between a first location and a second location and a map displayer outputting a map that includes the route and is indicative of distances of one or more surfaces, objects, obstructions, or geometries in an area around the vehicle. Further, the computer executable components may include a modification controller altering at least a portion of the route based on an indication of a change received at a user interface or a sensor. The navigation manager regenerates the route between the first location and the second location as a function of the indication of the change.

Another aspect relates to a method for multi-level navigation monitoring and control. The method may include generating a route between a first location and a second location based on a determination of a current location of a vehicle and a received destination location. The method may also include outputting a map on a windshield of the vehicle. The map may include segments of the route and may be transparent. A view of real world objects through the windshield might not be obstructed by the segments. Further, the method may include altering at least one segment of the route based on an indication of a change to the at least one segment. The altering may include overriding an autonomous steering instruction of the vehicle.

Still another aspect relates to a system for navigation monitoring and control of a vehicle. The system may include a memory and a processor that executes computer executable components stored in the memory. The computer executable components may include a lane marking manager determining a first boundary line, a second boundary line, and a centerline of a current lane of travel. The computer executable components may also include a confidence level determiner assigning a first confidence level to the first boundary line, a second confidence level to the second boundary line, and a third confidence level to the centerline. Further, the computer executable components may include a user interface outputting representations of the first boundary line, the second boundary line, and the centerline based, at least in part, on the first confidence level, the second confidence level, and the third confidence level.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DESCRIPTION

Figure 1:
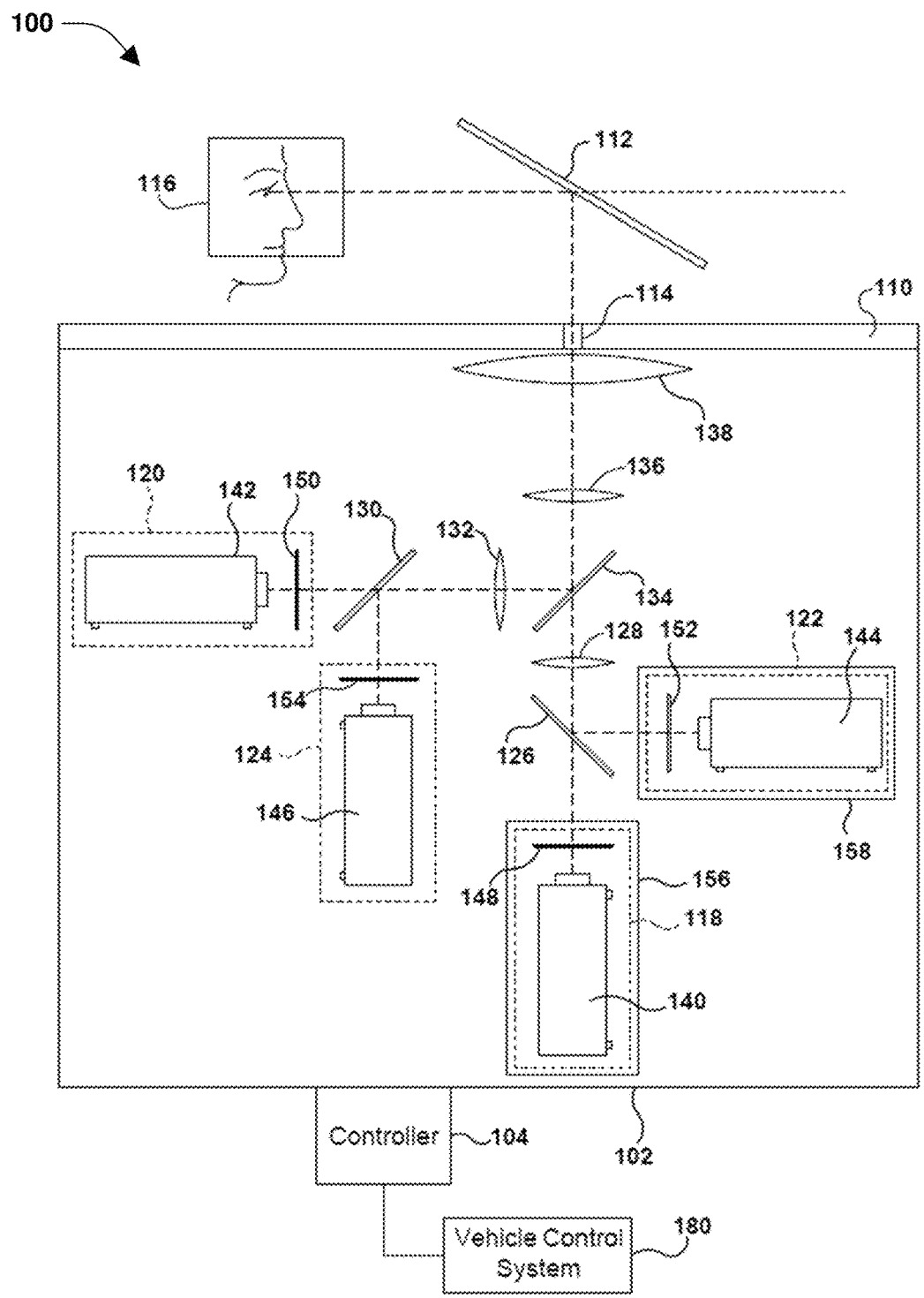
FIG. 1 is an illustration of an example schematic diagram of a vehicular heads-up display system according to one or more embodiments of this disclosure.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 2:
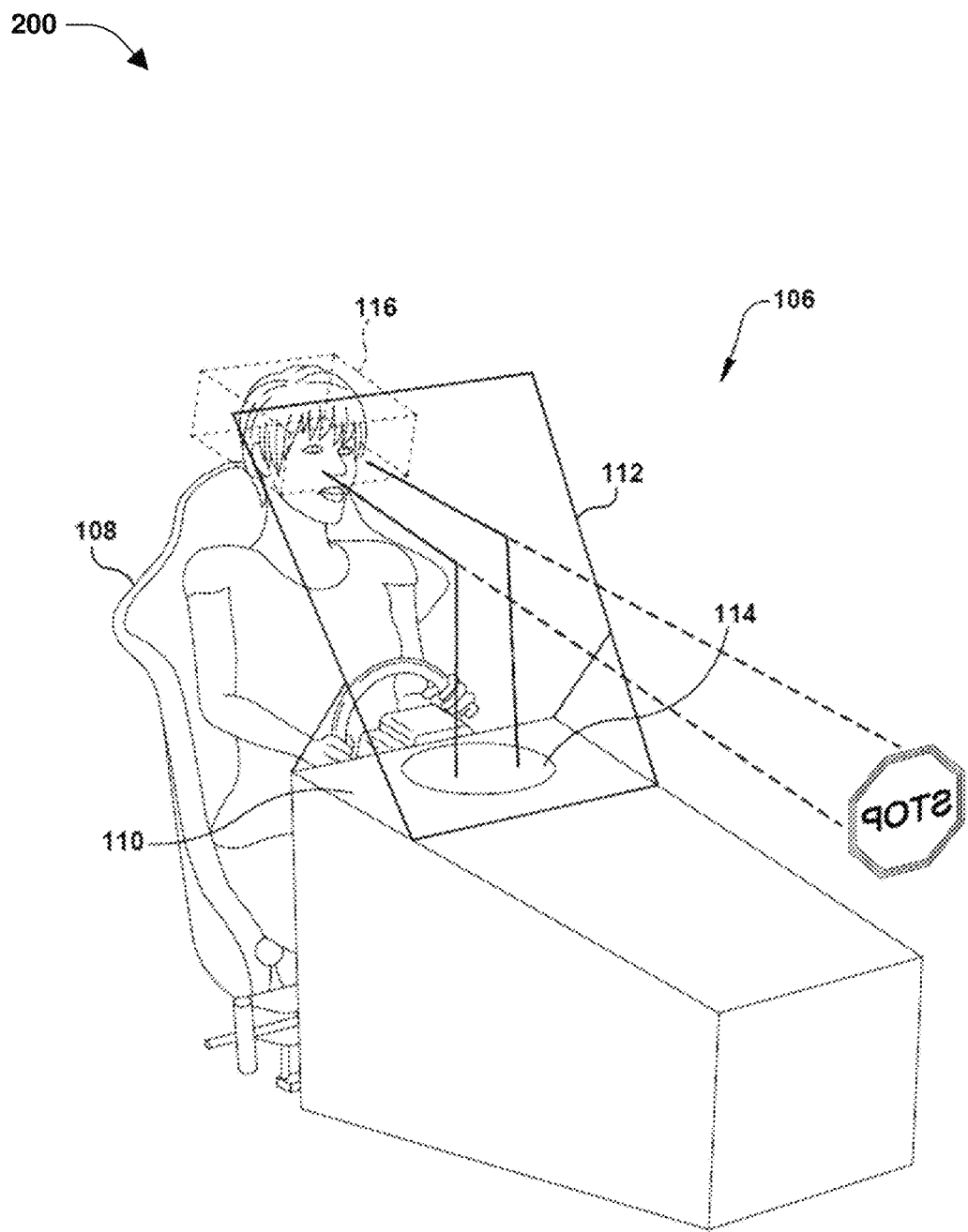
FIG. 2 is an illustration of an example schematic diagram of a vehicle in which a vehicular heads-up display system is provided according to one or more embodiments of this disclosure.
Figure 10A:
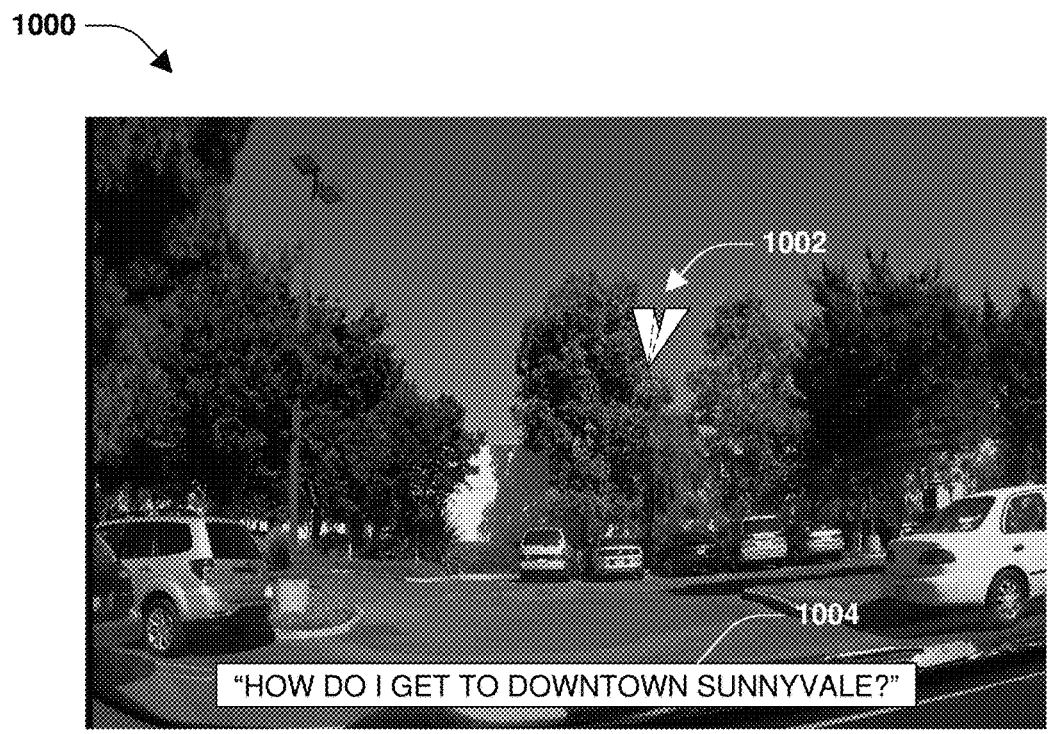
FIG. 10A is an illustration of an example scenario associated with 3-D navigation according to one or more embodiments of this disclosure.
Figure 10B:
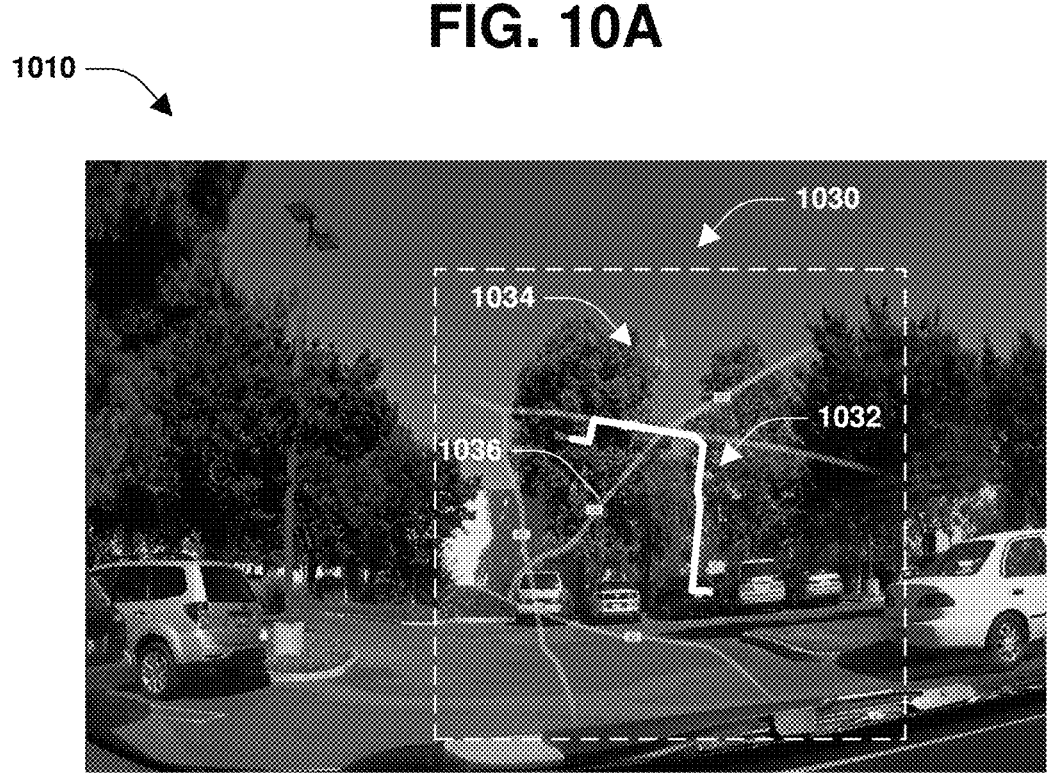
FIG. 10B is an illustration of an example scenario associated with 3-D navigation according to one or more embodiments of this disclosure.

For one or more of the figures herein, one or more boundaries, such as boundary 116 of FIG. 2 or boundary 1030 of FIG. 10B, for example, are drawn with different heights, widths, perimeters, aspect ratios, shapes, etc. relative to one another merely for illustrative purposes, and are not necessarily drawn to scale. For example, dashed or dotted lines are used to represent different boundaries, thus, if the dashed and dotted lines were drawn on top of one another they would not be distinguishable in the figures. Therefore, the lines are drawn with different dimensions or slightly apart from one another, in one or more of the figures, so that the lines are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

Graphic elements visually placed on environmental elements in the direct view of a driver by a vehicular heads-up display (HUD) device are often referred to as contact-analog or conformal augmented reality graphic elements. Successfully presenting contact-analog augmented reality graphic elements to the driver of a vehicle may depend on the ability of the vehicular HUD device to reproduce depth cues. These depth cues may include accommodation and vergence. Accommodation is a depth cue where the muscles in the eye actively change the optical power to change focus at different distances. Vergence is the simultaneous or concurrent inward rotation of the eyes towards each other to maintain a single binocular image when viewing an object.

Although examples described herein may refer to a driver of a vehicle, graphic elements may be projected, provided, rendered, etc. within view of one or more other occupants of a vehicle, such as passengers, etc. In addition, these examples are not intended to be limiting, and are merely disclosed to illustrate one or more exemplary aspects of this disclosure.

When a HUD device displays a graphic element on a windshield of a vehicle, accommodation may cause the human eye to shift between environmental elements and information displayed by the HUD device. Vergence causes the eyes to converge to points beyond the windshield into the environment, which may lead to the appearance of a double image of the HUD graphic element displayed on the windshield. Accordingly, to render contact-analog augmented reality graphic elements with accurately reproduced depth cues, graphic elements should be rendered on the same space as the real environment (e.g., at corresponding focal planes), rather than on the windshield of the vehicle.

A vehicle HUD device for displaying graphic elements in view of a driver of a vehicle while the driver views an environment through a windshield is provided. The HUD device may include one or more projectors that project a graphic element on a frontal focal plane in view of the driver while the driver views the environment through the windshield. Additionally, the HUD device may include one or more projectors that project a graphic element on a ground-parallel focal plane in view of the driver while the driver views the environment through the windshield. The projector that projects the graphic element on the frontal focal plane may be mounted on an actuator that linearly moves the projector to cause the frontal focal plane to move in a direction of a line-of-sight of the driver. The projector that projects the ground-parallel focal plane may be fixedly arranged such that the ground-parallel focal plane is static.

FIG. 1 is an illustration of an example schematic diagram of a vehicular heads-up display system according to one or more embodiments of this disclosure. A vehicular volumetric heads-up display system 100 ("HUD system 100") or ("HUD component 100") capable of rendering volumetric contact-analog augmented reality graphic elements is illustrated. The graphic elements may include 3-dimensional or "3-D" graphic elements rendered into the same space as the real environment with accurately reproduced depth cues. The HUD system 100 may include a vehicle heads-up display device 102 ("HUD device 102") and a controller 104 (or "controller component 104"). FIG. 2 is an illustration of an example schematic diagram of a vehicle in which a vehicular heads-up display system is provided according to one or more embodiments of this disclosure. As illustrated, the HUD system 100 may be provided in a vehicle 106, which may include a driver seat 108, a dashboard enclosure 110, and a windshield 112.

The configuration of the vehicle 106, with respect to the relative positioning of the driver seat 108, dashboard enclosure 110, and windshield 112, for example, may be conventional. To accommodate the herein-described HUD system 100, the dashboard enclosure 110 defines a housing space in which the HUD system 100 is housed. Further, the dashboard enclosure 110 has a HUD exit aperture 114 defined through an upper surface thereof. The HUD system 100 housed in the dashboard enclosure 110 may project graphic elements, such as contact-analog augmented reality graphic elements, through the HUD exit aperture 114 to the windshield 112, which may be used as a display screen for the HUD system 100. As described in further detail below, the augmented reality graphic elements may be rendered to the driver as if in the same space as the real environment.

A driver of the vehicle 106 drives the vehicle 106 while seated in the driver seat 108. Accordingly, the driver may be positionally constrained to a seating position on the driver seat 108 within the vehicle 106. In view of this positional constraint, the HUD system 100 may be designed using an assumption that the driver's view originates from an eye box 116 within the vehicle. The eye box 116 may be considered to include a region of an interior of the vehicle 106 where the driver's eyes are situated while the driver is seated in the driver seat 108.

The eye box 116 may be sized to encompass head positions of the driver regardless of a position and posture of the driver seat 108, or the HUD system 100 may detect the position and posture of the driver seat 108, and to adjust a position and size of the eye box 116 based thereon. In one or more embodiments, the HUD system 100 may be designed assuming the eye box 116 has a fixed size and is in a fixed position. For example, the eye box may have the following dimensions: 20 cm×10 cm×10 cm. The HUD system 100 may present the contact-analog augmented reality graphic elements to the driver when the driver's eyes are within the eye box 116 and the driver is facing/looking in a forward direction through the windshield 112 of the vehicle 106. Although the eye box 116 of FIG. 2 is illustrated for the driver of the vehicle 106, the eye box 116 may include one or more other occupants of the vehicle. In one or more embodiments, one or more additional eye boxes or HUD devices may be provided for passengers or other occupants, for example.

The HUD device 102 may display one or more graphic elements in view of the driver of the vehicle 106 while the driver views an environment through the windshield 112 of the vehicle 106. Graphic or environmental elements viewed by the driver through the windshield 112 while the driver's eyes are in the eye box 116 and the driver is facing/looking in the forward direction through the windshield 112 may be considered to be in view of the driver. As used herein, the view of the driver of the vehicle 106 while the driver views an environment through the windshield 112 of the vehicle 106 is intended to include an area viewed through the windshield 112, excluding dashboard displays located within the vehicle 106. The HUD device 102 may present the graphic elements such that the driver may view the graphic elements without looking away from the road.

Returning to FIG. 1, the HUD device 102 of the HUD system 100 may include a first projector 118, a second projector 120, a third projector 122, and a fourth projector 124. The first projector 118 and the third projector 122 may share a first beam splitter 126 and a first objective lens 128, while the second projector 120 and fourth projector 124 may share a second beam splitter 130 and a second objective lens 132. Consequently, the output of the first projector 118 and the third projector 122 may be received in the first beam splitter 126 and combined into a singular output, which may be directed to (and through) the first objective lens 128. Similarly, the output of the second projector 120 and the fourth projector 124 may be received in the second beam splitter 130 and may be combined into a singular output, which may be directed to (and through) the second objective lens 132.

The HUD device 102 may include an optional third beam splitter 134 disposed downstream from the first and second objective lenses 128, 132 and receive the output from the first and second objective lenses 128, 132. The outputs from the first and second objective lenses 128, 132 may be combined at the third beam splitter 134 into a singular output. The singular output may be a combination of the respective outputs of the first, second, third, and fourth projectors 118, 120, 122, 124. Further, the singular output may be directed to (and through) a third objective lens 136 and an ocular lens 138 before being directed out of the HUD exit aperture 114 to the windshield 112 (both of FIG. 2). The windshield 112 may be used as the display screen for the HUD system 100.

Each of the first projector 118, the second projector 120, the third projector 122, and the fourth projector 124 may include a projector unit 140, 142, 144, 146 and a diffuser screen 148, 150, 152, 154. The diffuser screen 148, 150, 152, 154 may be rigidly fixed a set distance from the respective projector unit 140, 142, 144, 146 and arranged relative to the projector unit 140, 142, 144, 146 such that light emitted from the projector unit 140, 142, 144, 146 passes through the diffuser screen 148, 150, 152, 154. The projector units 140, 142, 144, 146 may be light-emitting units which project an image or graphic element that passes through the associated diffuser screen 148, 150, 152, 154. The diffuser screens 148, 150, 152, 154 may serve as a luminous image source (or object) for the other elements of the optical system of the HUD device 102. Further, the diffuser screens 148, 150, 152, 154 may help ensure that much of the light leaving the diffuser screens 148, 150, 152, 154 falls into the optics following the diffuser screens 148, 150, 152, 154 (e.g., the first beam splitter 126, the first objective lens 128, the second beam splitter 130, the second objective lens 132, the third beam splitter 134, the third objective lens 136, and the ocular lens 138), while spreading out light such that the light eventually fills out the eye-box 116. Accordingly, brightness of the image or graphic element(s) may remain constant while the driver's head moves within the eye box 116. Accordingly, use of the diffuser screens 148, 150, 152, 154 may prevent different parts of the image or graphic element(s) from being visible from different points within the eye box 116, and thereby may prevent the occurrence of different visual behavior with slight head movement.

The projector units 140, 142, 144, 146 may take the form of a light-emitting unit suitable for the herein-described use. The projector units 140, 142, 144, 146 may take the form of a light-emitting unit capable of projecting an image or graphic element according to the herein-described use(s). Similarly, the diffuser screens 148, 150, 152, 154 may take the form of a light diffusing screen suitable for the herein-described use(s).

The first projector 118 may be mounted on a first actuator 156 in the HUD device 102. The first actuator 156 may be a linear actuator capable of moving the first projector 118 in a linear direction toward and away from the first beam splitter 126. Additionally, the third projector 122 may be mounted on a second actuator 158 in the HUD device 102. The second actuator 158 may be a linear actuator capable of moving the third projector 122 in a linear direction toward and away from the first beam splitter 126. The first and second actuators 156, 158 may take the form of linear actuators suitable for the herein-described use. The ability of the first projector 118 and the third projector 122 to linearly move may allow the first projector 118 and the third projector 122 to project graphic elements on dynamic or movable focal planes. In contrast to the first and third projectors 118, 122, the second and fourth projectors 120, 124 may be fixedly arranged in the HUD device 102. The second and fourth projectors 120, 124 may project graphic elements on static focal planes.

Using the first, second, third, and fourth projectors 118, 120, 122, 124, the HUD device 102 may render graphic elements (contact-analog augmented reality graphic elements or otherwise) in at least four distinct focal planes in the environment viewed by the driver through the windshield 112. The first projector 118 may project a first graphic element 160 in a first focal plane 162 and the second projector 120 may project a second graphic 164 element in a second focal plane 166. Further, the third projector 122 may project a third graphic element 168 in a third focal plane 170, and the fourth projector 124 may project a fourth graphic element 172 in a fourth focal plane 174 (as will be described with reference to FIGS. 3 and 4). The first, second, third, and fourth graphic elements 160, 164, 168, 172, and their associated first, second, third, and fourth focal planes 162, 166, 170, 174 may be rendered in the environment in view of the driver. The view of the driver may be the view as the driver is driving the vehicle 106 and the driver's eyes are in the eye box 116 while the driver is looking in a forward direction through the windshield 112.

Figure 3:
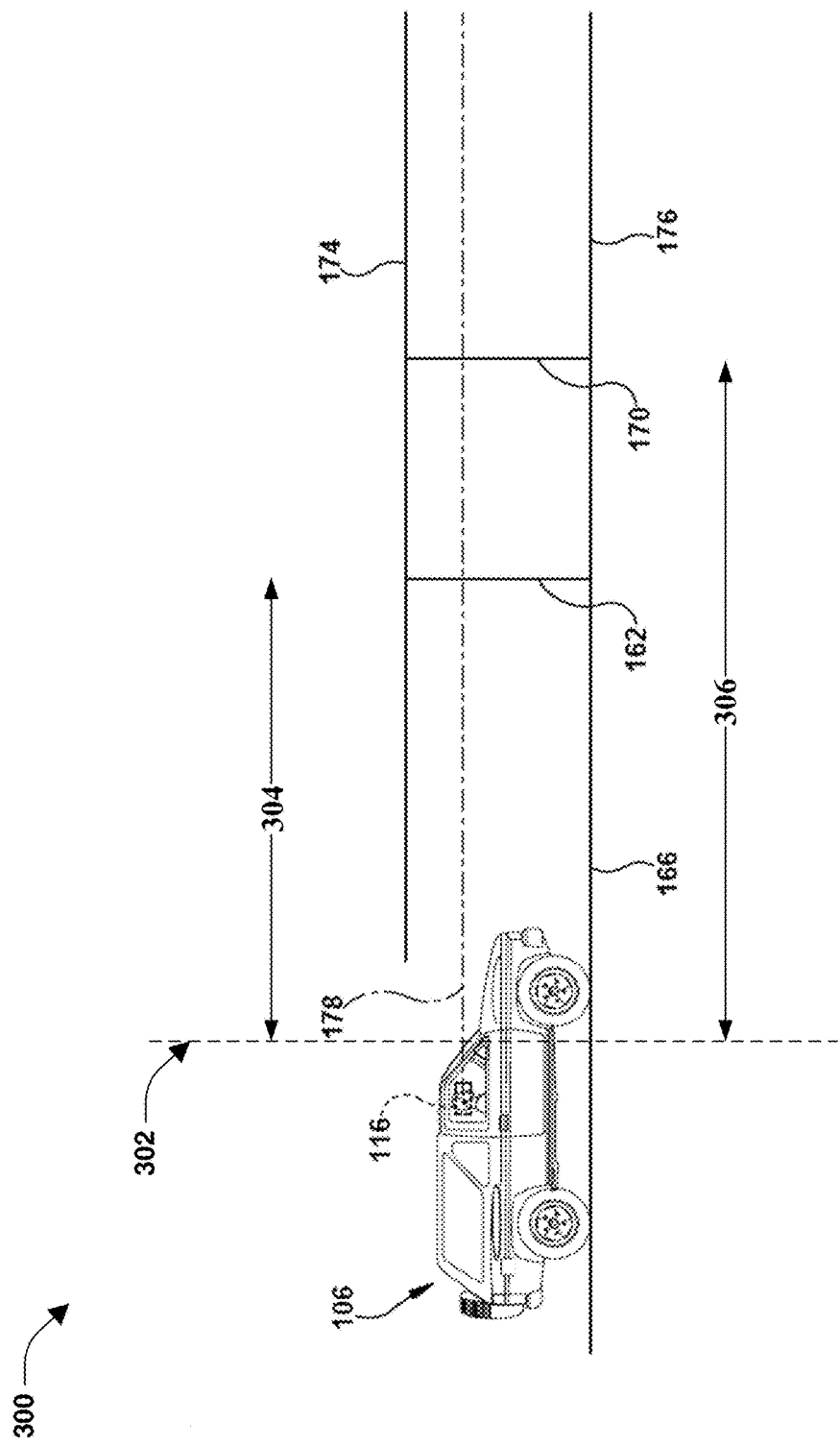
FIG. 3 is an illustration of an example side view of a vehicle and four focal planes on which graphic elements are projected by a vehicular heads-up display system according to one or more embodiments of this disclosure.
Figure 4:
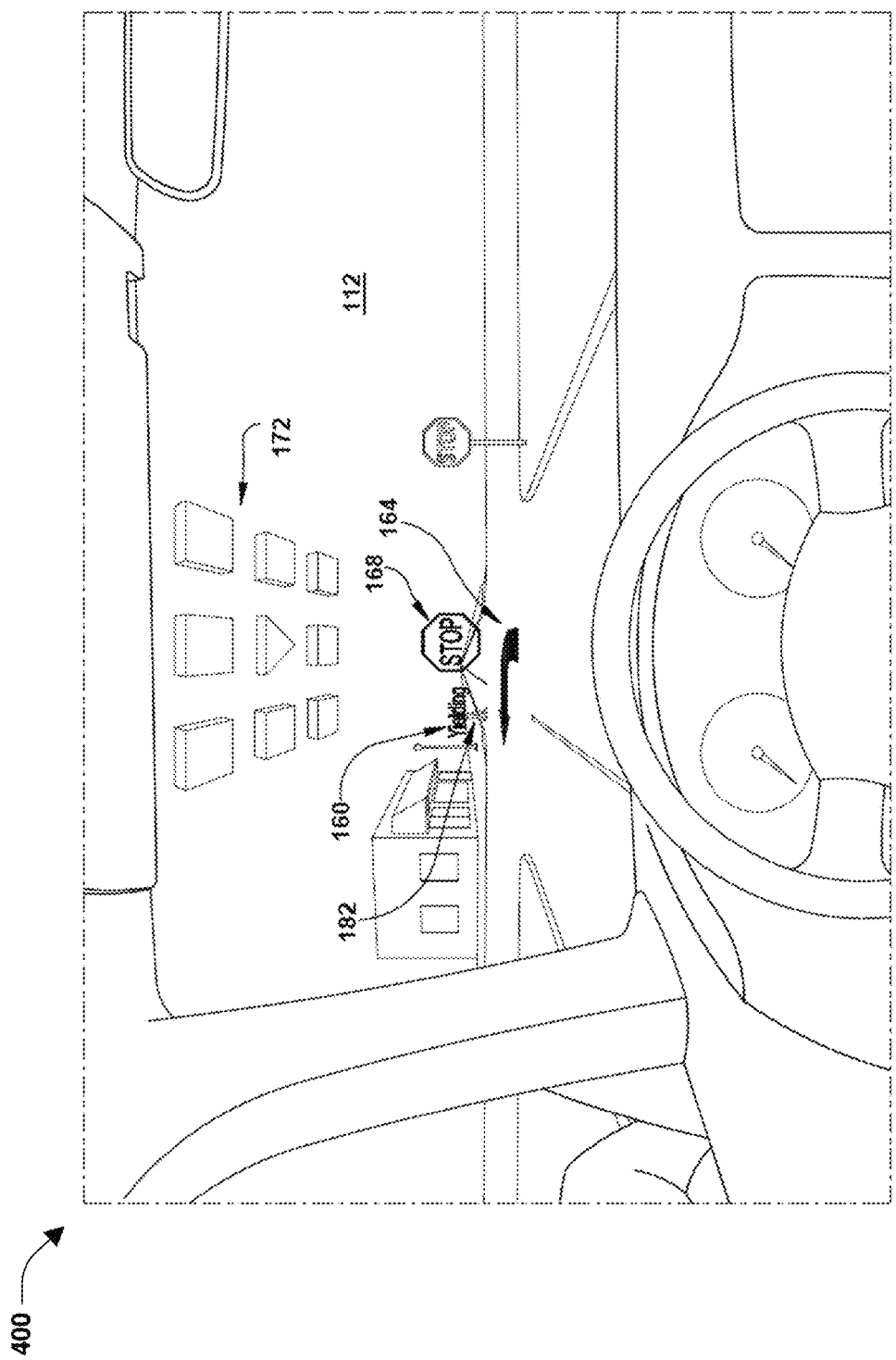
FIG. 4 is an illustration of an example view of a driver while driving a vehicle, looking through a windshield of the vehicle, and exemplary graphic elements projected by a vehicular heads-up display system according to one or more embodiments of this disclosure.

Referring to FIG. 3 and FIG. 4, the projection of the first, second, third, and fourth graphic elements 160, 164, 168, 172 on the first, second, third, and fourth focal planes 162, 166, 170, 174 will be described with reference to a ground surface 176 and a line-of-sight 178 of the driver. The ground surface 176 is a surface of a road in front of the vehicle 106. For the purposes of this disclosure, the ground surface 176 will be assumed to be a substantially planar surface. The line-of-sight 178 of the driver is a line extending substantially parallel to the ground surface 176 from the eye box 116 in the forward direction. As used herein, a direction of the line-of-sight 178 is a direction extending toward and away from the driver and the vehicle 106 along the line-of-sight 178.

The first focal plane 162 is a frontal focal plane, which may be oriented substantially perpendicularly to the line-of-sight 178 of the driver. The third focal plane 170 is also a frontal focal plane, which may be oriented substantially perpendicularly to the line-of-sight 178 of the driver. The first and third focal planes 162, 170 may be dynamic focal planes which may be movable in the direction of the line-of-sight 178, both in the forward direction (away from the vehicle 106) and in a rearward direction (toward the vehicle 106). The second focal plane 166 is a ground-parallel focal plane, which may be oriented substantially parallel to the ground surface 176, and may be disposed on the ground surface 176 such that the second focal plane 166 is a ground focal plane. The fourth focal plane 174 is also a ground-parallel focal plane, which may be oriented substantially parallel to the ground surface 176, and is disposed above the ground surface 176. The fourth focal plane 174 may be disposed above the ground surface 176 and the line-of-sight 178 of the driver to be a sky or ceiling focal plane. As a result, the second and fourth focal planes 166, 174 may be static focal planes.

Referring to FIG. 4, the first, second, third, and fourth graphic elements 160, 164, 168, 172 may be used to present different information to the driver. The exact type of information displayed by the first, second, third, and fourth graphic elements 160, 164, 168, 172 may vary. For exemplary purposes, the first graphic element 160 and third graphic element 168 may present a warning to the driver instructing the driver to yield to a hazard or obstacle, or may present a navigation instruction or driving instruction associated with rules of the road (e.g., a STOP sign, a YIELD sign, etc.). The second graphic element 164 and fourth graphic element 172 may present navigation instructions to the driver as a graphic overlay presented on the ground surface 176, or may present a vehicle-surrounding indicator to the driver. The first, second, third, and fourth graphic elements 160, 164, 168, 172 may present information or graphic elements to the driver which are different than those described herein, and a subset of the first, second, third, and fourth graphic elements 160, 164, 168, 172 may be presented.

Returning to FIG. 1, the controller 104 may include one or more computers, (e.g., arithmetic) processors, or other devices capable of communicating with one or more vehicle control systems 180 and controlling the HUD device 102. One or more of the vehicle control systems 180 (herein, "vehicle control system 180" or "vehicle control component 180") may take the form(s) of the vehicle control system 180 used to actively or passively facilitate control of the vehicle 106. The vehicle control system 180 may include or communicate with one or more sensors (not shown) which may detect driving and environmental conditions related to the operation of the vehicle 106.

With general reference to the operation of the HUD system 100, the controller 104 may communicate with the vehicle control system 180, and based on the communication with the vehicle control system 180, may determine the type and position of graphic elements to be presented to the driver of the vehicle 106. The controller 104 may determine the type of graphic element to be presented as the first, second, third, and fourth graphic elements 160, 164, 168, 172 by the first, second, third, and fourth projectors 118, 120, 122, 124. Further, the controller 104 may control the first, second, third, and fourth projectors 118, 120, 122, 124 to project the first, second, third, and fourth graphic elements 160, 164, 168, 172 as the determined graphic elements. The controller 104 may determine a target first graphic element position and a target third graphic element position as target positions at which the first and third graphic elements 160, 168 should be rendered in the environment to the driver. In addition, the controller 104 may control the first and second actuators 156, 158 to linearly move the first and third projectors 118, 122 such that the first and third focal planes 162, 170 may be moved to the target first and third graphic element positions, respectively.

Accordingly, the first projector 118 may project the first graphic element 160 on the first focal plane 162. The first focal plane 162 may be oriented substantially perpendicularly to the line-of-sight of the driver, and may be movable toward and away from the vehicle 106 in the direction of the line-of-sight 178 of the driver through linear movement of the first projector 118 by the first actuator 156. The second projector 120 may project the second graphic element 164 on the second focal plane 166, which may be static and oriented parallel to the ground surface 176 and disposed on the ground surface 176. The third projector 122 may project the third graphic element 168 on the third focal plane 170. The third focal plane 170 may be oriented substantially perpendicularly to the line-of-sight of the driver, and may be movable or adjustable toward and away from the vehicle 106 in the direction of the line-of-sight 178 of the driver through linear movement of the third projector 122 by the second actuator 158. The fourth projector 124 may project the fourth graphic element 172 on the fourth focal plane 174, which may be static, oriented parallel to the ground surface 176, and may be disposed above the line-of-sight 178 of the driver. The controller 104 may control the first and second actuators 156, 158 to move the first and third projectors 118, 122 to move the first and third focal planes 162, 170.

By having the first and third projectors 118, 122 project the first and third graphic elements 160, 168 on the movable first and third focal planes 162, 170 which are oriented substantially perpendicular to the line-of-sight 178 of the driver, focus of objects at different distances from the vehicle 106 may be adjusted. This may facilitate the provision of depth cues to the driver for the first and third graphic elements 160, 168, especially since the HUD system 100 may be a vehicular application, with the vehicle 106 serving as a moving platform.

While the second and fourth projectors 120, 124 project the second and fourth graphic elements 164, 172 on the static second and fourth focal planes 166, 174, the second and fourth focal planes 166, 174 may be continuous. To make the second and fourth focal planes 166, 174 parallel to the ground surface 176, the diffuser screens 150, 154 of the second and fourth projectors 120, 124 may be tilted. The optical system of the HUD device 102 may have very low distortion and may be nearly telocentric for images in a ground-parallel focal plane. Therefore, light rays may be close to parallel with the optical axis, which allows the projected second and fourth graphic elements 164, 172 to be projected or rendered without distorting or changing the magnification while the second and fourth focal planes 166, 174 are tilted. The resulting second and fourth graphic elements 164, 172 therefore appear on a continuous focal plane (the second and fourth focal planes 166, 174) parallel to the ground surface 176. The second and fourth graphic elements 164, 172 may be rendered with an actual 3-dimensional (3-D) volumetric shape, instead of as line segments, to add monocular cues to strengthen depth perception.

The continuous, static second and fourth focal planes 166, 174 may facilitate driver depth perception with regard to the second and fourth graphic elements 164, 172. The continuous, static second and fourth focal planes 166, 174 may allow for generation of real images or graphic elements through the forward-rearward direction in 3-D space (e.g., the direction of the line-of-sight 178 of the driver), which also may allow proper motion parallax cues to be generated. Accordingly, as the driver's head shifts from side-to-side or up-and-down, the second and fourth graphic elements 164, 172 may appear to the driver to be fixed in position in the environment, rather than moving around. Consequently, the HUD system 100 might not need a head-tracking function to compensate for movement of the driver's head.

With regard to the described exemplary information, which may be presented to the driver, the vehicle control system 180 may include processing and sensors capable of performing at least the following functions: hazard or obstacle detection; navigation; navigation instruction; and vehicle surrounding (e.g., blind-spot) monitoring. The vehicle control system 180 may include processing and sensors capable of performing other vehicle control functions (e.g., highway merge assist, etc.), which may alternatively or additionally be tied to information presented to the driver using the HUD system 100. Regardless of the functions performed by the vehicle control system 180, the precise manner of operation of the vehicle control system 180 to perform the functions, including the associated sensors and processing, may not be relevant to the operation of the HUD system 100.

The controller 104 may communicate with the vehicle control system 180 and may receive therefrom inputs related to the operation of the vehicle 106 and associated with the discussed functions and/or other functions. The controller 104 may control the HUD device 102 based on the inputs received from the vehicle control system 180. The controller 104 and/or the vehicle control system 180 may determine the type of graphic element to be displayed as the first, second, third, and fourth graphic elements 160, 164, 168, 172. Further the controller 104 and/or the vehicle control system 180 may determine the location of the first, second, third, and fourth graphic elements 160, 164, 168, 172; and which of the first, second, third, and fourth graphic elements 160, 164, 168, 172 are to be displayed. These determinations may be based on one or more vehicle functions employed by the driver, such as whether the driver is using the navigation function, for example.

Regardless of which of the controller 104 or the vehicle control system 180 are used to make these determinations, the controller 104 may control the HUD device 102 to display the appropriate graphic elements at the appropriate locations. This may include controlling the first, second, third, and fourth projectors 118, 120, 122, 124 to project the appropriate first, second, third, and fourth graphic elements 160, 164, 168, 172. Additionally or alternatively, this may include controlling the first and second actuators 156, 158 to linearly move the first and third projectors 118, 122, to move the first and third focal planes 162, 170 to the appropriate (e.g., target) positions. For example, one or more actuators, such as 156, 158, may move one or more of the focal planes, such as 162, 170. For example, with reference to the third focal plane 170, a distance between the third focal plane 170 and a windshield of the vehicle 106 (e.g., at 302) may be adjusted by adjusting distance 306. Similarly, distance 304 may be adjusted to change a target position for the focal plane 162.

Operation of the HUD system 100 will be described with reference to the vehicle 106 having the vehicle control system 180 which enables at least the following functions: a hazard or obstacle detection and warning function; a navigation function; a navigation instruction function; and a vehicle surrounding (e.g., blind-spot) monitoring function. According to an embodiment, the vehicle 106 may have a subset of these functions or additional functions, and the HUD system 100 may be employed with reference to the subset or additional functions. The description of the HUD system 100 with reference to these functions is merely exemplary, and used to facilitate description of the HUD system 100. Though the controller 104 and/or the vehicle control system 180 may make determinations associated with the operation of the HUD system 100, in the below description, the controller 104 is described as making determinations based on input received from the vehicle control system 180.

Information related to the obstacle detection and warning function may be presented to the driver as a contact-analog augmented reality graphic element projected by the first projector 118 of the HUD device 102. The vehicle control system 180 may detect various obstacles in the roadway on which the vehicle 106 is travelling. For example, obstacles may include pedestrians crossing the roadway, other vehicles, animals, debris in the roadway, potholes, etc. The detection of these obstacles may be made by processing information from the environment sensed by sensors (not shown) provided on the vehicle 106. Further, obstacle detection may be carried out in other manners.

When an obstacle is detected, the vehicle control system 180 may communicate obstacle information to the controller 104. The controller 104 may receive the obstacle information from the vehicle control system 180 and may determine the type of graphic element to present as the first graphic element 160 and the target first graphic element position based on the received obstacle information. While various types of graphic elements may be used, such as flashing icons, other signs, etc., examples herein will be described with reference to a "YIELD" sign presented when an obstacle is detected.

Referring to FIG. 4, the obstacle detected by the vehicle control system 180 may be a pedestrian 182 crossing the road on which the vehicle 106 is travelling. In the exemplary view of the driver of FIG. 4, the vehicle 106 is traveling on a road, which is being crossed by the pedestrian 182. Accordingly, the vehicle control system 180 may send obstacle information related to the pedestrian 182 to the controller 104. Based on the obstacle information, the controller 104 may determine the type of graphic element to be displayed as the first graphic element 160; in this case, for example, the graphic element may be a "YIELD" sign, although other graphic elements may be used. The controller 104 may determine the target first graphic element position such that the first graphic element 160 may perceived by the driver to be at a same depth (e.g., focal plane) as the pedestrian 182. Further, the controller 104 may adjust the target first graphic element position such that the first graphic element 160 'tracks' or 'follows' the pedestrian 182, as the pedestrian 182 walks, for example.

The controller 104 may control the first projector 118 to project the "YIELD" sign as the first graphic element 160. Further, the controller 104 may control the first actuator 156 to linearly move the first projector 118 such that the first graphic element 160 may be perceived by the driver (e.g., while the driver's eyes are in the eye box 116 and the driver is looking in the forward direction through the windshield 112) to be at the same depth as the pedestrian 182. The first actuator 156 may be controlled such that the first graphic element 160 may be projected on the first focal plane 162, which may be positioned at the target first graphic element position and may be oriented substantially perpendicular to the line-of-sight 178.

As the vehicle 106 and the pedestrian 182 travel on the road, the relative distance between the two may change. This change in distance may be communicated to the controller 104 by the vehicle control system 180. The target first graphic element position may be changed accordingly and the first actuator 156 may be controlled by the controller 104 to move the first focal plane 162 to remain at the (e.g., changed/changing) target first graphic element position. Accordingly, projecting the first graphic element 160 on the first focal plane 162 (which may be movable in the direction of the line-of-sight 178 of the driver) may allow the depth cues associated with the first graphic element 160 to be reproduced so that the driver may accurately judge the position of the first graphic element 160 (e.g., the detected obstacle).

Additionally, information related to the navigation function may be presented to the driver as a contact-analog augmented reality graphic element projected by the second projector 120 of the HUD device 102. The vehicle control system 180 may, upon receiving a navigation request from the driver (e.g., the input of a desired location), generate a navigation route for the driver to follow to travel to the desired location. The navigation route may include a set of driving directions for the driver to follow and may include instructions to turn onto streets on the route to the desired location. The navigation function may be carried out in other manners than that discussed herein. When the navigation function is activated, the vehicle control system 180 may communicate the driving directions associated with the navigation function to the controller 104.

The controller 104 may receive the driving directions from the vehicle control system 180 and may determine the type of graphic element to output as the second graphic element 164. The types of graphic elements associated with the navigation function may include graphic elements which instruct the driver to continue on the current road (e.g., a straight line or arrow), to turn left or right onto an upcoming cross-road (e.g., a left/right arrow or line turning in the appropriate direction), to enter, merge onto, or exit from a highway (e.g., a line or arrow indicating the appropriate path), etc. The controller 104 may select the appropriate graphic element to output as the second graphic element 164 based on the driving direction communicated from the vehicle control system 180, for example.

Referring to the exemplary view of the driver of FIG. 4, the driving direction for the driving route determined by the navigation function of the vehicle control system 180 includes a left-hand turn onto an upcoming street. Accordingly, the controller 104 may control the second projector 120 to generate and project a left-hand turn graphic element as the second graphic element 164 on the second focal plane 166. As shown in FIG. 4, the second focal plane 166 may be oriented parallel to the ground surface 176 and may be disposed on the ground surface 176. The second projector 120 may be fixedly arranged in the HUD device 102, such that the second focal plane 166 is static. Further, the second focal plane 166 may be continuous, such that the second graphic element 164 may be rendered to the driver with appropriate depth cues as a 3-D image.

According to one or more embodiments, information related to the navigation instruction function may be presented to the driver as a contact-analog augmented reality graphic element projected by the third projector 122 of the HUD device 102. The vehicle control system 180 may use sensors or information stored in a database and associated with a map to monitor the road on which the vehicle 106 is traveling, and to determine upcoming navigation instructions associated with travel on that road. For example, the vehicle control system 180 may detect an upcoming required stop, yield, or other condition (herein, collectively referenced as "road condition") on the road on which the vehicle 106 is traveling. The vehicle control system 180 may determine a navigation instruction associated with the detected road condition (e.g., a stop instruction associated with a stop road condition, etc.). The navigation instruction function may be carried out in various manners, the specifics of which are not necessarily relevant to the operation of the HUD system 100. Additionally, road conditions may include, among other things, traffic on a road segment, obstructions, obstacles, weather conditions, conditions of a surface of a road segment, speed limits associated with a portion of a road or road segment, etc. Road conditions may generally include reasons to speed up, slow down, take a detour, stop, exercise caution, etc. while driving, for example.

The vehicle control system 180 may communicate the road condition or the navigation instructions associated with the road condition, as well as information related to a position of the road condition, to the controller 104. The controller 104 may control the third projector 122 to project the third graphic element 168 to communicate information to the driver related to the road condition or associated navigation instruction accordingly. The controller 104 may receive the road condition or navigation instruction information, as well as the position information, from the vehicle control system 180, and may determine the type of graphic element to present as the third graphic element 168 and a target third graphic element position.

Various types of graphic elements may be used in conjunction with navigation instruction functions, for example: a STOP sign, a YIELD sign, a ONE WAY sign, a NO TURN ON RED sign, etc. The type of graphic element may be selected to communicate the navigation instruction associated with the road condition. Whichever type of graphic element the controller 104 determines should be used as the third graphic element 168, that graphic element may be projected to appear at the location of the driving condition. The target third graphic element position may be determined as a position at which the third graphic element 168 should be rendered in view of the driver based on the position of the detected road condition relative to the vehicle 106.

The controller 104 may control the third projector 122 to project the appropriate graphic element as the third graphic element 168. The controller may control the second actuator 158 to linearly move the third projector 122 such that the third graphic element 168 is projected and rendered to be perceived by the driver (e.g., while the driver's eyes are in the eye box 116 and the driver is looking in the forward direction through the windshield 112) to be at the same depth (e.g., having a same focal plane) as the road condition. The second actuator 158 may be controlled such that the third graphic element 168 is projected on the third focal plane 170, which may be positioned at the target third graphic element position and may be oriented substantially perpendicularly to the line-of-sight 178. The controller 104 may control the second actuator 158 to continuously linearly move the third projector 122. The third projector 122 may be moved so that the third focal plane 170 moves as a distance between the vehicle 106 and the detected road condition (e.g., the target third graphic element position) changes (as detected by the vehicle control system 180 and communicated to the controller 104), for example, as a result of the vehicle 106 driving toward the detected road condition.

In the exemplary view of from the perspective of the driver in FIG. 4, the vehicle 106 is approaching a four-way intersection at which the vehicle 106 should stop. Accordingly, the vehicle control system 180 may detect the stop road condition at a position of an entrance of the intersection, and may determine the navigation instruction associated with the stop road condition to be a stop instruction. The stop road condition or instruction, as well as the position of the stop road condition, may be communicated to the controller 104, which may determine that a STOP sign should be presented as the third graphic element 168. The controller 104 may determine that the third graphic element 168 (e.g., the STOP sign) should appear at the position of the entrance of the four-way intersection. The position of the entrance of the intersection may therefore be determined to be the target third graphic element position.

The controller 104 may control the third projector 122 to project the "STOP" sign as the third graphic element 168, and may control the second actuator 158 to move the third projector 122 such that the third graphic element 168 is projected and rendered to be perceived by the driver (e.g., while the driver's eyes are in the eye box 116 and the driver is looking in the forward direction through the windshield 112) to be at the same depth as the entrance of the four-way intersection. The second actuator 158 may be controlled such that the third graphic element 168 may be projected on the third focal plane 170, which may be positioned at the target third graphic element position and oriented substantially perpendicularly to the line-of-sight 178. As the vehicle 106 travels on road, the relative distance between the vehicle 106 and the entrance of the four-way intersection changes. This change in distance may be communicated to the controller 104 by the vehicle control system 180, the target third graphic element position may be changed accordingly, and the second actuator 158 may be controlled by the controller 104 to move the third focal plane 170 to remain at the (e.g., changed/changing) target third graphic element position. Accordingly, projecting the third graphic element 168 on the third focal plane 170 which may be movable in the direction of the line-of-sight 178 of the driver, the depth cues associated with the third graphic element 168 may thus be reproduced so that the driver may judge the position of the third graphic element 168 (e.g., the detected road condition).

Information related to the vehicle surrounding (e.g., blind-spot) monitoring function may be presented to the driver by the fourth projector 124 of the HUD device 102. The vehicle control system 180 may detect the existence of other vehicles in an area immediately surrounding or surrounding the vehicle 106. The detection of the other vehicles immediately surrounding the vehicle 106 may be made by processing information regarding the surroundings of the vehicle 106 sensed by sensors (not shown) provided on the vehicle 106. The vehicle surrounding determination may be carried out in various manners.

The vehicle surrounding information may be determined by the vehicle control system 180 and may be communicated to the controller 104. The controller 104 may receive the vehicle surrounding information from the vehicle control system 180 and may determine how, if at all, to modify the fourth graphic element 172 projected on the fourth focal plane 174. The graphic element used as the fourth graphic element 172 to facilitate the vehicle surrounding (e.g., blind-spot) monitoring function may be a vehicle surrounding indicator, illustrated in FIG. 4.

The vehicle surrounding indicator may include a central marker that may represent the vehicle 106 and (in this example) eight surrounding markers representing positions immediately surrounding the vehicle 106. The vehicle control system 180 may communicate information about the positions of vehicles in the immediate surroundings of the vehicle 106, and the controller 104 may control the fourth projector 124 to change the fourth graphic element 172 such that one or more of the associated surrounding markers are highlighted. The highlighting of the surrounding markers may indicate to the driver the position of other vehicles in the immediate surroundings of the vehicle 106.

In FIG. 4, the fourth graphic element 172 may be projected on the fourth focal plane 174, which may be oriented parallel to the ground surface 176 and may be disposed above the ground surface 176 and the line-of-sight 178. The fourth projector 124 may be fixedly arranged in the HUD device 102, such that the fourth focal plane 174 is static. The fourth focal plane 174 may be continuous, such that the fourth graphic element 172 may be rendered to the driver with depth cues as a 3-D image.

The fourth graphic element 172 may be presented in a form different than the vehicle surrounding indicator of FIG. 4. The fourth graphic element 172 may be projected onto the fourth focal plane 174, which may be oriented parallel to the ground surface 176 and may be disposed above the ground surface 176 and the line-of-sight 178 of the driver. Accordingly, the fourth graphic element 172 may be provided on the sky focal plane, which may be appropriate since the information communicated by the fourth graphic element 172 need not interact with the environment.

The HUD system 100 may project graphic elements, some of which may be projected as contact-analog augmented reality graphic elements. The graphic elements may be projected by the HUD system at continuously changing focal distances, as well as in ground-parallel focal planes, with continuous (or often) changing focus from front-to-back in the direction of the line-of-sight 178 of the driver. Accordingly, depth perception cues may be provided in an attempt to facilitate focus and increase attention to the environment. This may enable the driver (as well as other vehicle occupants) to observe information presented via the graphic elements at substantially the same time as observing the environment. In addition, spatial perception may be influenced by focal cues, and the focal plane adjusting capability, as well as the capability to show graphic elements on continuous, static ground-parallel focal planes, of the herein-described HUD system 100 may improve spatial perception. Accordingly, an improvement in spatial perception may be observed when adjusting the focal cues as compared to the spatial perception observed when a size of a graphic element is adjusted.

The configuration of the HUD device 102, including the use of the beam splitters 126, 130, 134 and lenses 128, 132, 136, 138, may allow the HUD device 102 to have a relatively compact size. Further, the lenses 128, 132, 136, 138 may allow a range of depth to expand from a few meters in front of the vehicle 106 to infinity within the physical space allocated for the optics of the HUD device 102. In addition, the beam splitters 126, 130, 134 may be used as optical combiners to merge disparate sets of projected rays from the first, second, third, and fourth projectors 118, 120, 122, 124 through the lenses 128, 132, 136, 138 to combine separate images from the first, second, third, and fourth projectors 118, 120, 122, 124 into one unified image (e.g., or graphic element) projected in view of the driver.

In one or more embodiments, the disclosed, as well as other features and functions, or alternatives or varieties thereof, may be combined into different systems or applications. Additionally, various alternatives, modifications, variations, or improvements therein may be subsequently made by those skilled in the art.

For example, fewer or more projectors may be used in the HUD system 100 to project fewer or more graphic elements. Further, while the HUD system 100 is described as having two projectors which project graphic elements in frontal focal planes and two projectors which project graphic elements in ground-parallel focal planes, the proportion of frontal and ground-parallel focal planes may be changed. The described vehicle functions associated with the HUD system 100 are exemplary, and may be changed or modified.

Further, the mechanism by which the frontal focal planes are moved may be modified from that described herein. For example, rather than moving the entire projector (e.g., the first and third projectors 118, 122 using the first and second actuators 156, 158), merely the diffuser screens (e.g., the diffuser screens 148, 152 of the first and third projectors 118, 122) may be moved relative to the respective projector units (e.g., the projector units 140, 144).

Additionally, while the HUD system 100 has been described with reference to the vehicle 106, which may be a four-wheeled automobile for outdoor use, the HUD system 100 may be used in different types of vehicles. For example, the HUD system may be provided in a marine vehicle (e.g., a boat), an air vehicle (e.g., an airplane or jet), or a vehicle intended for indoor use (e.g., a transportation cart, a vehicle used for material handling, such as a forklift, etc.).

Figure 5:
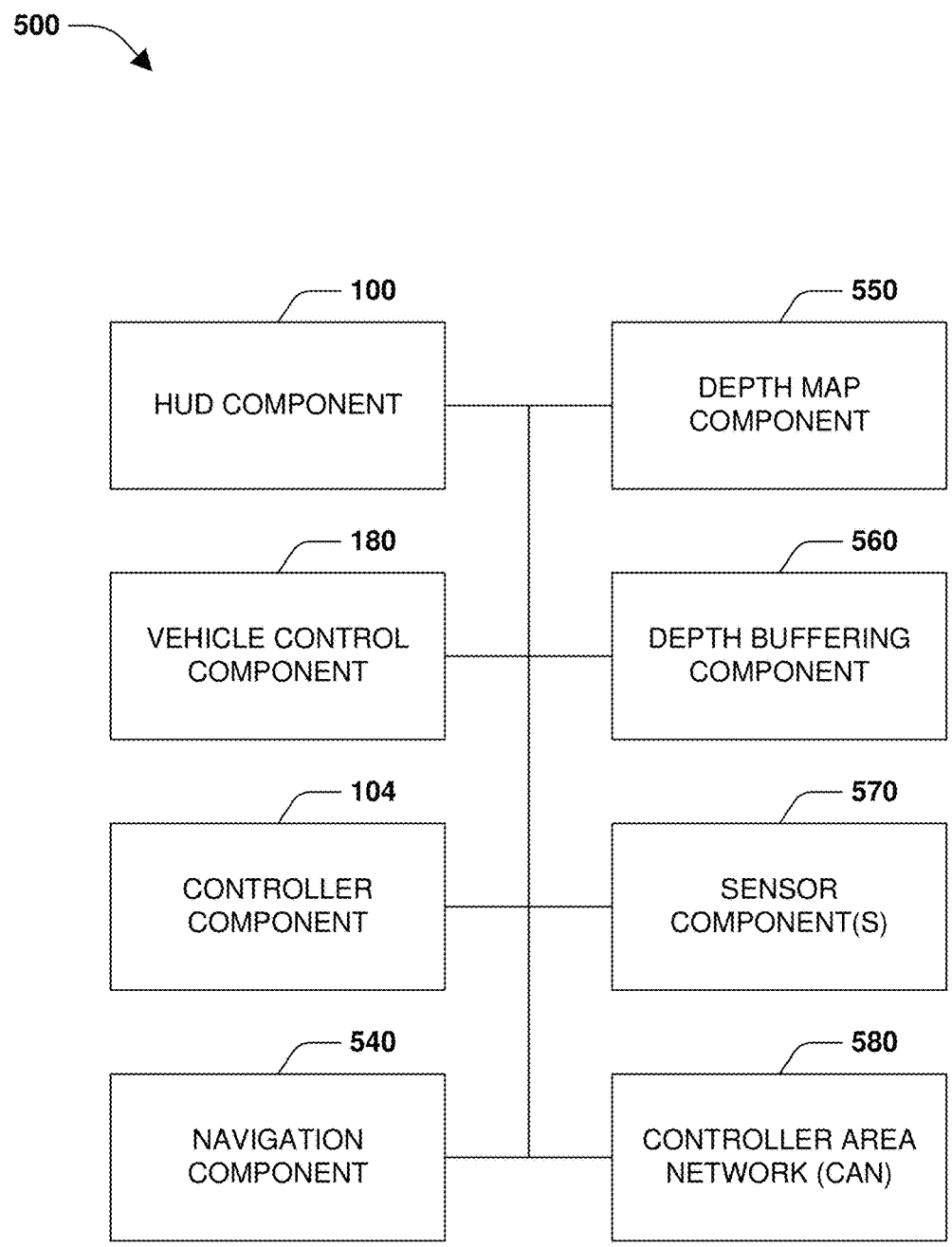
FIG. 5 is an illustration of an example component diagram of a system for 3-D navigation according to one or more embodiments of this disclosure.

FIG. 5 is an illustration of an example component diagram of a system 500 for 3-D navigation according to one or more embodiments of this disclosure. The system 500 may include a HUD component 100, a vehicle control component 180, a controller component 104, a navigation component 540, a depth map component 550, a depth buffering component 560, one or more sensor components 570, and one or more controller area networks (CANs) 580. The HUD component 100 may be a vehicular volumetric HUD system, such as the HUD system 100 of FIG. 1 and may include components described herein. In one or more embodiments, the HUD component 100 may be a 3-D HUD, a variable distance HUD, an augmented reality HUD (AR-HUD), etc., as wells as other types of HUDs.

The navigation component 540 may receive or identify an origin location (e.g., point A) and one or more destination locations (e.g., point B). The navigation component 540 may calculate or determine one or more routes from point A to point B, for example. Generally, the navigation component 540 is associated with a vehicle. For example, the navigation component 540 may be mounted on the vehicle, integrated with one or more systems or one or more components of the vehicle, housed within the vehicle, linked or communicatively coupled with one or more components of the vehicle, or located within the vehicle, etc. The navigation component 540 may identify or receive the origin location and the destination location. In one or more embodiments, the navigation component 540 may include a telematics component (not shown) that may determine a current location or current position of the vehicle.

Additionally, the navigation component 540 may generate one or more routes from the origin location to one or more of the destination locations. In one or more embodiments, the navigation component 540 may generate one or more routes from a current location or current position of the vehicle to one or more destination locations. A route of the one or more routes may include one or more portions or one or more route portions. As an example, one or more portions of the route may include one or more navigation instructions or maneuvers associated with one or more road segments or one or more intersections of road segments. One or more portions of the route may include one or more turns, navigation maneuvers, road segments, intersections, landmarks, or other elements along the route. The navigation component 540 may identify one or more of these turns, navigation maneuvers, landmarks, etc. and issue one or more navigation commands or one or more navigation instructions accordingly, such as to a driver of the vehicle.

The navigation component 540 may issue the one or more navigation commands or navigation instructions via an audio prompt, visual prompt, tactile prompt, etc. For example, the navigation component 540 may interface with one or more peripheral components (not shown) by transmitting one or more prompts across one or more controller area networks (CANs) 580. The navigation component 540 may play back an audible instruction, such as, "Turn left at Main Street", or flash a light on the left hand portion of a display, vibrate the steering wheel, etc. to indicate to a driver that a driving action should be taken. The navigation component 540 may interact with one or more other components to facilitate transmittal or delivery of one or more of the driving instructions.

For example, the HUD component 100 may project one or more navigation instructions or one or more navigation maneuvers as one or more graphic elements or avatars in view of an occupant or driver of the vehicle. These navigation instructions may be received (e.g., directly or indirectly) from the navigation component 540. The HUD component 100 may project an avatar on successive focal planes such that the avatar appears to be moving to an occupant, such as a driver having a view from eye box 116 of FIG. 2. The HUD component 100 may enable a driver to perceive a volumetric image in view of the driver, where the volumetric image may serve as a 'virtual' guide vehicle for the driver of the vehicle to follow. It may appear to the driver of the vehicle that he or she is merely following a guide vehicle to a destination location, for example. Additionally, one or more other navigation commands or navigation instructions may be projected as a volumetric placeholder, marker, or flagpole, as described herein.

The HUD component 100 may project one or more graphic elements, which may be contact analog augmented reality graphic elements, conformal augmented reality graphic elements, avatars, icons, etc. These graphic elements may be projected by the HUD component 100 in a volumetric manner. Thus, one or more visual cues or one or more depth cues associated with the graphic elements may be substantially preserved. Preservation of one or more of these visual cues or depth cues may be achieved by projecting or rendering graphic elements on a dynamic focal plane or a movable focal plane. The HUD component 100 may project or render one or more graphic elements on a movable or adjustable focal plane. A dynamic focal plane or a movable focal plane may be moved or adjusted along a path or a line, such as a line of sight of an occupant of a vehicle, as discussed with reference to FIG. 1 and FIG. 3, for example.

The dynamic focal plane may be movable towards a vehicle or a windshield of a vehicle or away therefrom.

In one or more embodiments, a focal plane may be dynamic as a result of movement of projectors or screens of the HUD component 100, such as through the use of actuators, for example. One or more projectors of the HUD component 100 may move in a linear fashion, thereby enabling respective projectors to project one or more graphic elements on a dynamic, movable, or adjustable focal plane, which move when the projectors move. In other embodiments, one or more other means or alternative means for adjustments may be utilized.

Explained another way, when a graphic element is projected on a dynamic, movable, or adjustable focal plane, the graphic element may be projected onto a focal plane wherein a distance (e.g., distance 304 or distance 306 of FIG. 3) from the focal plane and the vehicle is being adjusted. Projectors of the HUD component 100 may project or render graphic elements on movable focal planes, therefore, the focus of graphic elements projected at various distances from the vehicle may be adjusted. As mentioned, one or more of the focal planes may be oriented substantially perpendicular or substantially parallel to a line of sight of an occupant of the vehicle. A focal plane may be ground parallel or ground perpendicular. Additionally, one or more of the focal planes may be movable or static with respect to the line of sight of the occupant or the ground. This may enable depth cues associated with the graphic elements to be presented to occupants of the vehicle, such as the driver, as the vehicle moves or travels (e.g., and thus serves as a moving platform), as discussed herein.

The HUD component 100 of FIG. 5 may project or render volumetric contact-analog augmented reality graphic elements. Thus, these graphic elements may be projected to appear at various distances. The HUD component 100 may project graphic elements at multiple focal planes or in an adjustable manner. Explained yet another way, focal planes of graphic elements projected by the HUD component 100 may be adjusted to distances that extend beyond the windshield, such as next to a pedestrian on the sidewalk. This may enable an occupant of the vehicle to focus on the operating environment or driving environment, rather than switching focus of their eyes between the windshield or instrument panel of the vehicle and the driving environment.

Accordingly, graphic elements may be projected or visually placed (e.g., by the HUD component 100) in an environment in direct view of an occupant. Thus, graphic elements may be rendered in the same space as the real environment, rather than on the windshield, allowing depth cues associated with the graphic element to be reproduced in a more accurate or correct manner. As a result, graphic elements may be projected on the same focal planes as real world objects (e.g., the road) such that an occupant of a vehicle may view the graphic elements without looking away from the road, for example.

These multiple focal planes or adjustable focal planes may be achieved when projectors of a HUD component 100 are moved as light rays may be reshaped or altered such that a graphic element or virtual object being projected may appear to be further away than the windshield or have a focal plane that is not on the windshield. The projected graphic element or virtual object may have similar focal properties as a real object (e.g., pedestrian, vehicle, sign, etc.) that is far away (e.g., ten meters), for example. As light rays are reflected by glass of the windshield, outgoing light rays diverge, thereby creating a 'reflected' image or a real image, which may be projected as a graphic element.

Since the light rays may be reflected off of the windshield, rather than being emitted or appearing from the windshield (e.g., as with special coatings), re-rendering of a graphic element is typically not necessary when an occupant moves his or her head. For example, the continuous, static focal planes of FIG. 3 may enable optically 'correct' or real images to be generated through the forward-rearward direction in 3-dimensional space (e.g., the direction of the line-of-sight of an occupant), thereby allowing proper motion parallax cues to be generated. Accordingly, when the occupant's head shifts, graphic elements associated with these focal planes may appear to be fixed in position in the environment, rather than moving around. As mentioned, the HUD component 100 typically does not require head-tracking functionality to compensate for movement of an occupant's head.

The HUD component 100 may be rastor based, rather than vector based. Thus, graphic elements projected by the HUD component 100 may be a bitmap, may include a dot matrix structure, or may be a rectangular grid of pixels. Additionally, the HUD component 100 may project one or more portions of one or more graphic elements with different shading, transparency levels, colors, brightness, etc.

Thus, the HUD component 100 may render or project graphic elements or avatars with various degrees of freedom. Accordingly, accommodation may be preserved such that the eyes of an occupant may actively change optical power to focus on a graphic element projected on a focal plane. Similarly, vergence may be preserved such that the occupant may have concurrent inward rotation of a graphic element as the graphic element is projected to move 'closer' (e.g., by projecting onto successively closer focal planes).

In one or more embodiments, the HUD component 100 may project a graphic element, such as an avatar or a moving avatar, for a driver or occupant of a vehicle to follow as a navigation instruction, maneuver, or command. For example, the HUD component 100 may project or render one or more of the graphic elements as a moving avatar, a placeholder, an identifier, a flag pole, a marker, and so forth. These graphic elements may be projected on one or more focal planes around an environment surrounding the vehicle, and may be projected in view of an occupant of the vehicle. An avatar or graphic element projected by the HUD component 100 may lead a driver of a vehicle through one or more portions of a route, and attempt to mitigate collisions with obstacles, obstructions, or road conditions by being projected to weave, navigate, move, or travel around the obstacles. A sensor component 570 may sense one or more obstacles or road conditions and a controller component 104 may direct the HUD component 100 to project the graphic element(s) such that the graphic element(s) travels around or bypasses a road condition, such as by changing lanes to avoid a traffic barrel, for example.

In one or more embodiments, the sensor component 570 may sense, identify, or detect one or more road conditions in an environment around or surrounding the vehicle. The sensor component 570 may detect or identify road segments, sidewalks, objects, pedestrians, other vehicles, obstructions, obstacles, debris, potholes, road surface conditions (e.g., ice, rain, sand, gravel, etc.), traffic conditions, traffic signs (e.g., red lights, speed limit signs, stop signs, railroad crossings, trains, etc.). An indication of these road conditions may be transmitted to the controller component 104 or the vehicle control component 180. For example, one or more of the CANs 580 may be used to facilitate communication between the sensor component 570 and the controller component 104 or the vehicle control component 180. In one or more embodiments, the sensor component 570 may include one or more image capture devices, a microphone, blind spot monitor, parking sensor, proximity sensor, presence sensor, infrared sensor, motion sensor, etc.

As used herein, a traffic condition may include an intersection, a vehicle, such as a vehicle sharing a roadway with a vehicle equipped with a 3-D navigation system, a railroad crossing, a red light, a road segment, a sidewalk, a stop sign, a yield sign, a traffic sign, a train, etc. As used herein, a road condition may include debris, gravel, potholes, a road surface condition, sand, fallen trees, spillage, oil slicks, weather conditions, such as ice or rain, etc. Further, an 'object' may include various traffic conditions, road conditions, weather conditions, etc. Examples of objects may include but are not necessarily limited to other vehicles, stores, buildings, landmarks, obstacles in a roadway, road segments, intersections, pedestrians, etc. Objects may be found, detected, or be associated with a path, one or more road segments, etc. along a route on which a vehicle is travelling or is projected to travel along.

For example, the sensor component 570 may receive, sense, or detect information (e.g., objects, traffic conditions, road conditions, weather conditions, etc.) from an environment, such as a driving environment, an operating environment, or an environment surrounding a vehicle. Information collected by the sensor component 570 may be passed through the controller area network 580 and analyzed by the controller component 104 or over a telematics channel provided by the navigation component 540 and analyzed by a remote server (not shown). The information received or collected by the sensor component 570 may be indicative of a reason for a driver to exercise caution, a reason to slow down (e.g., due to a speed limit posting or sign), a reason to speed up, a reason to stop, a reason to take a detour, etc. Explained another way, information collected by the sensor component 570 may be analyzed and translated by the controller component 104 (or a remote server) to one or more suggested driving actions for a driver. These suggested driving actions may be projected as visual cues or graphic elements by the HUD component 100 based on information collected by the vehicle control component 180 and determinations made by the controller component 104.

In one or more embodiments, the sensor component 570 may sense or detect one or more objects, one or more traffic conditions, one or more road conditions, one or more weather conditions, etc. For example, a proximity sensor (e.g., one of the sensor components 570) on a vehicle may detect a pedestrian crossing a crosswalk. Additionally, other components may receive information relating to the environment, driving environment, or operating environment. For example, the vehicle control component 180 may receive similar information (e.g., via a telematics channel provided by the navigation component 540 or from the sensor component 570 over the controller area network 580). The vehicle control component 180 may aggregate information from one or more sources. The vehicle control component 180 may receive object information, traffic condition information, road condition information, weather condition information, etc.

The sensor component 570 may gather information directly from the environment, while the vehicle control component 180 may aggregate information from difference sources which may not necessarily be local to the vehicle. For example, the vehicle control component 180 may receive traffic information along a projected route for the vehicle from a traffic database or a news source. The vehicle control component 180 may aggregate information about the environment, such as the environment around a vehicle or environment information associated with a projected route for the vehicle (e.g., environment information at a location where a vehicle is anticipated to pass through while travelling along a predetermined route).

Further, the vehicle control component 180 may receive data associated with one or more of the road conditions or data related to an environment surrounding the vehicle (e.g., operating environment, driving environment, surrounding environment, etc.). In one or more embodiments, the vehicle control component 180 may receive one or more of the road conditions from the sensor component 570. Additionally, the vehicle control component 180 may receive one or more road conditions from one or more other sources, such as a server (not shown) or a database (not shown), for example. The vehicle control component 180 may be communicatively coupled with the server, third party, database, or other entity via a telematics channel initiated via a telematics component (not shown). The vehicle control component 180 may gather information associated with one or more portions of a route from an origin location to a destination location.

For example, the vehicle control component 180 may receive road condition information that includes traffic information of a road segment (e.g., whether traffic is congested, if there is an accident on the road, etc.). Additionally, the vehicle control component 180 may receive speed limit information associated with one or more of the road segments of a route. This information may be used to determine how to project one or more graphic elements to a driver or occupant of a vehicle. For example, if a road segment is associated with a 65 mph speed limit, and a current velocity (e.g., detected by the sensor component 570) of the vehicle is 25 mph, the vehicle control component 180 may instruct the HUD component 100 to project an avatar such that the avatar appears to speed up upon turning onto the road segment.

As another example, if the sensor component 570 detects a traffic barrel in a current lane in which the vehicle is travelling, the vehicle control component 180 may receive this information and make a determination that a navigation instruction to change lanes should be projected by the HUD component 100. This instruction may be transmitted over one or more CANs 580 to the HUD component 100, which may project, render, or animate an avatar or graphic element changing lanes or shifting position in response to the detected traffic barrel. For example, the HUD component 100 may project an avatar or icon that appears to weave around or navigate around the traffic barrel, which is positioned in front of the vehicle in the operating environment surrounding the vehicle. As well, the vehicle control component 180 may instruct the HUD component 100 project a turn signal on the avatar, as a real vehicle might indicate when changing lanes. Further, the vehicle control component 180 may adjust a perceived velocity for the avatar as the avatar approaches the traffic barrel. This may be achieved by projecting the avatar or graphic element in successively closer focal planes or by adjusting a dynamic focal plane of the graphic element such that the distance between the dynamic focal plane and the vehicle or windshield of the vehicle is reduced. IN a similar manner, when it is desired to render the avatar as speeding up, the dynamic focal plane may be adjusted such that the distance between the dynamic focal plane and the vehicle or windshield thereof is increased.

The vehicle control component 180 may receive one or more road conditions. A road condition of the one or more road conditions may include traffic information of one or more of the road segments or speed limit information associated with one or more of the road segments. Further, the vehicle control component 180 may drive the HUD component 100 in order to project one or more graphic elements based on one or more of the road conditions, such as a speed limit of a road segment and a current velocity of the vehicle. Thus, the vehicle control system 180 may determine one or more actions (e.g., stop, speed up, change lanes, slow down, etc.) or navigation instructions that should be projected by the HUD component 100.

In one or more embodiments, the system 500 may include a view management component (not shown) that manages one or more aspects of one or more graphic elements projected by the HUD component 100. In one or more embodiments, the controller component 104 may manage one or more of these aspects or functionality associated with the vehicle control component 180. For example, the controller component 104 may receive one or more road conditions.

The controller component 104 may determine a type of graphic element to be displayed, projected, animated, rendered, etc. by the HUD component 100. As an example, when a vehicle is travelling along one or more portions of a route that includes relatively straight road segments, the controller component 104 may project a graphic element as an avatar. The avatar may appear or be projected as a vehicle or a guide vehicle. In a scenario where a vehicle is travelling along one or more portions of a route that includes one or more turns or other navigation maneuvers, the controller component 104 may command the HUD component 100 to project a graphic element to be a marker at a location associated with one or more of the turns. For example, if a route includes a right turn from a first street onto a second street, the controller component 104 may command the HUD component 100 to project a marker or identifier at, to, around, etc. the intersection of the first street and the second street. The controller component 104 may determine one or more types (e.g., markers, identifiers, flag poles, guide avatars, etc.) of graphic elements to be displayed.

Additionally, the controller component 104 may determine one or more locations where a graphic element should be projected. For example, the controller component 104 may decide when and where a graphic element should be projected or how the graphic element should be displayed. A location of a graphic element may include a focal plane, a distance of the focal plane from the vehicle or windshield thereof, x-coordinates, y-coordinates, z-coordinates, etc. along an x, y, or z axis, for example. This location may be referred to as a target position for one or more of the graphic elements. In one or more embodiments, the controller component 104 may adjust a distance between one or more of the focal planes of one or more of the graphic elements and the vehicle (e.g., or windshield of the vehicle) based on one or more road conditions associated with one or more portions of the route, a current position of the vehicle, a current velocity of the vehicle, etc.

For example, a road segment (e.g., portion of a route where a vehicle is currently located or positioned) is associated with a 65 mph speed limit (e.g., a road condition), and a current velocity (e.g., detected by the sensor component 570) of the vehicle is 25 mph (e.g., current velocity of the vehicle). Thus, the controller component 104 may command the HUD component 100 to project an avatar or graphic element, which appears to be travelling at about 65 mph. In one or more embodiments, the avatar may be projected in a manner which demonstrates gradual acceleration from 25 mph to 65 mph. Thus, a distance between the focal plane of the avatar and the vehicle may be adjusted accordingly. For example, in a scenario where the vehicle accelerates at approximately the same pace, the distance between the focal plane and the vehicle may remain about the same. If the vehicle accelerates at a slower pace than the avatar, the distance between the focal plane and the vehicle may be adjusted or increased by the controller component 104. This adjustment may be based on a current position of the vehicle or a current velocity of the vehicle, as well as road conditions of the route associated therewith.

Additionally, the controller component 104 may adjust or determine a size of a graphic element according to or based on a distance of the focal plane of the graphic element and the vehicle with the HUD component 100. The controller component 104 may adjust a height, size, width, depth, etc. of a graphic element, guide icon, or avatar based on a desired perception. For example, to make an avatar appear to speed up, the controller component 104 may adjust the size of the avatar to shrink or be reduced while projecting the avatar onto successively farther focal planes or adjusting a dynamic focal plane to be farther and farther away from the vehicle.

In one or more embodiments, the size of the graphic element may be utilized as an indicator for an importance level of a navigation instruction or message. For example, the more important the message or navigation instruction, the bigger the avatar, icon, or graphic element may be projected.

The controller component 104 may determine one or more actions for one or more of the graphic elements to be projected by the HUD component 100. For example, the controller component 104 may command the HUD component 100 to project an avatar to speed up, slow down, stop, change lanes, activate a turn signal prior to changing lanes, flash, blink, change an orientation or angle of an avatar, change a color of an avatar, etc. Further, the controller component 104 may adjust target positions for one or more of the graphic elements based on road conditions, a current position of the vehicle, a current velocity of the vehicle, or other attributes, characteristics, or measurements. In one or more embodiments, the controller component 104 may interface or communicate with the navigation component 540 across one or more CANs 580.

The controller component 104 may identify obstructions, distractions, or other aspects which may impede a driver or occupant of a vehicle. In one or more embodiments, the controller component 104 may receive an indication of a location of the horizon, such as from the sensor component 570, and project graphic elements above the horizon or sky plane, etc. The controller component may determine or adjust a color, transparency, or shading of one or more graphic elements based on a time of day, traffic levels associated with the route, a familiarity the driver has with the route, etc.

The depth map component 550 may build or receive a depth map of an environment around or surrounding the vehicle, such as an operating environment. The HUD component 100 may utilize the depth map to project one or more graphic elements accordingly. For example, an avatar is displayed are turning a corner and is 'behind' a building (e.g., a building is between the line of sight of an occupant of the vehicle and a perceived or target location of the graphic element or avatar). Therefore, the HUD component 100 may enable or disable projection of one or more portions of the avatar or graphic elements in line with what should be seen if the avatar were a real-world object.

The depth map component 550 may receive a depth map from a server or third party server. For example, the depth map component 550 may download a depth map from a server via a telematics channel initiated via a telematics component (not shown). In other embodiments, the sensor component 570 may detect depth information, which may be used by the depth map component 550 to build the depth map. The depth map component 550 may interface or communicate with one or more sensors to build the depth map or receive a pre-built depth map from a database. Thus, the depth map component 550 may build or receive a depth map based on depth information. The depth map may be indicative of distances of one or more surfaces, objects, obstructions, geometries, etc. in the environment or area around the vehicle.

The depth map may be passed or transmitted to the controller component 104, which may command the HUD component 100 to render one or more of the graphic elements accordingly. For example, the HUD component 100 may project or render graphic elements based on a height of an eye box associated with an occupant of a vehicle, a location of the vehicle, and a depth map of the area, which may be actively sensed or received from a database. The HUD component 100 may project one or more of the graphic elements based on the depth map to account for a perspective of one or more occupants of the vehicle.

The depth buffering component 560 may facilitate perspective management for one or more occupants of the vehicle utilizing the depth map generated or receive by the depth map component 550. Thus, the depth buffering component may facilitate rendering of graphic elements such that the graphic elements appear visually 'correct' to an occupant. For example, if a graphic element is to be projected behind a real world object, the depth buffering component 560 may 'hide' a portion of the graphic element from an occupant by not projecting or rendering that portion of the graphic element. Thus, the depth buffering component 560 may manage which portions (e.g., pixels) of a graphic element are drawn, projected, or rendered, and which portions are not. Accordingly, the depth buffering component 560 may enable or disable rendering of one or more portions of one or more of the graphic elements based on the depth map.

Additionally, the depth buffering component 560 may obscure real world objects, thereby inhibiting what an occupant of a vehicle may see. For example, the depth buffering component 560 may command the HUD component 100 to project a white graphic element such that the graphic element overlays a real world object, such as a billboard (e.g., detected by sensor component 570). As a result, an occupant may not see the billboard or have an obscured view of the billboard. Thus, the depth buffering component 560 may mitigate distractions for a driver or an occupant of a vehicle by providing graphic elements that facilitate diminished reality.

Examples of navigation instructions that may be projected by the HUD component 100 may include following a guide vehicle and speeding up (e.g., changing a dynamic focal plane to have an increased distance from the focal plane to the vehicle, thereby adjusting a near-far perception a driver or occupant may have of the graphic element). Other examples may include slowing down (e.g., adjusting the distance between a focal plane and the vehicle to be reduced), changing lanes (e.g., adjusting a target position for a graphic element), navigating around obstructions, turning, arrival, marking a location, and so forth. As an example, the controller component 104 may command the HUD component 100 to project an avatar to 'slow down' if a pedestrian steps out onto the road segment, road way, crosswalk, etc. As another example, the controller component 104 may command the HUD component 100 to project deceleration based on an angle of a turn, a speed limit associated with a road segment, road conditions, such as ice, etc. For example, if there is ice on the road surface, the controller component 104 may command the HUD component 100 to project an avatar moving slower than it would if no ice were present on the road surface.

In one or more embodiments, the controller component 100 may mark or identify an upcoming turn or intersection with a marker, flag post, flag pole, identifier, etc. For example, the HUD component 100 may render or project a placeholder or marker according to the perspective of the occupant of the vehicle. The depth map component 550 may provide a depth map such that real life objects (e.g., buildings, trees, etc.) act as line of sight blockers for one or more portions of the placeholder. As an example, if a placeholder has a perceived height of 100 feet, and a 50 foot tall building is in front of the placeholder, the depth buffering component 560 may compensate for the line of sight blocking by disabling rendering or projection of a bottom portion of the placeholder graphic element, thereby rendering the placeholder according to the perspective of the driver or occupant.

In one or more embodiments, one or more of the graphic elements may be projected in view of an occupant of the vehicle based on the route (e.g., a follow a guide vehicle mode). In one or more embodiments, a graphic element may be projected as an avatar or other guide icon. The avatar may appear to be flying and may be displayed against a real world environment that is located around the vehicle. The avatar may move, travel, or 'fly' in 3-D space or in three dimensions. Thus, the avatar or graphic element may appear to move in 3-D, thereby providing a more intuitive feel or comfortable feeling for an occupant or driver that is following the avatar. As an example, an avatar, graphic element, or guide icon may be projected such that it appears to change in height or size based on a perceived distance from an occupant of the vehicle. The avatar may be animated by sequentially projecting the moving avatar on one or more different focal planes. Additionally, the avatar might appear to navigate around obstructions, obstacles, pedestrians, debris, potholes, etc. as a real vehicle would navigate. In one or more embodiments, the avatar might 'drive', move, appear to move, etc. according to real-time traffic. The avatar may change lanes in a manner such that the avatar does not appear to 'hit' another vehicle or otherwise interfere with traffic. As another example, if a route takes a driver or a vehicle across train tracks, the avatar may stop at the train tracks when a train is crossing. In other embodiments, the HUD component 100 may project the avatar or graphic element to stop at stop signs, red lights, or obey traffic laws. Upon arrival at a destination location, the HUD component 100 may render or project an avatar in a resting pose, for example.

Further, the system 500 for 3-D navigation may generate an intuitive message, instruction, or command for an occupant of a vehicle, such as a driver. The instruction may be based on one or more aspects related to perspective, as provided by the ability of the HUD component to project or render volumetric, 3-D graphic elements along one or more adjustable focal planes. For example, the 3-D effect may be determined based on distance, perspective, perceived distance, road conditions, etc.

Figure 6:
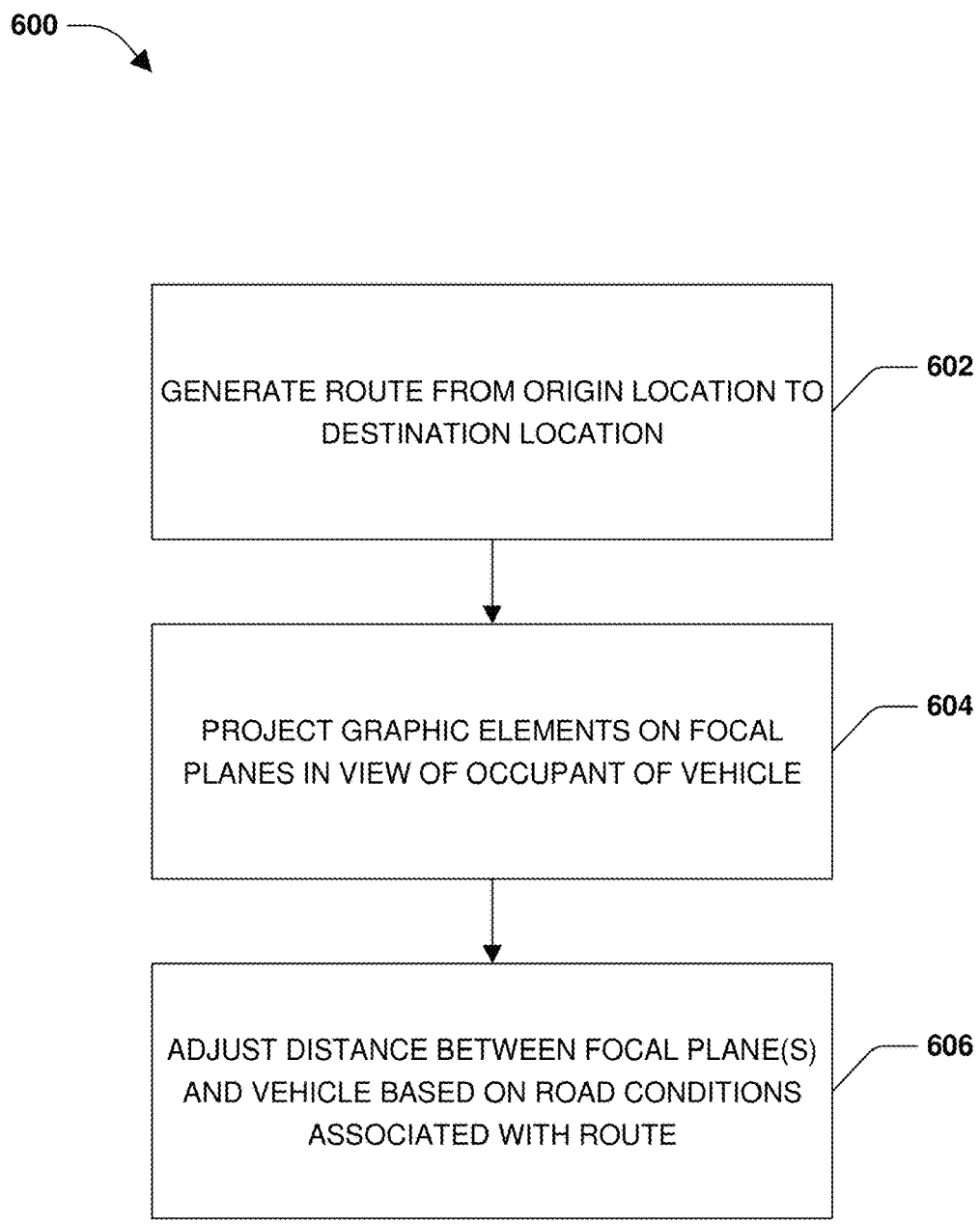
FIG. 6 is an illustration of an example flow diagram of a method for 3-D navigation according to one or more embodiments of this disclosure.

FIG. 6 is an illustration of an example flow diagram of a method 600 for 3-D navigation according to one or more embodiments of this disclosure. At 602, a route may be generated from an origin location to a destination location. In one or more embodiments, the origin location or the destination location may be received via a telematics channel, such as from a global positioning system (GPS) unit. At 604, one or more graphic elements may be projected on one or more focal planes in view of an occupant of a vehicle. The graphic elements may be displayed as avatars, images, icons, identifiers, markers, etc. Additionally, the graphic elements may be based on one or more portions of the route. For example, the graphic elements may be projected at various distances depending on the portion of the route at which a vehicle may be located (e.g., a current position of the vehicle).

At 606, a distance between a focal plane and the vehicle may be adjusted based on road conditions associated with one or more portions of the route. Further, the distance may also be adjusted based on a current velocity of the vehicle. For example, if a vehicle is traveling along a portion of a route associated with a 65 mile per hour (mph) speed limit and the current velocity of the vehicle is 25 mph, the distance between the focal plane of a projected graphic element or avatar may be increased (e.g., to indicate to the driver or occupant to speed up). For example, the graphic element may be projected to appear as if it were travelling about 65 mph, thereby prompting the occupant or driver to speed up and 'catch' the avatar (e.g., simulating the action of following a guide vehicle).

Figure 7A:
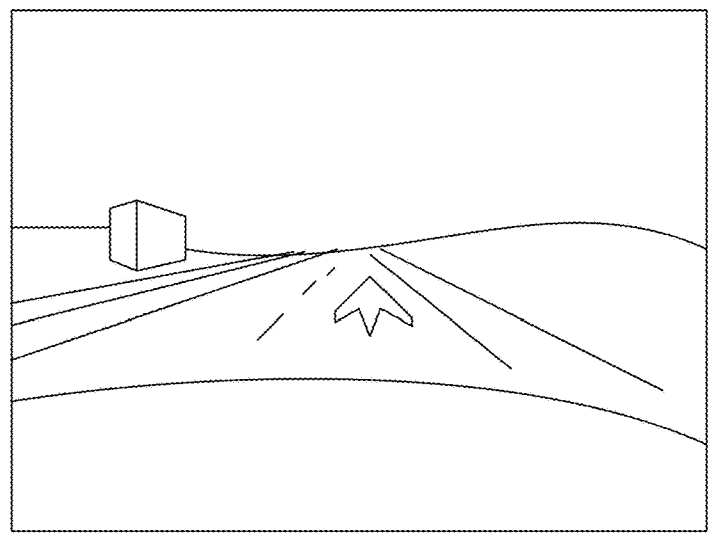
FIG. 7A is an illustration of an example avatar for 3-D navigation according to one or more embodiments of this disclosure.
Figure 7B:
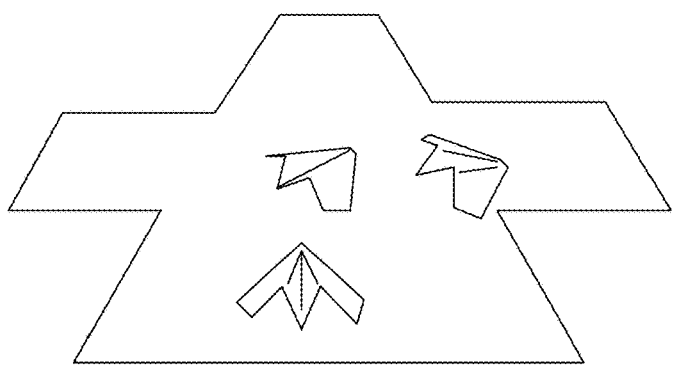
FIG. 7B is an illustration of an example avatar for 3-D navigation according to one or more embodiments of this disclosure.

FIG. 7A is an illustration of an example avatar 700 for 3-D navigation according to one or more embodiments of this disclosure. The avatar 700 of FIG. 7A may appear in front of a vehicle and appear to fly, glide, move, maneuver, etc. around elements, obstructions, traffic, road conditions, etc. FIG. 7B is an illustration of an example avatar(s) 710 for 3-D navigation according to one or more embodiments of this disclosure. The avatar(s) 710 of FIG. 7B are shown from an elevated view, such as a birds-eye view slightly behind the avatars(s) 710. As illustrated, one or more of the avatars 710 may be projected on one or more different focal planes or target positions, thereby providing the perception that a driver or occupant is following a real vehicle.

Figure 8A:
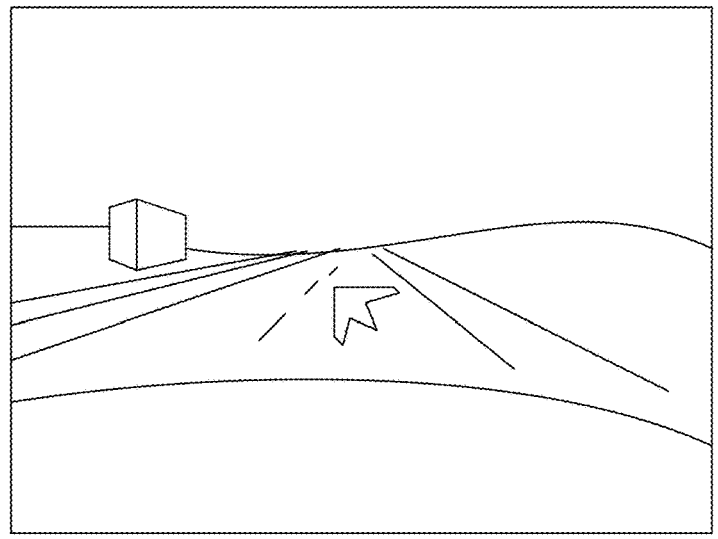
FIG. 8A is an illustration of an example avatar for 3-D navigation according to one or more embodiments of this disclosure.
Figure 8B:
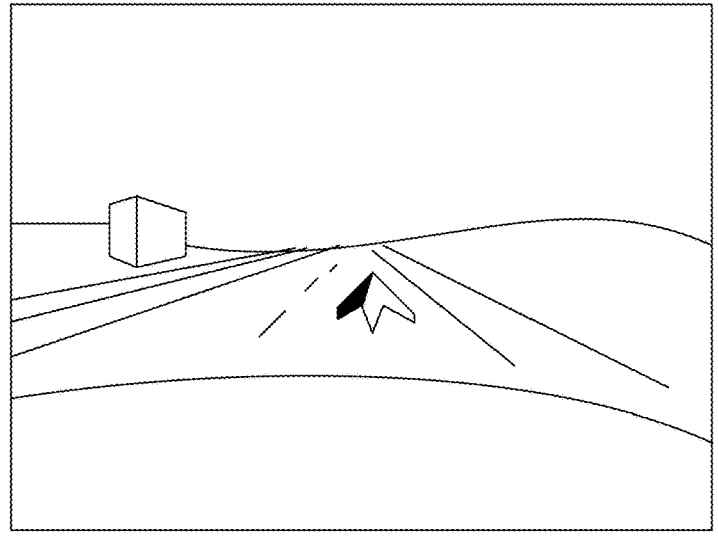
FIG. 8B is an illustration of an example avatar for 3-D navigation according to one or more embodiments of this disclosure.

FIG. 8A is an illustration of an example avatar 800 for 3-D navigation according to one or more embodiments of this disclosure. The avatar 800 of FIG. 8A is illustrated as rotated counterclockwise to indicate a left turn. FIG. 8B is an illustration of an example avatar 810 for 3-D navigation according to one or more embodiments of this disclosure. In an example, the avatar 810 of FIG. 8B may indicate a left turn by blinking, flashing, changing color, etc. For example, the left wing of the paper airplane avatar 810 may glow or change in intensity to indicate the upcoming left turn. In one or more embodiments, an avatar may be projected on focal planes closer to the vehicle such that it appears that the avatar is 'slowing down' prior to making a turn.

Figure 9A:
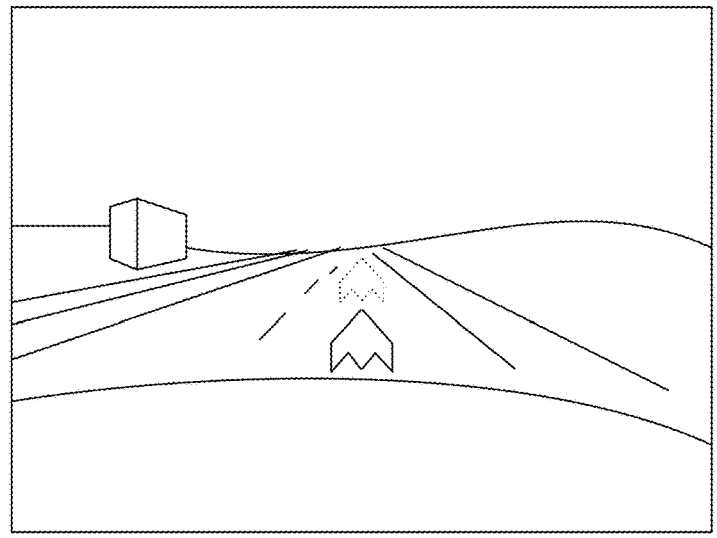
FIG. 9A is an illustration of an example avatar for 3-D navigation according to one or more embodiments of this disclosure.
Figure 9B:
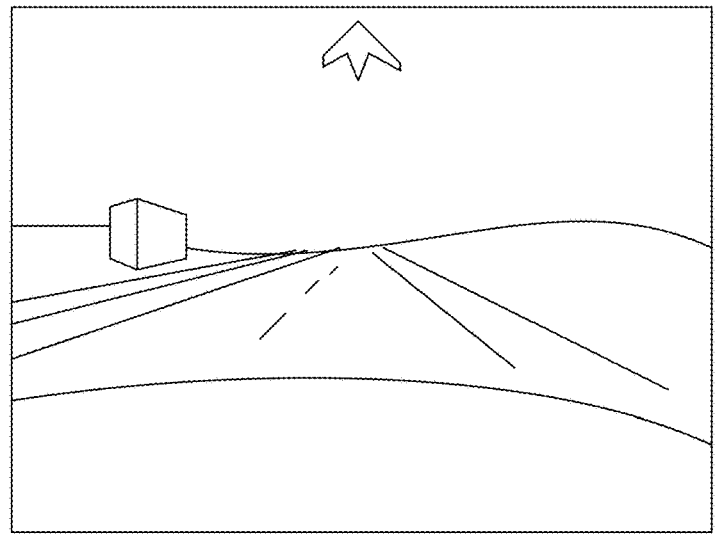
FIG. 9B is an illustration of an example avatar for 3-D navigation according to one or more embodiments of this disclosure.

FIG. 9A is an illustration of an example avatar 900 for 3-D navigation according to one or more embodiments of this disclosure. FIG. 9B is an illustration of an example avatar 910 for 3-D navigation according to one or more embodiments of this disclosure. The avatar 900 of FIG. 9A may be projected as a navigation instruction for a driver of a vehicle to slow down, for example. In FIG. 9B, the avatar 910 is illustrated as being projected above the horizon or a sky plane. Thus, the avatar 910 does not obstruct the driver or occupant from viewing one or more portions of the environment around the vehicle.

FIG. 10 through FIG. 20 are now described with reference to one or more of the previous figures, such as the system 500 for 3-D navigation of FIG. 5 or the side view 300 or focal planes of FIG. 3.

FIG. 10A is an illustration of an example scenario 1000 associated with 3-D navigation according to one or more embodiments of this disclosure. In FIG. 10A, an occupant, driver, passenger, operator, etc. of a vehicle may provide a command to one or more components of the vehicle, such as the sensor component 570 of FIG. 5. In one or more embodiments, the sensor component 570 may include one or more peripheral components, one or more peripherals, one or more interfaces, one or more interface components, such as a touch screen, a keyboard, one or more buttons, an interface, a microphone, one or more image capture devices, gesture recognition device, etc. For example, a vehicle may be equipped with a touch screen interface or buttons on a dashboard may be utilized to interface with a menu. One or more components or the sensor component 570 may capture or receive commands given or provided by an occupant of a vehicle.

For example, a driver may communicate navigation commands to the vehicle, such as "How do I get to downtown Sunnyvale?" In this example, the sensor component 570 may include a microphone, which receives the verbal or spoken request from the occupant or driver and passes the request to a controller area network 580 to a controller component 104 or a navigation component 540. In other embodiments, if a mobile device is communicatively coupled with a vehicle, an occupant may utilize a microphone of the mobile device, a touch screen of the mobile device, a keyboard or keypad of the mobile device, etc. to interface with the system 500 for 3-D navigation. The controller component 104 may perform voice recognition on the request by utilizing an on-board speech recognition module to convert the request from speech to text (STT). According to some embodiments, the navigation component 540 may utilize a telematics channel to communicate with a remote server where STT processing may be performed.

In one or more embodiments, the HUD component (such as the HUD component or system 100 of FIG. 1 or the HUD component 100 of FIG. 5) may project, present, render, or display confirmation of a request or a command. For example, the HUD component 100 may operate as a display component or may supplement other display components for a vehicle. Continuing with the "How do I get to downtown Sunnyvale?" example in FIG. 10A, when a command or a request is received by the controller component 104, the controller component 104 may determine whether or not to project confirmation of the request based on environment information provided or detected by the sensor component 570. In this example, the sensor component 570 does not detect moving vehicles, pedestrians, or other obstacles, therefore, the controller component 104 may make a determination that a confirmation of the request should be projected by the HUD component 100. Additionally, the controller component 104 may determine a size, a shape, a model, a transparency, a color scheme, a height, a width, a depth, a target position, a focal plane, etc. for a corresponding graphic element. A confirmation of the request may be projected by the HUD component 100 in a text box, as illustrated at 1004.

In one or more embodiments, the controller 104 may command the HUD component 100 to project a graphic element as an avatar 1002, which may appear as a guide icon. In FIG. 10A, the graphic element may be projected as an avatar 1002 having a shape or appearance of an airplane, which glides along a route slightly ahead of a driver or occupant of the vehicle. To facilitate awareness, the controller component 104 may instruct the HUD component 100 to animate the avatar 1002 such that the avatar 1002 hovers or is constantly in motion. For example, to make the avatar 1002 easier to see, the controller component 104 may instruct the HUD component 100 associate the avatar 1002 with motion on a periodic basis or other basis. For example, the HUD component 100 may project the avatar 1002 to appear as if the avatar 1002 is floating in water, bobbing, hovering, etc. Thus, driver awareness may be increased.

FIG. 10B is an illustration of an example scenario 1010 associated with 3-D navigation according to one or more embodiments of this disclosure. When a request or a command, such as a navigation command, is received by the controller component 104, the controller component 104 may forward the request or command to the appropriate component or module. In this example, the controller component 104 may identify the request or command as a navigation command and pass the navigation command along to the navigation component 540. Accordingly, the navigation component 540 may determine an origin location for the vehicle (e.g., a current location, a future start location), the destination location, and calculate a route from the origin location to the destination location. As discussed herein, the route may include one or more route portions along one or more road segments and/or one or more navigation actions or maneuvers.

The navigation component 540 may provide the route, route portions, and/or route information to the controller component 104, which may determine whether or not and/or how to render the route information. For example, in FIG. 10B, the vehicle is not in motion (e.g., in park) or is travelling at a low velocity (e.g., below a velocity threshold detected or provided across the controller area network 580). Therefore, the controller component 104 may determine that a high-level view 1030 of the route may be appropriate for the HUD component 100 to project or output. Accordingly, the controller component 104 may instruct the HUD component project the high-level view 103, which occupies a larger area within the environment. For example, the controller may determine a size for a graphic element or whether or not to project the graphic element based on a velocity of the vehicle. Conversely, if the vehicle is in motion or travelling above a threshold velocity, the controller component 104 may make a determination that a smaller version be projected or that the HUD component 100 not project the high-level view 1030 at that time.

As illustrated in FIG. 10B, the HUD component 100 may project a high-level view 1030 of a map, which includes a route 1032 from an origin location to a destination location along one or more road segments. The HUD component 100 may project a compass 1034, road segment identifiers 1036, traffic information, estimated arrival times, estimated travel times, a current location of the vehicle, etc. In one or more embodiments, the HUD component 100 may project different aspects of the high-level view 1030 utilizing one or more color schemes. For example, the HUD component 100 may project the route such that the route 1032 is rendered utilizing a first color and other road segments, such as the road segment identified at 1036, are rendered utilizing a second color.

In one or more embodiments, the sensor component 570 may include image capture devices or other sensors, which aid in determination of a color palette or color scheme for display or projection of graphical elements. For example, in FIG. 10B, there are one or more trees in the background or in the environment, which may make green more difficult to see or visualize. Accordingly, the controller component 104 may select a color scheme for projection of one or more graphical elements. The color scheme may utilize colors which contrast green, such as yellow, for example. As another example, during the daytime, the sky may be sensed to be blue by the sensor component 570, while at night the sky may appear black. The sensor component 570 may receive, capture, sense, or detect color information associated with the environment, which may be utilized for contrast of graphic elements. The controller component 104 may utilize this information to determine colors for which the HUD component 100 may project one or more graphic elements. For example, the controller component 104 may determine that red is an option during the daytime while blue is an option at nighttime. The controller component may determine color schemes or a color for a graphic element or avatar based on a time of day or color information associated with the environment (e.g., received or detected by the sensor component 570).

In one or more embodiments, the HUD component 100 may animate one or more aspects of the high-level view 1030. For example, the HUD component 100 may animate the route 1032 along one or more road segments as if the route 1032 was being drawn from the origin location to the destination location with one continuous pen stroke. For example, the HUD component 100 may render animation that represents travel along the route in a snake-like fashion from the origin location to the destination location.

The HUD component 100 may project graphic elements or avatars, such as the avatar 1002 of FIG. 10A using different camera angles, camera perspectives, or different views. Further, the HUD component 100 may shift or transition between these views in an animated or gradual fashion. For example, the HUD component 100 may shift the camera perspective or the camera angle from a birds-eye-view, such as the high-level view 1030 of FIG. 10B to a first-person view or third person view, as illustrated in FIG. 10A. For example, the HUD component 100 may gradually adjust the camera perspective to zoom in or fly in from a birds-eye-view, layout view, overhead view, zoomed-out view, or third-person view to a zoomed-in view, first-person view, street-level view, etc.

Figure 11A:
FIG. 11A is an illustration of an example scenario associated with 3-D navigation according to one or more embodiments of this disclosure.

For example, the HUD component 100 may utilize a camera perspective or a camera angle which appears to finish zooming or transitioning at a street-level view which coincides with the real world-view. This real world-view may be the same view of the environment which an occupant or driver would have sitting in his or her vehicle looking out through the windshield into the real world. For example, the street-level view may be a view an occupant has while within an eye box and while facing/looking in a forward direction through a windshield of the vehicle. The zoom animation or transition may result in a rendering of an avatar or graphic element in view of the driver, such as the avatar 1002 of FIG. 10A. FIG. 11A is an illustration of an example scenario 1100 associated with 3-D navigation according to one or more embodiments of this disclosure. The view of the avatar 1002 provided in this example scenario 1100 is a transitional view that is between the birds-eye-view or high-level view 1030 of FIG. 10B and the third-person view in FIG. 10A.

In one or more embodiments, the HUD component 100 may provide a zoom animation in reverse order (e.g., from third-person view to birds-eye-view) when an occupant requests a view of a map or when the occupant initiates a map view command. In this scenario, the HUD component 100 may project a third-person view of an avatar (e.g., 1002 of FIG. 10A) and zoom out or fly away to a bird-eye-view (e.g., high-level view 1030 of FIG. 10B). Further, the HUD component 100 may adjust an orientation of the route, map, or view based on a direction or bearing of the vehicle. For example, the HUD component 100 may orient the map or view such that the direction of travel along a current road segment appears to be up or forward, for example.

Figure 11B:
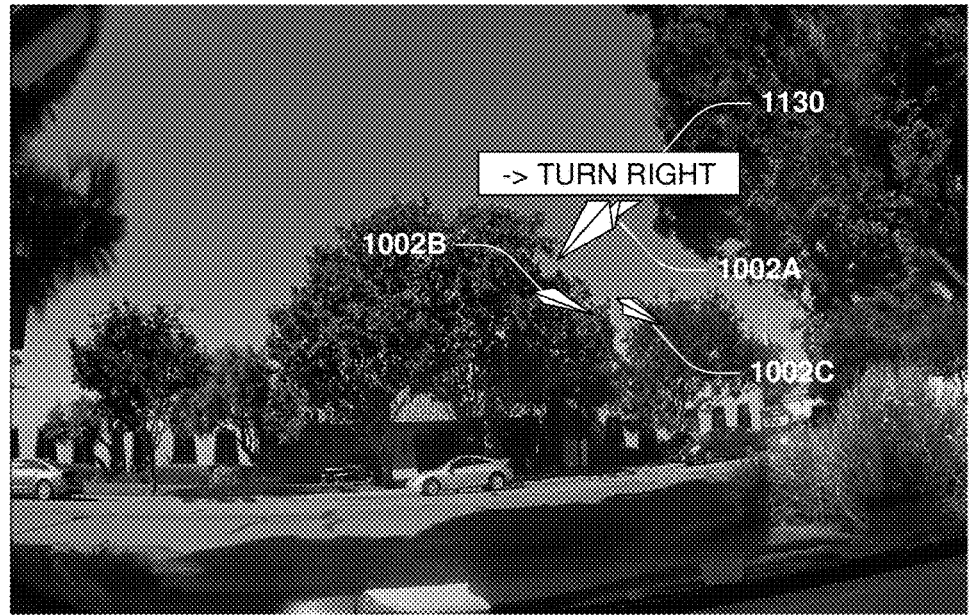
FIG. 11B is an illustration of an example scenario associated with 3-D navigation according to one or more embodiments of this disclosure.

FIG. 11B is an illustration of an example scenario 1110 associated with 3-D navigation according to one or more embodiments of this disclosure. The HUD component 100 may provide navigation instructions and/or suggested navigation maneuvers to a driver of a vehicle. For example, the navigation component 540 may generate a list of navigation instructions for a route from an origin location to a destination location. The controller component 104 may instruct the HUD component 100 to output respective navigation instructions in the environment, such as at 1130, for example. Navigation instructions may include directions for a driver, such as turn right, turn left, merge right, merge left, yield, stop, slow down, speed up, accelerate, etc. Further, navigation instructions may not necessarily direct a driver to take action. For example, navigation instructions may alert a driver of a vehicle that no turns on red are permitted.

In one or more embodiments, the controller component 104 may utilize a color scheme or instruct the HUD component 100 project one or more of the graphic elements or avatars utilizing different colors to represent one or more navigation actions. For example, when the HUD component 100 projects an avatar, such as avatar 1002A, 1002B, or 1002C of FIG. 11B as green, this may indicate that no objects, obstacles, or oncoming traffic are detected by the sensor component 570. As another example, the HUD component 100 may project one or more of the avatars 1002A, 1002B, or 1002C as red to indicate to the driver that it is not yet safe to make the turn. Thus, the HUD component 100 may project a "yield" as a navigation instruction rather than "turn right," for example.

As illustrated in FIG. 11B, the HUD component 100 may project multiple avatars 1002A, 1002B, and 1002C. In this example, the avatar 1002A may be projected on a first focal plane, the avatar 1002B may be projected on a second focal plane, and the avatar 1002C may be projected on a third focal plane. The first focal plane is closest to the vehicle, followed by the second focal plane, then the third focal plane, thereby giving the appearance that avatar 1002C is the farthest away from the vehicle. Since the HUD component 100 is capable of projecting multiple avatars 1002A, 1002B, and 1002C on different focal planes, this enables the system 500 for 3-D navigation to provide a projected route, path, or predetermined route for a driver to follow.

In one or more embodiments, the HUD component 100 may project one or more of the avatars 1002A, 1002B, or 1002C such that respective avatars maintain focal planes which are static relative to the current position of the vehicle. The HUD component 100 may project avatars or graphic elements such that the distance between the vehicle and focal planes for respective avatars decreases as the vehicle 'approaches' an avatar. For example, the HUD component 100 may project an avatar, such as one of 1002A, 1002B, or 1002C as a stationary object relative to the vehicle, thereby making it appear to a driver or occupant that an avatar ahead of the vehicle at one time is being passed or waits for the vehicle to 'catch-up' at a later time. In these embodiments, the HUD component 100 may project additional avatars as a route progresses and an individual or driver of a vehicle 'passes' the stationary or static avatars.

In one or more other embodiments, the HUD component 100 may project one or more of the avatars 1002A, 1002B, or 1002C such that respective avatars have focal planes which are dynamically adjusted as to the current position of the vehicle or have a constant or fixed distance from the vehicle. For example, the HUD component may project avatars or graphic elements such that the distance between the vehicle and focal planes for respective avatars remains constant as the vehicle moves. The HUD component may project avatars as stationary objects, which appear to move along with the vehicle. In one or more embodiments, the HUD component 100 may transition between projecting avatars as stationary objects relative to the vehicle and projecting avatars as objects which appear to move with the vehicle.

The HUD component 100 may project any one of a plurality of graphic elements or avatars as an animation by adjusting focal planes on which to project one or more of the graphic elements or avatars. As an example, positioning of avatars 1002A, 1002B, and 1002C may be achieved by expanding a single avatar, such as the avatar 1002 of FIG. 11A or FIG. 10A. For example, one or more avatars (or graphic elements) may be expanded from a first avatar and respective avatars may be collapsed into a single avatar. The HUD component 100 may cause multiple avatars to appear to fly-out, separate, advance, or be projected ahead of a first avatar to facilitate animation of route navigation and/or navigation instructions, for example.

In one or more embodiments, the HUD component 100 may project one or more graphic elements as pointers, which may alert a driver or an occupant of a vehicle of one or more objects, obstacles, road conditions, etc. The controller component 104 may select a pointer type based on a velocity of the vehicle and/or a velocity of an object. For example, if the vehicle is stationary, oncoming traffic (e.g., or other objects) may be identified by projecting a graphic element which rotates in a manner which points to the traffic, hazard, or moving object while the object approaches the vehicle or departs away from the vehicle.

Figure 12A:
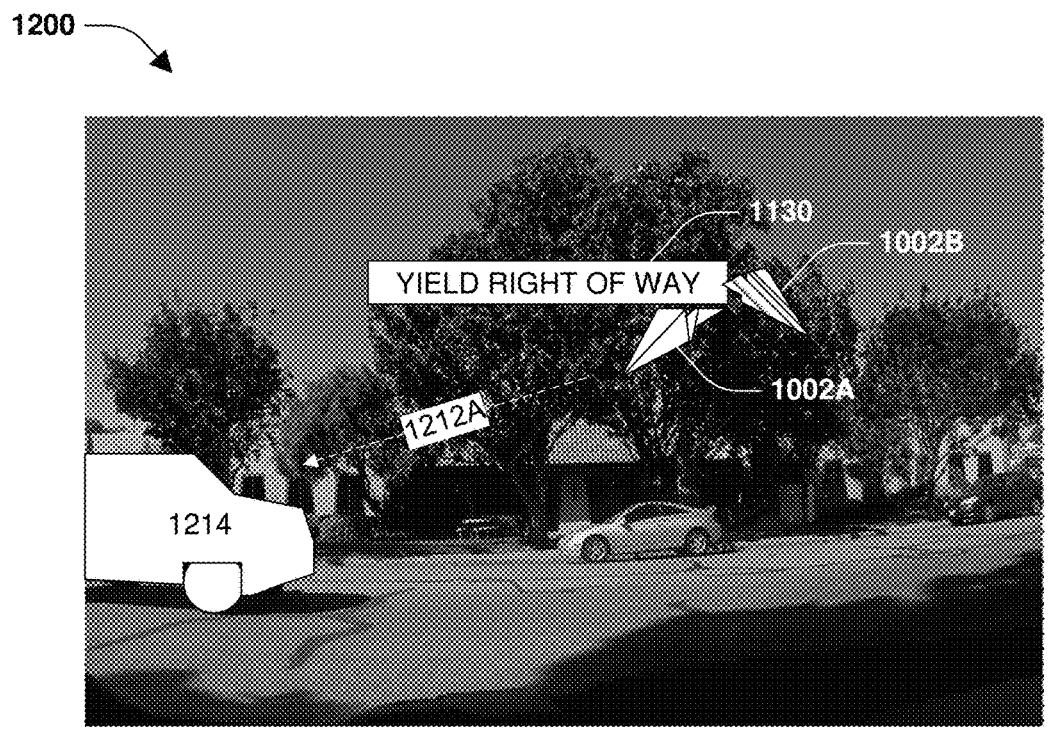
FIG. 12A is an illustration of an example scenario associated with 3-D navigation according to one or more embodiments of this disclosure.

FIG. 12A is an illustration of an example scenario 1200 associated with 3-D navigation according to one or more embodiments of this disclosure. The sensor component 570 may detect passing traffic or another vehicle 1214. In this example, since the trajectory or path of the other vehicle 1214 is on a collision course with the suggested navigation action indicated by avatar 1002B, the controller component 104 may instruct the HUD component 100 to project navigation instructions that alert the driver that he or she should yield at 1130. For example, the sensor component 570 may track the location of the other vehicle 1214. This information may be transmitted to the controller component 104, which may determine that pointer graphic element should be projected by the HUD component 100 at 1002A. The HUD component 100 may thus project (e.g., output) the pointer graphic element 1002A such that it tracks or follows 1212A the other vehicle 1214.

Figure 12B:
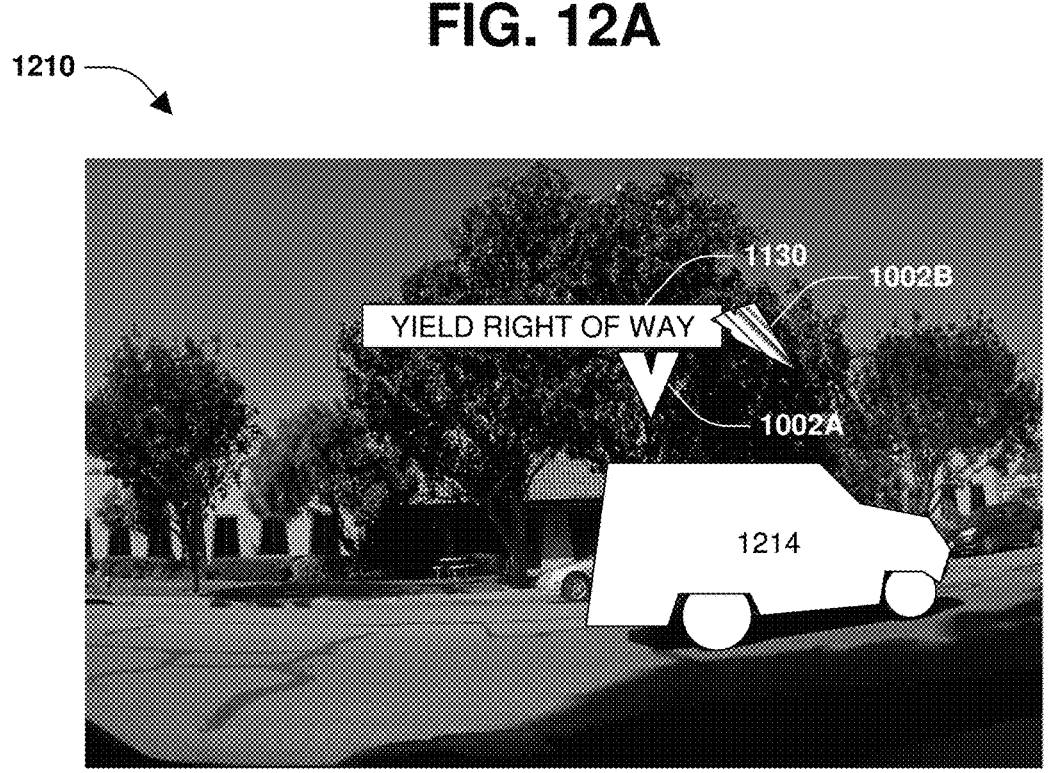
FIG. 12B is an illustration of an example scenario associated with 3-D navigation according to one or more embodiments of this disclosure.

FIG. 12B is an illustration of an example scenario 1210 associated with 3-D navigation according to one or more embodiments of this disclosure. Continuing with the example from FIG. 12A, as illustrated, the other vehicle 1214 has passed the vehicle, which was stationary. The HUD component 100 may continue to project the yield navigation instruction 1130 and the next navigation instruction or action (e.g., turn right) at 1002B. In this case, the sensor 570 component may detect the other vehicle 1214 and the HUD component 100 may project the avatar 1002B in a corresponding color, such as red. The controller component 104 may select a color for a graphic element to be projected by the HUD component 100 based on object information and/or environment information (e.g., collected or detected by the sensor component 570). The pointer 1002A of FIG. 12B may continue pointing or tracking the other vehicle 1214 by rotating along a z-axis in a manner corresponding to a tracked object. Thus, the controller component 104 may adjust a yaw of the pointer graphic element 1002A.

Figure 13A:
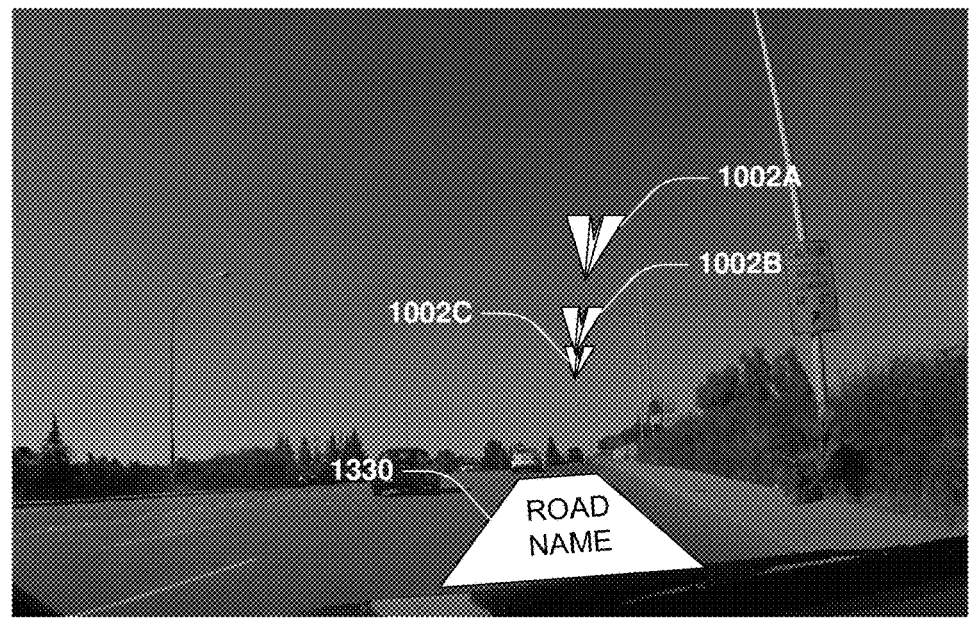
FIG. 13A is an illustration of an example scenario associated with 3-D navigation according to one or more embodiments of this disclosure.

FIG. 13A is an illustration of an example scenario 1300 associated with 3-D navigation according to one or more embodiments of this disclosure. While an individual or driver is driving a vehicle, the navigation component 540 may determine a current location of a vehicle and/or corresponding coordinates. Utilizing this information, the navigation component 540 or controller component 104 may determine a name of a road and instruct the HUD component 100 to project the road name on a focal plane corresponding to a surface of the road or road segment, as illustrated at 1330. As discussed herein, projection of the graphic element on the road surface may be performed in a manner that appears stationary with respect to the vehicle or in a manner that appears to move with the vehicle. In one or more embodiments, the HUD component 100 may project the road name 1330 in response to a query from an occupant of the vehicle, such as "What road am I on?", for example. Additionally, other graphic elements, information, or highlighting may be projected on landmarks, objects, etc.

Figure 13B:
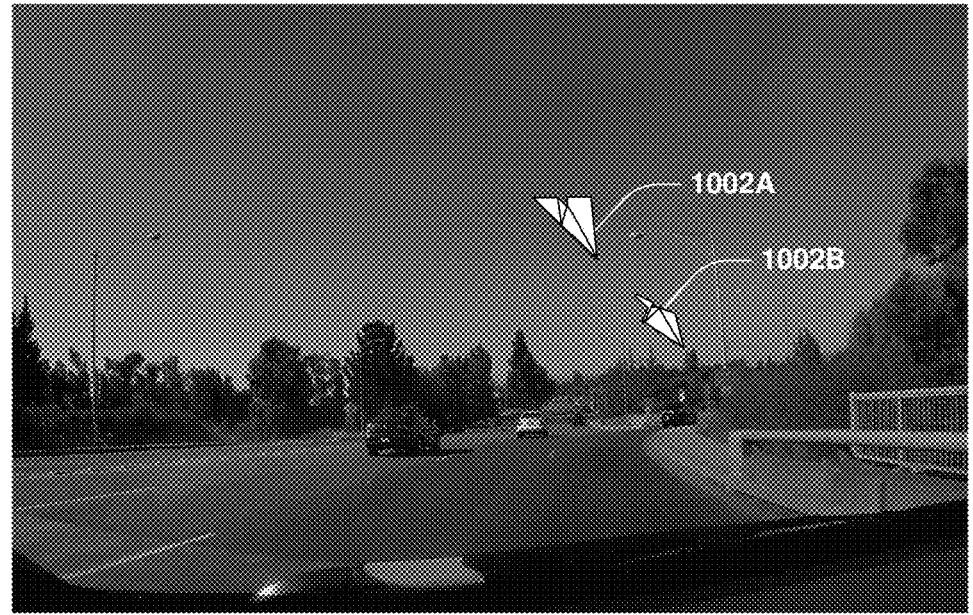
FIG. 13B is an illustration of an example scenario associated with 3-D navigation according to one or more embodiments of this disclosure.

In FIG. 13A, multiple graphic elements or avatars are projected by the HUD component 100 and may be animated, collapsed, expanded, etc. as discussed herein. Thus, avatars 1002A, 1002B, and 1002C may be provided to guide a driver of a vehicle or other occupants along a route to a destination. FIG. 13B is an illustration of an example scenario 1310 associated with 3-D navigation according to one or more embodiments of this disclosure. As illustrated, avatars 1002A and 1002B are projected with varying pitch angles, roll angles, or yaw angles. The controller component 104 may select or adjust a pitch, a roll, or a yaw angle for an avatar or a graphic element based on various considerations. Such considerations include, a trajectory of a path, a radius of an upcoming turn, a current velocity of a vehicle, a speed limit associated with an upcoming turn, suggested navigation action, information from the environment, distance until next navigation instruction or action, etc.

In this example, a proposed route has the vehicle taking an upcoming exit ramp with a circular road pattern or road segment, therefore, the controller component 104 may instruct the HUD component to project avatar 1002B with a greater roll angle or yaw angle than avatar 1002A, thereby providing a perception that there is an upcoming right turn. Additionally, the controller component 104 may select a shorter distance between the focal planes for avatars 1002A and 1002B to indicate a tightness of a turn. In other embodiments, the controller component 104 may select a color (such as yellow or orange) for one or more of the avatars to indicate an upcoming turn and/or a corresponding reason for a driver to slow down, for example.

Figure 14A:
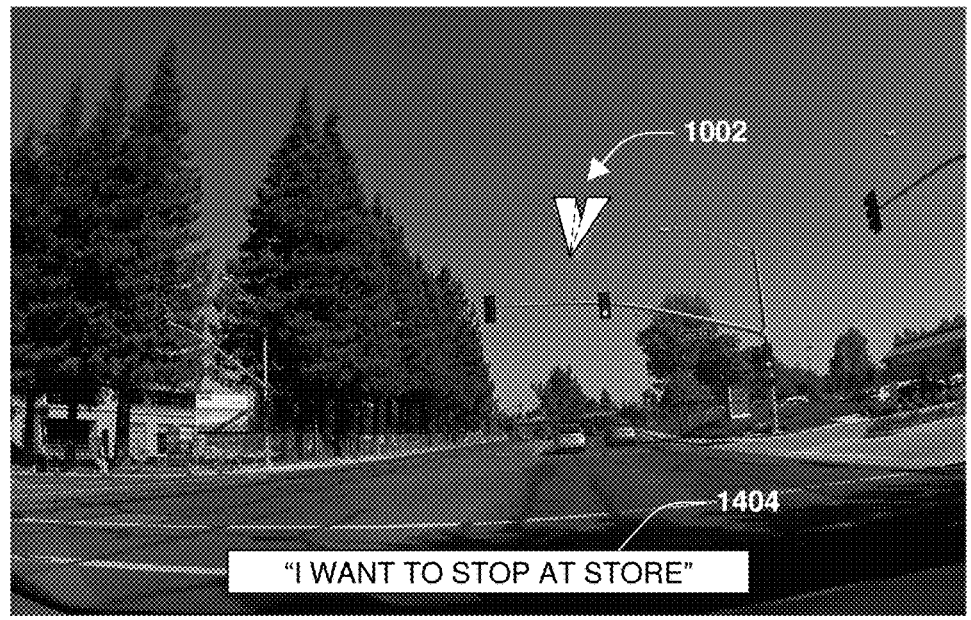
FIG. 14A is an illustration of an example scenario associated with 3-D navigation according to one or more embodiments of this disclosure.

FIG. 14A is an illustration of an example scenario 1400 associated with 3-D navigation according to one or more embodiments of this disclosure. A driver or occupant may provide the system 500 for 3-D navigation with a request or a command while engaged in navigation from an origin location to a destination location. The navigation component 540 may support addition of one or more waypoints between the origin location and the destination location such that navigation to the destination location is not interrupted in a manner which requires re-setting (or reconfiguring) the navigation to the destination location. For example, when a waypoint is inserted, the navigation component 540 may calculate a revised route from a current location of the vehicle to the waypoint and from the waypoint to the destination location (which was previously determined).

In FIG. 14A, navigation from an origin location to a destination location is ongoing, as indicated by the avatar 1002, which is directing the driver of the vehicle to continue straight through the current intersection. At 1404, confirmation of the request or command may be projected in a text box. In one or more embodiments, the controller component 104 may not instruct the HUD component 100 project the text box 1404. For example, the text box 1404 may not be provided when multiple obstacles are detected by sensor component 570, when the vehicle is travelling over a threshold velocity, or based on user preferences, for example.

In one or more embodiments, the system 500 may interface with one or more additional components, servers, other systems, such as a mobile device or remote servers to determine one or more of the waypoints. For example, a driver may request the system 500 to "take me to the nearest gas station", "the cheapest gas station nearby," or "a gas station on my way home". According to these requests, the controller component 104 may interface with the navigation component 540 to determine a current location for the vehicle, a destination location, a route between the current location and the destination location, a gas price application, such as an application on a mobile device, etc. to determine pricing, location, or other criteria.

Figure 14B:
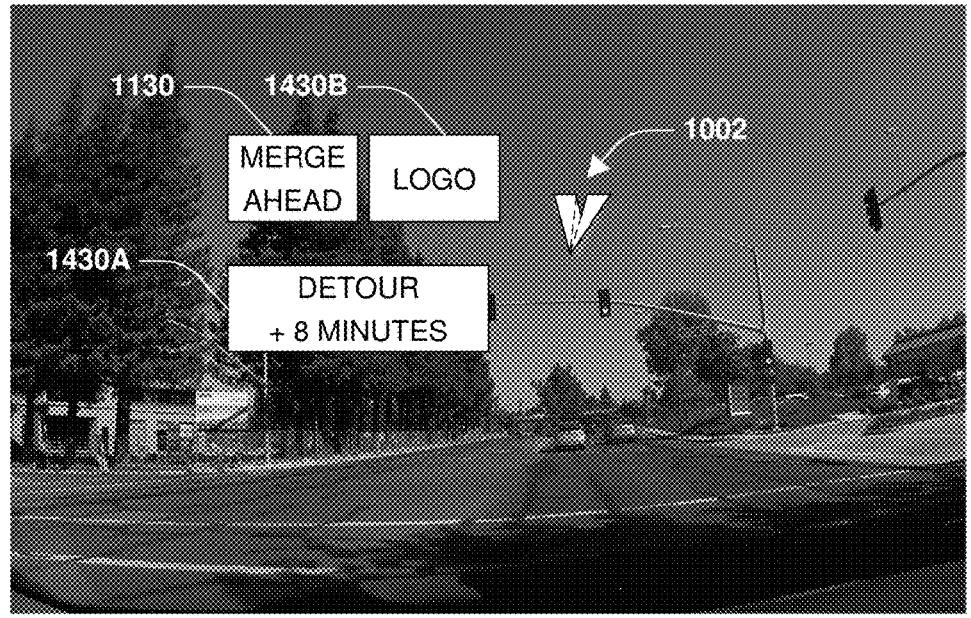
FIG. 14B is an illustration of an example scenario associated with 3-D navigation according to one or more embodiments of this disclosure.

FIG. 14B is an illustration of an example scenario 1410 associated with 3-D navigation according to one or more embodiments of this disclosure. The controller component 104 may determine a location of a waypoint or select an appropriate waypoint from one or more available waypoints in conjunction with the navigation component 540. The navigation component 540 may calculate or reroute the vehicle to the waypoint as a current destination location and set the previous destination location as the next destination location. Further, the navigation component 540 may calculate additional travel time associated with the waypoint. The HUD component 100 may project this information (e.g., detour which will add approximately eight minutes extra drive time) in text box 1430A, for example.

As discussed herein, the HUD component 100 may provide or project navigation instructions 1130 and at least one avatar 1002 on one or more focal planes in the environment. Further, the navigation component 540 may utilize a telematics channel to receive or download metadata or information associated with a waypoint or destination. For example, the navigation component 540 may receive a logo associated with the waypoint, such as a logo for a store or a gas station, etc. The HUD component 100 may project or output this logo or other related information at 1430B. Further, the HUD component 100 may animate one or more aspects, such as by folding the logo 1430B into a plane shape or otherwise transforming the logo 1430B into the avatar 1002 or other graphical element. The HUD component 100 may animate, transform, transition, etc. a graphical element into another graphical element.

Figure 15:
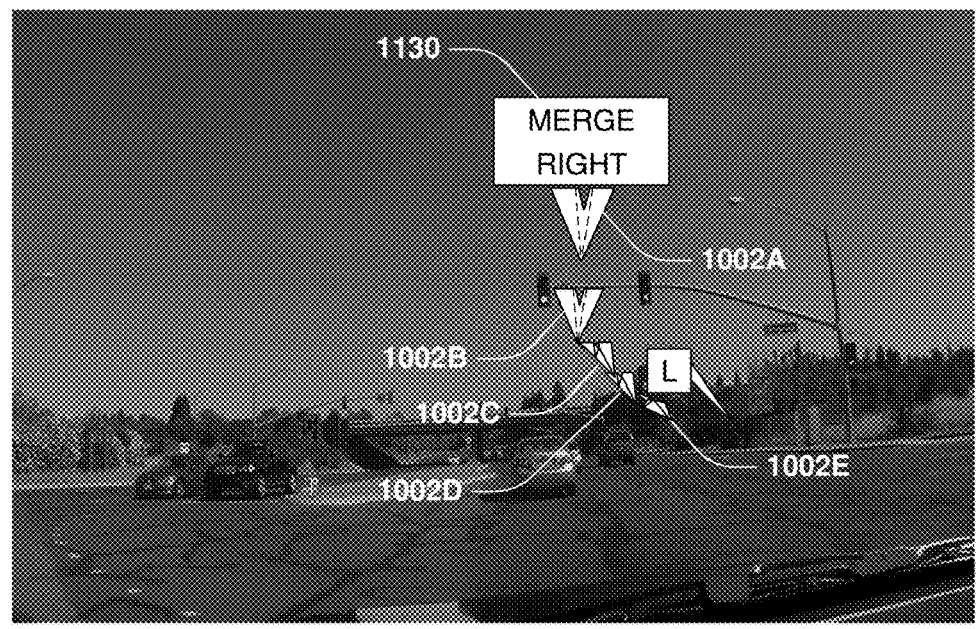
FIG. 15 is an illustration of an example scenario associated with 3-D navigation according to one or more embodiments of this disclosure.

FIG. 15 is an illustration of an example scenario 1500 associated with 3-D navigation according to one or more embodiments of this disclosure. The HUD component 100 may project navigation instructions in a text box 1130 and one or more avatars 1002A, 1002B, 1002C, 1002D, 1002E, etc. Additionally, the HUD component 100 may emphasize a route or path provided by respective avatars 1002A, 1002B, 1002C, 1002D, or 1002E by sequentially flashing the avatars, for example. The HUD component 100 may project one or more of the avatars 1002A, 1002B, 1002C, 1002D, or 1002E such that the avatars appear to navigate, drive, or move around objects detected by the sensor component 570. The object may include hazards, road conditions, other vehicles, and so on. The logo 1430B of FIG. 14B may be animated to appear to shrink to an icon sized logo "L", as illustrated in FIG. 15. For example, the controller component 104 may determine a time period for the logo 1430B to be displayed at a first size or at full size. After expiration of the time period, the HUD component 100 may project the logo "L" at a smaller size, icon size, or a second size. The controller component 104 may determine the time period for the logo based on the distance to the corresponding object (e.g., restaurant, store, landmark, etc.), for example.

Figure 16A:
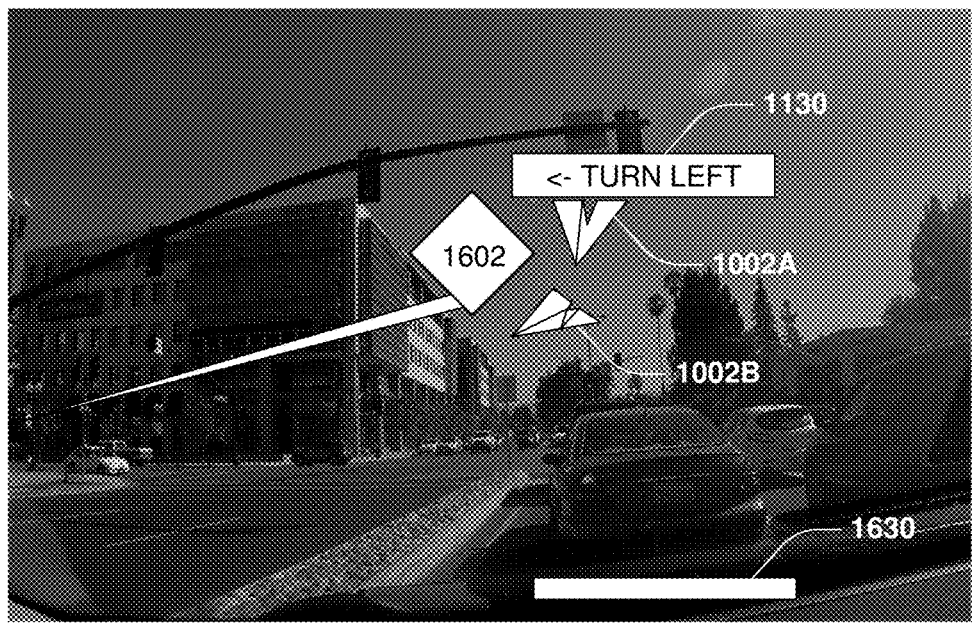
FIG. 16A is an illustration of an example scenario associated with 3-D navigation according to one or more embodiments of this disclosure.

In one or more embodiments, early warning detection may be provided for one or more obstacles or objects not yet in view or range of an occupant of a vehicle when the occupant is looking out of the front of the vehicle through the windshield. FIG. 16A is an illustration of an example scenario 1600 associated with 3-D navigation according to one or more embodiments of this disclosure. In this example, traffic condition information may be received by the vehicle control component 180 for one or more traffic conditions along a route on which a vehicle is travelling, or is anticipated to travel. The vehicle control component 180 may receive traffic condition information indicative of construction along one or more route portions of a route ahead of the vehicle. For example, construction may be occurring along a road segment on which the vehicle will travel if navigation instructions are followed. Thus, occurrence of this construction may be received by the vehicle control component 180 prior to the vehicle arriving at the construction.

The HUD component 100 may project navigation instructions 1130, which may include text, arrows, blinking arrows, and so forth. Additionally or alternatively, avatars 1002A and 1002B may be projected. In one or more embodiments, the controller component 104 may determine a stopping point or line where it is suggested to stop the vehicle. For example, the controller 104 may determine the stopping point based on a position of another vehicle, obstacles in the environment, other environment information, etc. The controller component 104 may instruct the HUD component 100 project this information as a horizontal line 1630 to promote safe driving, for example. In other embodiments, the HUD component 100 may project a vertical line or other graphical element, which may be indicative of a safe following distance between the driver's vehicle and another vehicle ahead, for example.

Accordingly, the controller component 104 may identify this obstacle (e.g., object) or traffic condition and cause the HUD component 100 to project an advance notification or early warning graphic element 1602. This enables the system 500 to alert a driver or occupant of a vehicle of one or more objects, hazards, obstacles, traffic conditions, etc. even when respective objects are not directly visible when viewed or looking out of the windshield (or other window) of the vehicle.

Figure 16B:
FIG. 16B is an illustration of an example scenario associated with 3-D navigation according to one or more embodiments of this disclosure.

FIG. 16B is an illustration of an example scenario 1610 associated with 3-D navigation according to one or more embodiments of this disclosure. As illustrated in FIG. 16B, the traffic condition or obstruction associated with 1602 is ahead in the distance, and may not be apparent to a driver of a vehicle. Accordingly, the HUD component 100 may identify the hazard, construction, or object (e.g., received by the vehicle control component 180) by projecting an advance notification graphic element 1602 which points to and identifies the construction relative to the vehicle. For example, in FIG. 16A the construction is on the left side of the vehicle, thus, the pointer or tail associated with the advance notification graphic element 1602 may point outside of the windshield viewing area. This may alter a driver or other occupant of the vehicle that construction is ahead.

The controller component 104 may determine one or more target positions and update or adjust a target position for one or more of the graphic elements projected by the HUD component 100. For example, the controller component 104 may select or determine a target position for the advance notice graphic element 1602 based on a distance of the vehicle from the object associated with or pointed at by the advance notice graphic element 1602. Thus, the controller component 104 may determine that the construction (e.g., object) associated with the advance notice graphic element 1602 is greater than a threshold distance away from the vehicle. For example, the navigation component 540 may be utilized to determine a current GPS position for the vehicle and compare the position with coordinates for the construction provided by the vehicle control component 180. If the construction is determined to be greater than the threshold distance, the HUD component 100 may project the advance notice graphic element 1602 in the sky. For example, the HUD component 100 may utilize a pointer having a length greater than a threshold length, rather than projecting a graphic element proximate, overlapping, or adjacent to the construction.

Figure 17A:
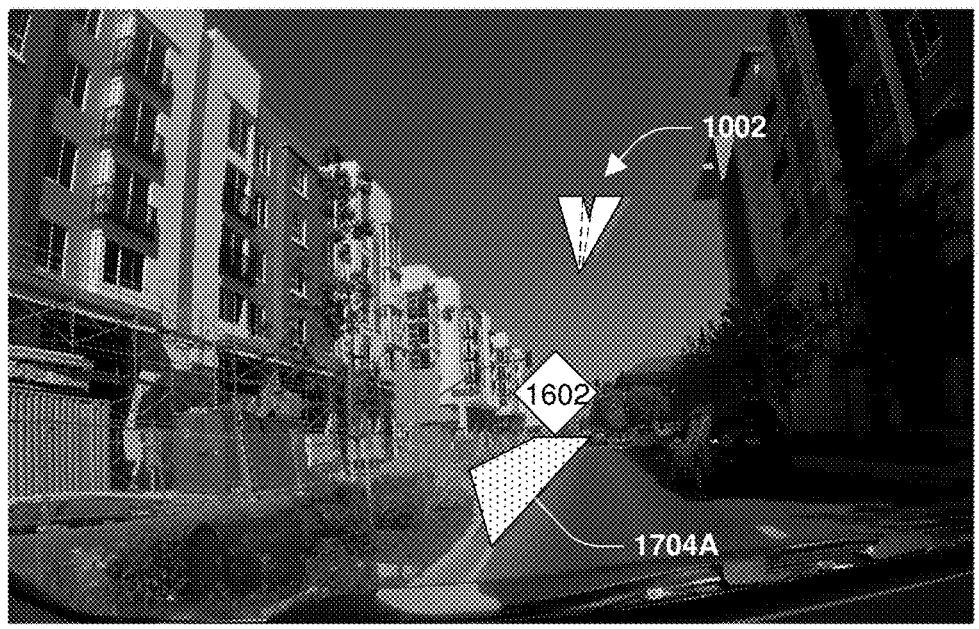
FIG. 17A is an illustration of an example scenario associated with 3-D navigation according to one or more embodiments of this disclosure.

FIG. 17A is an illustration of an example scenario 1700 associated with 3-D navigation according to one or more embodiments of this disclosure. As a vehicle approaches an object (e.g., the construction indicated by advance notice graphic element 1602), the controller component 104 may adjust the positioning or target position for the respective graphic element (e.g., 1602). Additionally, the controller component 104 may change the type of graphic element displayed. For example, as illustrated in FIG. 17A, the advance notice graphic element 1602 might not include a pointer, as previously utilized in FIG. 16A or FIG. 16B. For example, if the proximity between the vehicle and the object (e.g., construction) is less than a threshold distance, the controller component 104 may determine that the pointer may be omitted. Thus, the HUD component 100 may project the avatar 1002, the advance notice graphic element 1602, and/or a hazard graphic element 1704A.

For example, when the vehicle control component 180 or the sensor component 540 identifies an object which is a hazard, obstruction, obstacle, or is otherwise undriveable (e.g., a road segment under construction, etc.) the controller component 104 may instruct the HUD component 100 project a hazard graphic element. For example, the hazard graphic element 1704A may be projected or output in a manner that overlays the hazard. The depth buffering component 560 may facilitate inhibiting one or more portions of the hazard in the real world or environment such that the hazard is obscured from view of an occupant, operator, or driver of the vehicle. For example, the HUD component 100 may project graphic elements that are opaque or have varying degrees of transparency. When the controller component 104 determines an area, hazard, or object may not (or should not) be driven across or on, the HUD component 100 may project hazard graphic elements accordingly to "fill in" such areas.

Figure 17B:
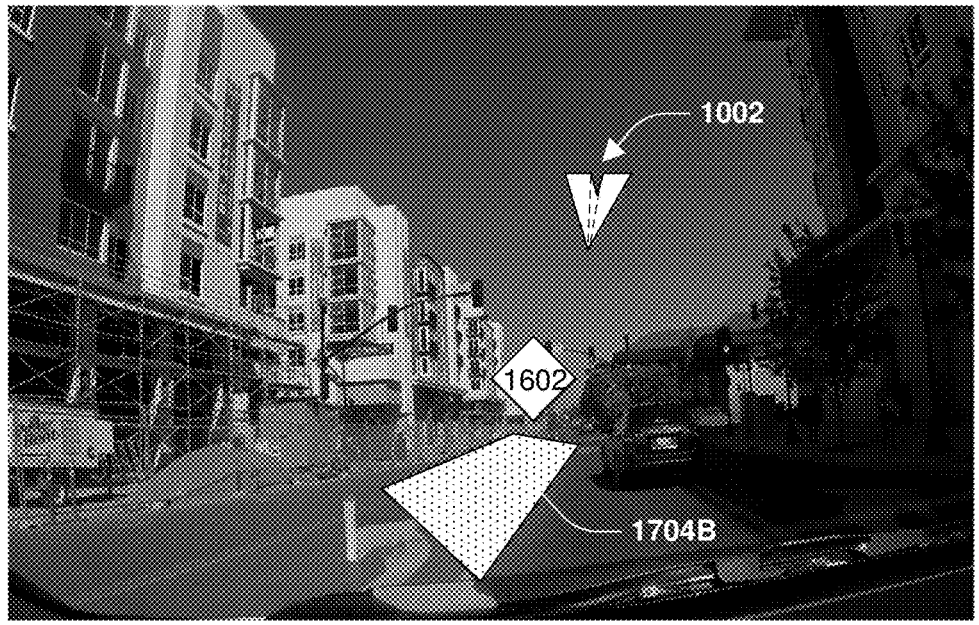
FIG. 17B is an illustration of an example scenario associated with 3-D navigation according to one or more embodiments of this disclosure.

FIG. 17B is an illustration of an example scenario 1710 associated with 3-D navigation according to one or more embodiments of this disclosure. In FIG. 17B, the vehicle has approached the hazard or construction illustrated in FIG. 17A, and the HUD component 100 has adjusted the perspective of the hazard graphic element 1704B accordingly. For example, the vehicle is closer in distance to the construction, therefore, the hazard graphic element 1704B of FIG. 17B is larger in area than the hazard graphic element 1704A of FIG. 17A. Information received from the sensor component 540 or the vehicle control component 180 related to or associated with the hazard, construction, or objects in the environment may be utilized by the controller component 104 to determine a various parameters. These parameters may include size, shape, model (e.g., guide icon, avatar, obscure, transparency, color), height, width, depth, focal plane, color, and/or target position for a graphic element, or may identify overlap between graphic elements or depth map information. These attributes may be based on object information or environment information received by the vehicle control component 180 or the sensor component 570. In one or more embodiments, the controller component 104 may select or change colors of graphic elements based on oncoming traffic, time of day, colors of objects in the environment, traffic rules, etc.

The depth map component 550 may manage or build a depth map of the environment or objects in the real-world environment around a vehicle. The controller component 104 may utilize the depth map to determine whether an object should be visible, transparent, opaque, etc. with regard to a graphic element. For example, the construction (hidden under hazard graphic element 1704A or 1704B) may include traffic barrels, traffic cones, debris, potholes, digging, undriveable road surfaces, etc. In this example, the controller component 104 has made a determination that these aspects are to be hidden under the hazard graphic elements 1704A and 1704B. However, other objects in the environment may not necessarily be hidden under or layered under the hazard graphic elements 1704A and 1704B. For example, if a pedestrian crosses through the construction, the controller component 104 may determine that the pedestrian is an object that should not be obscured. Thus, the HUD component 100 may project the hazard graphic element 1704B such that the hazard graphic element 1704B does not obscure the pedestrian from view of the driver while the pedestrian is walking 'through' the hazard graphic element 1704B. Thus, the controller component 104 may determine visibility, layering, transparency level, opaqueness level, etc. of a graphic element based on movement of an object within an environment or other data received from the sensor component 540 or the vehicle control component 180, such as identity of an object, object type, object size, etc., for example. The depth map information may be utilized by the controller component 104 or the HUD component 100 to provide an occupant, operator, or driver of a vehicle a realistic perception of one or more graphic elements with respect to the surrounding environment or the real world.

Figure 18A:
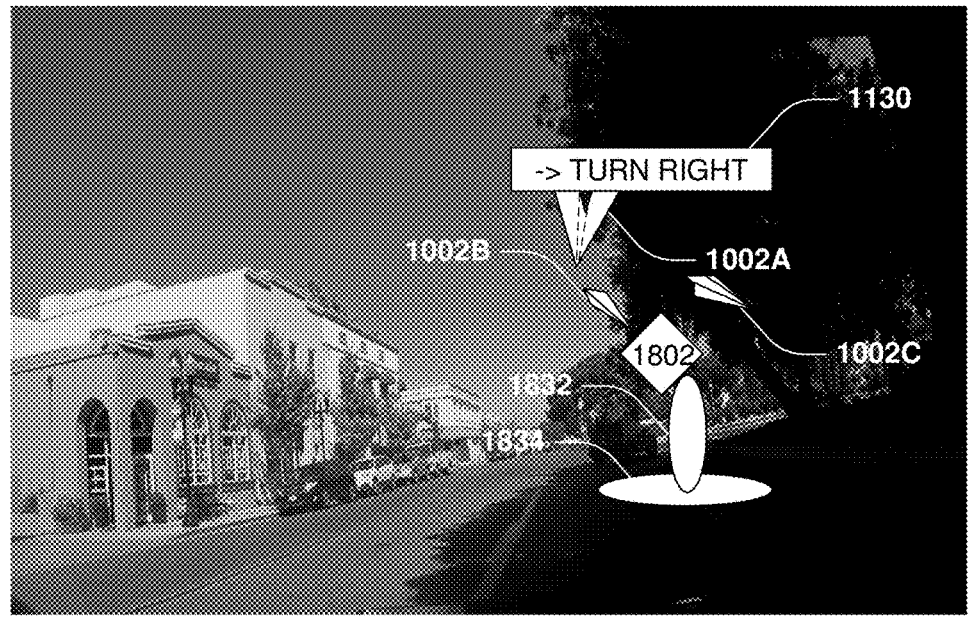
FIG. 18A is an illustration of an example scenario associated with 3-D navigation according to one or more embodiments of this disclosure.

FIG. 18A is an illustration of an example scenario 1800 associated with 3-D navigation according to one or more embodiments of this disclosure. When one or more objects are detected (e.g., by the sensor component 570) to be in a path of a vehicle or along an anticipated route (e.g., by environment information received by the vehicle control component 180), the controller component 104 may instruct the HUD component 100 highlight or track respective objects with graphic elements and/or pointers. For example, as a vehicle approaches a right turn (indicated by navigation instructions 1130 and avatars 1002A, 1002B, and 1002C), the sensor component 570 may detect a pedestrian 1832 near a road segment on which the vehicle is anticipated to turn. Therefore, the controller component 104 may direct the HUD component 100 to project a graphic element 1834 on the pedestrian 1832. In one or more embodiments, the HUD component 100 may project a graphic element over the pedestrian 1832. Further, the HUD component 100 may project a graphic element 1804, which illustrates signage indicative of a pedestrian road crossing.

As the vehicle and the pedestrian 1832 travel along the road segment, the relative distance between the two may change (e.g., the pedestrian 1832 may move, the vehicle may move, or both the pedestrian 1832 and the vehicle may move, etc.). The sensor component 570 may detect this change in distance and communicate the change or update the distance with the controller component 104 or the vehicle control component 180. The controller component 104 may update, change, or track target positions for one or more of the graphic elements (e.g., 1832 or 1834). Thus, the controller component 104 may adjust one or more focal planes for one or more of the graphic elements based on object information or environment information. As discussed herein, an actuator associated with projecting a graphic element on a focal plane may be controlled by the controller component 104 to move, adjust, or change the focal plane (e.g., moving the focal plane along a direction of line-of-sight of a driver or occupant, such as the line-of-sight 178 of FIG. 3).

Figure 18B:
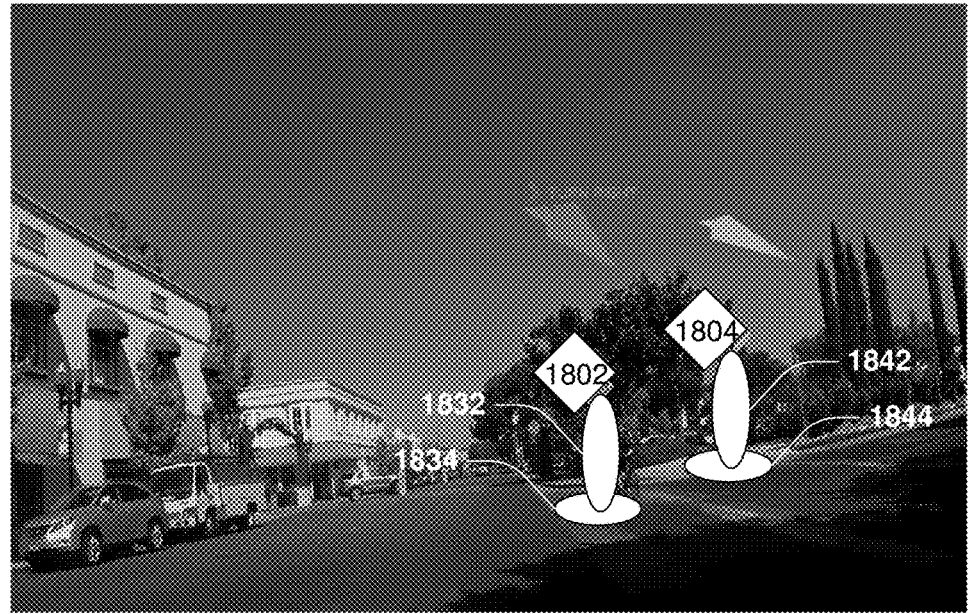
FIG. 18B is an illustration of an example scenario associated with 3-D navigation according to one or more embodiments of this disclosure.

FIG. 18B is an illustration of an example scenario 1810 associated with 3-D navigation according to one or more embodiments of this disclosure. The HUD component 100 may project multiple graphic elements 1834 and 1844 for multiple pedestrians 1832 and 1842, respectively. Additionally, the HUD component 100 may project one or more graphic elements as indicators, such as at 1802 or 1804.

Figure 19A:
FIG. 19A is an illustration of an example scenario associated with 3-D navigation according to one or more embodiments of this disclosure.

FIG. 19A is an illustration of an example scenario 1900 associated with 3-D navigation according to one or more embodiments of this disclosure. In one or more embodiments, the system for 3-D navigation 500 may enable an occupant of a vehicle to interact with objects in the environment. An occupant may ask questions ("what is that", "That looks neat") or make comments (e.g., verbally or via text input) and receive graphical element projections as answers. For example, the sensor component 570 may accept one or more queries, requests, or commands from a user, occupant, or driver of a vehicle. In this example, an occupant of the vehicle has asked, "What is that on the right?" The HUD component 100 may display confirmation or repeat the query or request using a text box graphic element 1904. In one or more embodiments, queries or requests may be enabled during navigation, as illustrated by avatar 1002. One or more other components may be employed to facilitate fulfillment of one or more of the requests or commands. For example, if a mobile device is communicatively coupled with the system 500, the controller component 104 may cause the mobile device to dial a telephone number of a business when ordered to "call the restaurant on the right." As another example, the controller 104 may interact with a restaurant reservation application installed on the mobile device or on the vehicle in response to "make me a reservation at restaurant X." Other commands or requests may utilize audio systems of the vehicle, such as "read me the menu."

Figure 19B:
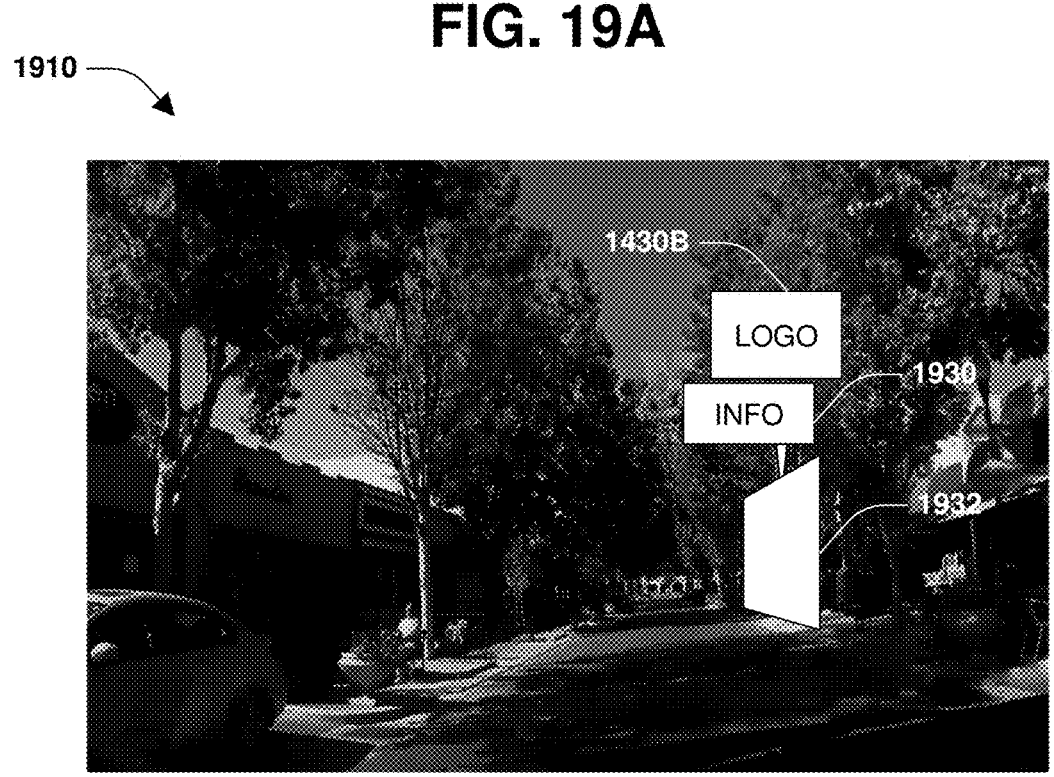
FIG. 19B is an illustration of an example scenario associated with 3-D navigation according to one or more embodiments of this disclosure.

FIG. 19B is an illustration of an example scenario 1910 associated with 3-D navigation according to one or more embodiments of this disclosure. The controller component 104 may process the request or route the request associated with 1904 to the navigation component 540, to determine objects within proximity of the vehicle, such as businesses, restaurants, etc. The controller component 104 may receive information associated with an object, such as information from a map application, a remote server, etc. This information may include metadata associated with the object, such as hours, a logo, a status, reviews for the business, contact information, a telephone number, a menu, etc. The HUD component 100 may project a logo graphic element 1430B, information 1930 (e.g., telephone number, status, hours, etc.), and a highlighting graphic element 1932, which may draw attention to the location of the object (e.g., restaurant or business).

Figure 20A:
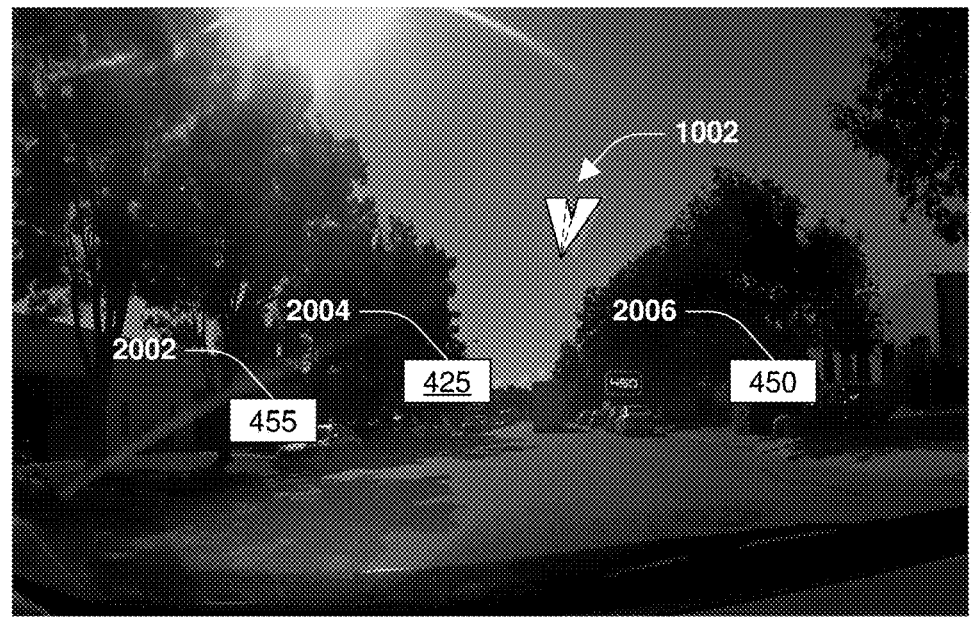
FIG. 20A is an illustration of an example scenario associated with 3-D navigation according to one or more embodiments of this disclosure.

FIG. 20A is an illustration of an example scenario 2000 associated with 3-D navigation according to one or more embodiments of this disclosure. In one or more embodiments, the navigation component 540 may provide the vehicle control component 180 with metadata associated with one or more objects in the environment. For example, one or more of the objects in the environment may be buildings or businesses. The navigation component 540 may download or receive address information for respective buildings or businesses, which may be projected as graphic elements by the HUD component 100. For example, addresses for buildings 2002, 2004, and 2006 may be presented by the HUD component 100. In one or more embodiments, the controller component 104 may enable address graphical element presentation when a vehicle is within a threshold distance of a destination location or upon user request, for example. In other embodiments, address graphical elements may be projected during a navigation mode, such as when directions are being provided by the navigation component 540, as indicated by the avatar 1002.

Figure 20B:
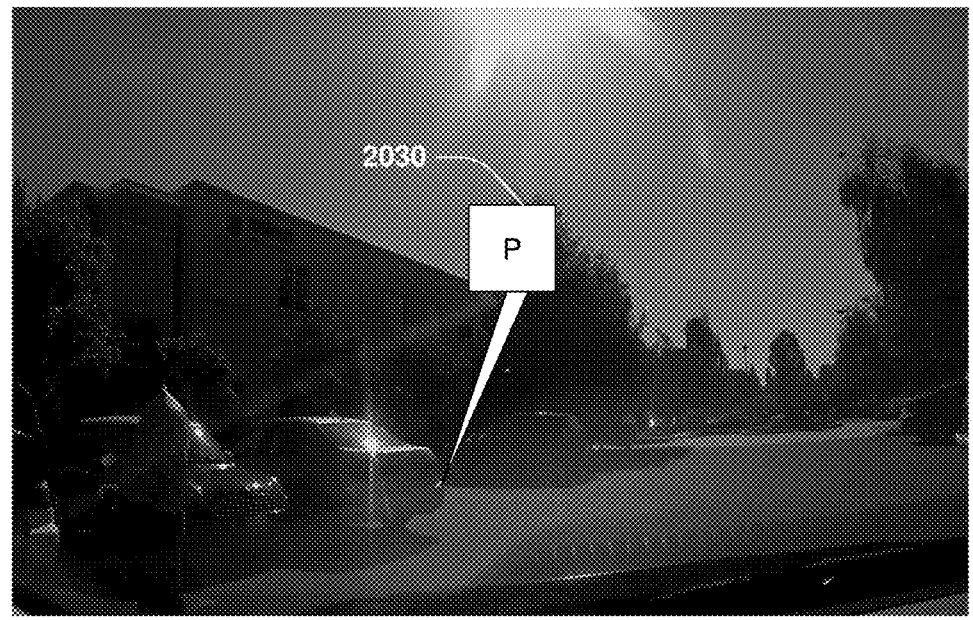
FIG. 20B is an illustration of an example scenario associated with 3-D navigation according to one or more embodiments of this disclosure.

FIG. 20B is an illustration of an example scenario 2010 associated with 3-D navigation according to one or more embodiments of this disclosure. In this example, the sensor component 570 or the navigation component 540 may identify one or more parking spots. As a result, the controller component 104 may instruct the HUD component 100 project a graphic element 2030 indicative of parking in view of an occupant of the vehicle. This graphic element 2030 may appear as an advance notification graphic element, include a pointer, have one or more transparency attributes, color, shape, size, etc., or include object metadata (e.g., cost of parking, time limit for spot, etc.) as described herein.

Figure 21:
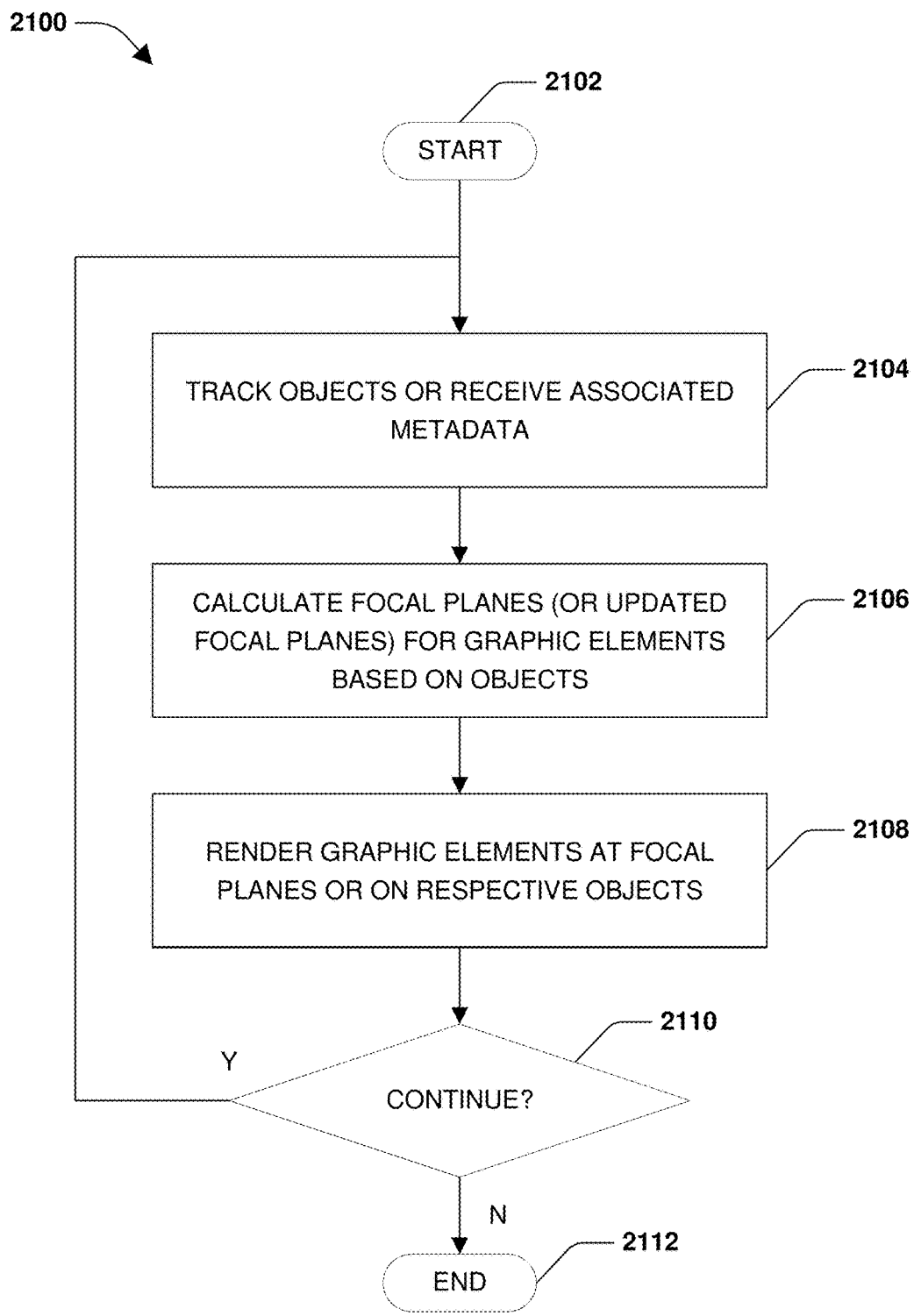
FIG. 21 is an illustration of an example flow diagram of a method for 3-D navigation according to one or more embodiments of this disclosure.

FIG. 21 is an illustration of an example flow diagram of a method 2100 for 3-D navigation according to one or more embodiments of this disclosure. The method starts, at 2102. At 2104, one or more objects may be tracked or metadata associated with respective objects may be received. Additionally, information related to an environment or route from an origin location to a destination location may be received. At 2106, one or more focal planes or updated focal planes may be calculated for graphic elements to be projected in association with one or more of the objects. At 2108, one or more graphic elements may be rendered or projected at one or more of the focal planes or on respective objects. At 2110, a determination may be made as to whether or not to continue tracking or projecting graphic elements in association with one or more of the objects. If it is determined that additional tracking is desired, the method 2100 returns to 2104. If no additional tracking is desired, the method may end at 2112.

Figure 22:
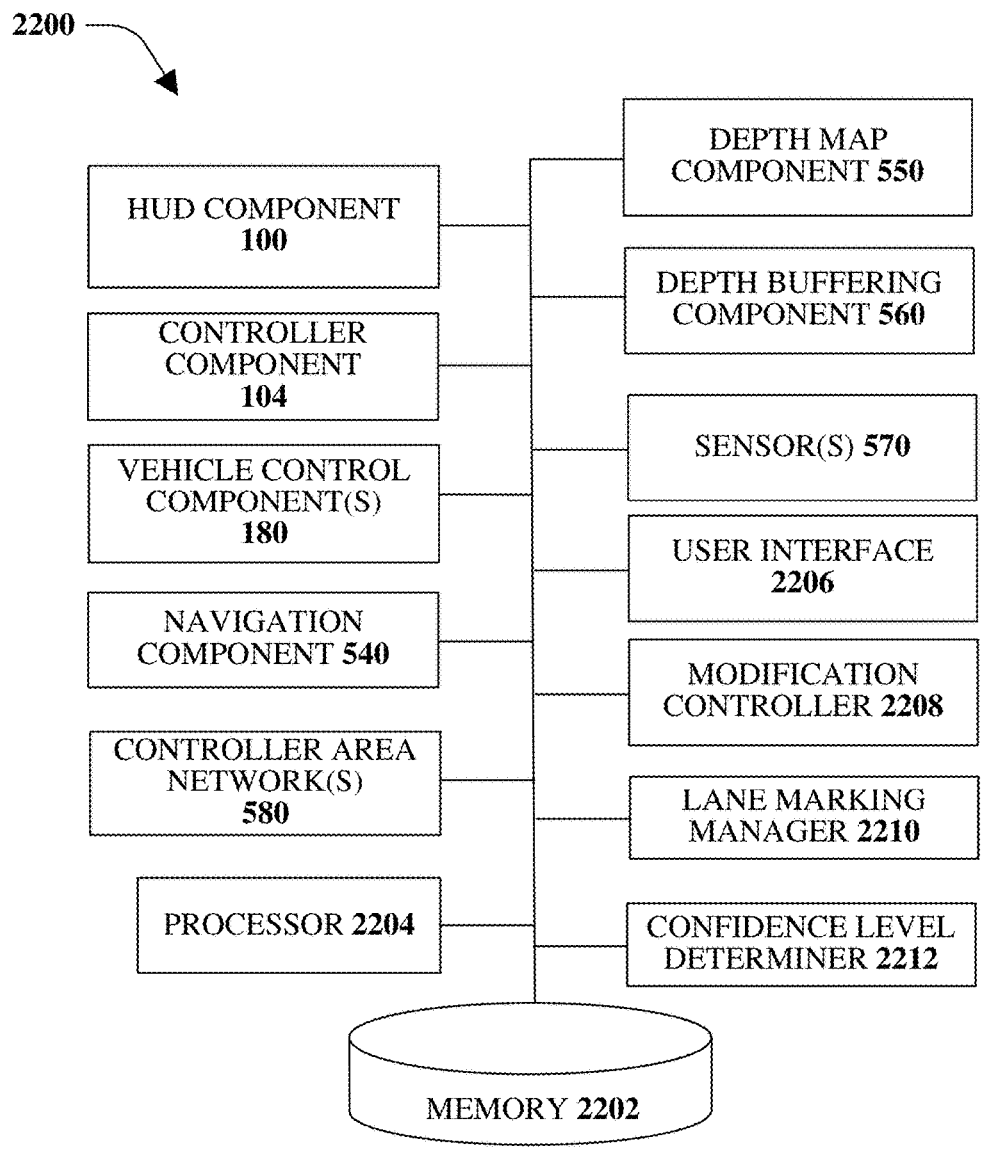
FIG. 22 is an illustration of an example, non-limiting system configured for multi-level driver monitoring and/or control according to one or more embodiments of this disclosure.

FIG. 22 is an illustration of an example, non-limiting system 2200 configured for multi-level driver monitoring and/or control according to one or more embodiments of this disclosure. The system 2200 may include at least one memory 2202 that may store computer executable components and/or computer executable instructions. The system 2200 may also include at least one processor 2204, communicatively coupled to the at least one memory 2202. The at least one processor 2204 may facilitate execution of the computer executable components and/or the computer executable instructions stored in the memory 2202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 2202 (e.g., operatively connected to the memory 2202), the various aspects are not limited to this implementation. Instead, in accordance with various implementations, the one or more computer executable components and/or the one or more computer executable instructions may be stored in (or integrated within) the memory 2202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 2200 may include the HUD component 100 that may render volumetric contact-analog augmented reality graphic elements with accurately reproduced depth cues, as discussed in this detailed description. For example, the HUD component 100 may provide 3-dimensional or "3-D" graphic elements that are rendered to appear to be in the same space as the real-world environment.

The controller component 104 may be communicatively connected to the HUD component 100 in some aspects, or may be integrated within the HUD component 100 in other aspects. The controller component 104 may communicate with one or more vehicle control systems 180, as discussed in this detailed description.

The navigation component 540, which may be a navigation manager, may generate one or more routes between a first location and at least a second location, as discussed in this detailed description. For example, the first location may be a starting point and the second location may be a destination. According to some implementations, more than one destination may be desired and, therefore, the navigation component 540 may calculate multiple routes and/or calculate a single route with various waypoints or stops along the route.

The navigation component 540 may also provide one or more navigation commands and/or one or more navigation instructions associated with various portions of the route(s), as discussed herein. The navigation commands and/or navigation instructions may be rendered by the navigation component 540 (or another system 2200 component) through an audio prompt, a visual prompt, a tactile prompt, or in another perceivable format. In an example, the navigation component 540 may transmit one or more prompts through one or more controller area networks (CANs) 580.

The system 2200 may also include the depth map component 550, which may be a map displayer, that may output a map that includes the route. The map displayer (or depth map component 550) may also output a map that is indicative of distances of one or more surfaces, objects, obstructions, or geometries in an area around the vehicle. The depth map component 550 may output the map on a windshield of the vehicle. For example, the map may be transparent such that the map does not obstruct a view of real world objects in the vehicle environment.

According to an implementation, the depth map component 550 provides a depth map of the vehicle environment, as discussed in this detailed description. The depth map may be utilized to output (e.g., by the HUD component 100) one or more graphic elements within the rendered vehicle environment. According to some implementations, the depth map component 550 may output the map on a windshield (e.g., overlaid on the windshield), wherein the map is transparent and does not obstruct a view of the real world objects through the windshield.

The depth buffering component 560 may coordinate perspective management for the vehicle occupants such that the graphic elements appear visually "correct" for each occupant, as discussed herein.

The one or more sensor components 570 may detect obstacles within the (real-world) vehicle environment. Further, the one or more sensor components 570 may detect road conditions. The obstacles and the road conditions may be utilized to provide suggested actions for the driver to perform. The suggested actions may be output in any perceivable format including, for example, visual cues, graphical elements, verbal instructions, and so on.

According to some implementations, at least one sensor component may be a user interface 2206. The user interface 2206 may allow one or more vehicle occupants to input various information, modify information, and perform other actions. Further, the user interface 2206 may output or render information to the vehicle occupants in a perceivable format (e.g., visual, audible, tactile, and so on).

Figure 23A:
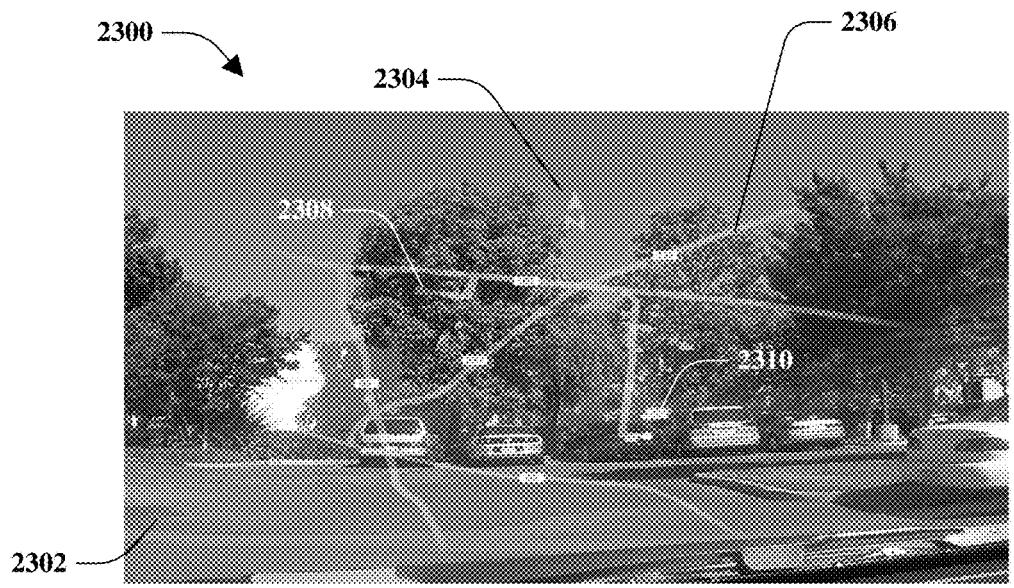
FIG. 23A illustrates an example scenario related to interfacing with a vehicle occupant according to one or more embodiments of this disclosure.

For example, FIG. 23A illustrates an example scenario 2300 related to interfacing with a vehicle occupant according to one or more embodiments of this disclosure. From a perspective of vehicle occupants, real-world objects may be perceived through a windshield 2302 (or through a heads-up display). As illustrated, a portion of the vehicle dashboard and/or hood, nearby vehicles, trees, a road or parking lot surface, and so forth may be perceived.

Displayed on the windshield 2302 may an indication of a geographic coordinate 2304, which may be overlaid on the real-world items. In this example, the geographic coordinate 2304 is indicating that the vehicle is heading north. Further, although illustrated at a middle, top portion of the windshield 2302, the geographic coordinate 2304 may be located at other portions of the windshield.

Also displayed on the windshield 2302 may be an indication of roads that are within a certain distance of the current vehicle location. The road indication may be overlaid on the real-world items. One road of the displayed roads (e.g., map) is labeled at 2304. Further, labels associated with the roads may also be displayed. Such labels include route names, road numbers, or other manners of identification.

As illustrated, a first location 2308 (e.g., a start location) and a second location 2310 (e.g., an end location) may be identified. For example, at a strategic level, high level commands (e.g., received by a vehicle occupant) may be utilized to change a destination, to change a route preference (e.g., scenery, time), to avoid certain situations (e.g., highways, intersections, identified roads), and so on.

Figure 23B:
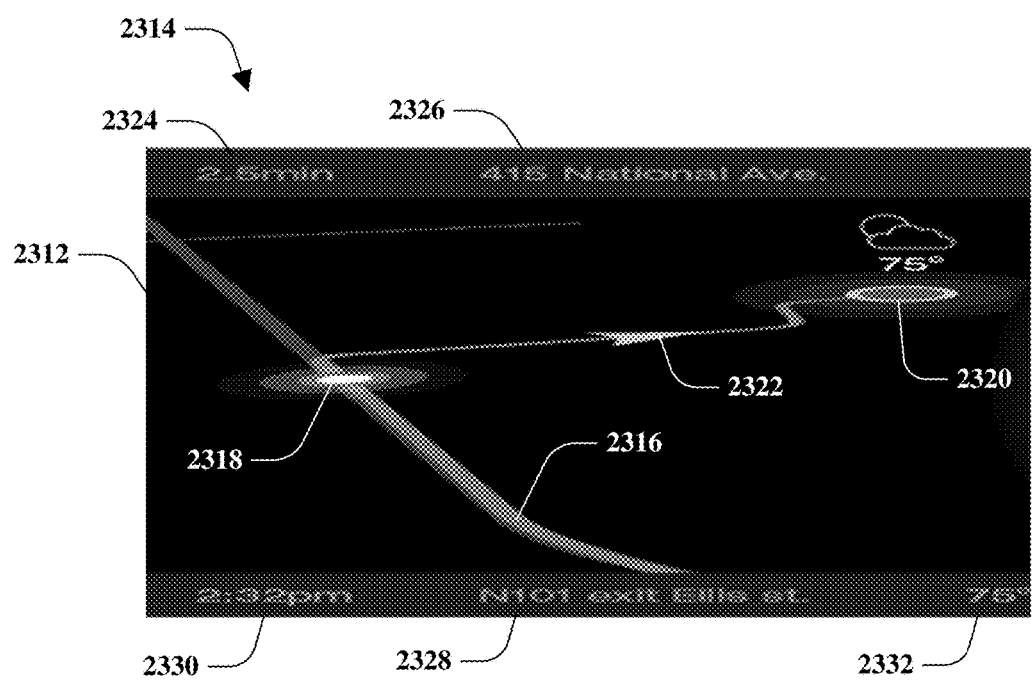
FIG. 23B illustrates another example scenario related to interfacing with a vehicle occupant according to one or more embodiments of this disclosure.

According to an implementation, the vehicle occupant may communicate with the system 2200 (of FIG. 22) component, such as through the user interface 2206, to select a destination and choose a route. The destination and/or route may be chosen on a visual display 2312 of FIG. 23B, which illustrates another example scenario 2314 related to interfacing with a vehicle occupant according to one or more embodiments of this disclosure. As illustrated, a vehicle occupant may perceive the display 2312. For example, the display 2312 may be output through the user interface 2206 (of FIG. 22). In another example, the display 2312 may be a screen located on a dashboard, cluster, or another location within the vehicle. In another example, the display 2312 may be presented through the use of a heads-up display.

As illustrated, the display 2312 may output at least a portion of a route 2316. As shown, the route 2316 may indicate the path traveled, as well as a future path expected to be traveled as viewed from a perspective of a current location 2318. The route may also illustrate a target location 2320 with a direction indicator 2322 that provides information as to a travel direction toward the target location 2320. The illustrated direction indicator 2322 is an arrow, however other direction indicators may be utilized. For example, the direction indictor 2322 may be words (e.g., go east, go straight, and so on), symbols (e.g., arrows, starts, or other shapes), color changes (e.g., green to indicate a future travel route and blue to indicate the route already traveled), and so on.

As illustrated, other information may be provided, such as an estimated travel time 2324 to reach the target location 2320. Also provided may be an address 2326 associated with the target location 2320. A next direction related to the route 2328 (e.g., the next turn, such as N101 exist Ellis Street) to be traveled may also be provided. Further, other information may be provided, such as a current time 2330, a current temperature 2332, or other information (e.g., traffic flow, weather, and so on).

The additional information provided (e.g., estimated travel time 2324, traffic flow, weather, and so on) may assist the vehicle occupant to decide routing constraints. If there is a situation that the vehicle occupant wants to avoid (e.g., get to the destination faster than the estimated travel time 2324), the vehicle occupant may selectively change the route.

The selection of the destination location and/or changes to the route may be performed through interaction with the user interface 2206. According to some implementations, the user interface 2206 (as well as other interface components discussed herein) may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels.

Figure 24A:
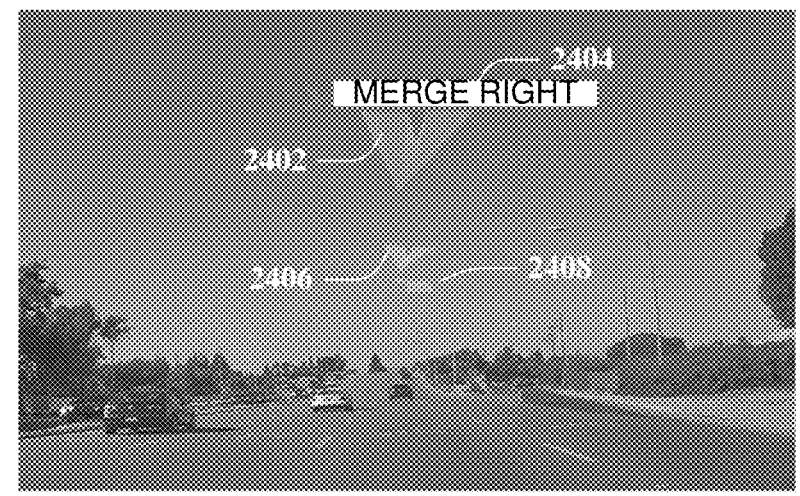
FIG. 24A illustrates an example scenario related to allowing a vehicle occupant to monitor and/or control navigation information according to one or more embodiments of this disclosure.

FIG. 24A illustrates an example scenario 2400 related to allowing a vehicle occupant to monitor and/or control navigation information according to one or more embodiments of this disclosure. As the vehicle is driven down a road, one or more avatars may be rendered and appear to be in front of the vehicle. Although the avatars are illustrated as appearing above the vehicle, the avatars may be at another location (e.g., near street level, at about the same level as the vehicle, in the sky, on one or both sides of the vehicle, or any other location).

As illustrated, a first avatar 2402 may direct the operator of the vehicle toward the route. It is noted that although a certain number of avatars are illustrated and described, the various aspects are not limited to this amount of avatars and fewer or more avatars may be utilized during implementation. Further, the color, shape, or other perceivable aspects of the avatars are not limited to what has been shown and described herein.

Also provided may be an optional driving instruction 2404, such as "merge right." In this example, a second avatar 2406 instructs the vehicle operator to proceed straight ahead. Further, a third avatar 2408 instructs the operator to merge right.

Figure 24B:
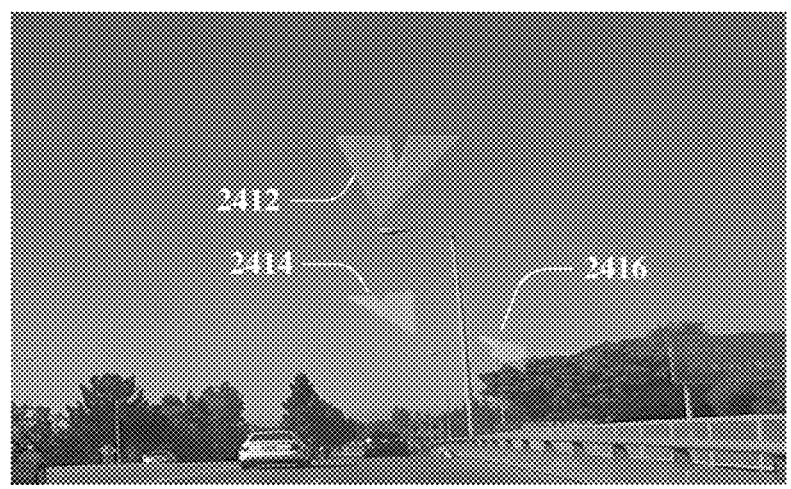
FIG. 24B illustrates another example scenario related to allowing a vehicle occupant to monitor and/or control navigation information according to one or more embodiments of this disclosure.

FIG. 24B illustrates another example scenario 2410 related to allowing a vehicle occupant to monitor and/or control navigation information according to one or more embodiments of this disclosure. This example scenario 2410 is a continuation of the example scenario 2400 of FIG. 24A. As illustrated a fourth avatar 2412 directs the vehicle operator to continue forward. A fifth avatar 2414 and a sixth avatar 2416 provide instructions to the vehicle operator to merge to the right. For example, the fifth avatar 2414 and the sixth avatar 2416 may be positioned to visually appear to be located over a turn (or exit lane) that is slightly out of view of the vehicle occupants.

Figure 24C:
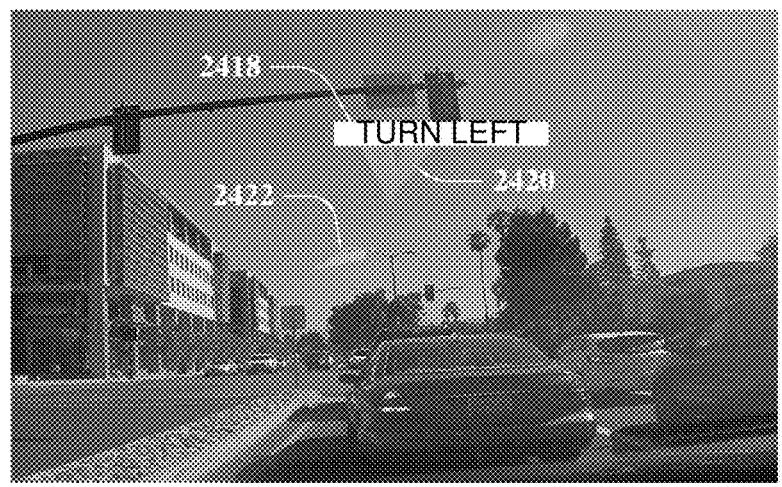
FIG. 24C illustrates another example scenario related to allowing a vehicle occupant to monitor and/or control navigation information according to one or more embodiments of this disclosure.

FIG. 24C illustrates another example scenario 2416 related to allowing a vehicle occupant to monitor and/or control navigation information according to one or more embodiments of this disclosure. An optional text description 2418 may be rendered to provide instructions to the vehicle operator. In this example, the optional text description 2418 instructs the vehicle operator to "turn left." A seventh avatar 2420 points in a forward direction while an eighth avatar 2422 points toward the left, the direction the vehicle is to turn.

As illustrated in FIG. 24A, FIG. 24B, and FIG. 24C for immediate view, planned vehicle maneuvers may be rendered. These planned vehicle maneuvers may be rendered on a HUD (e.g., 2-D, 3-D) or another type of rendering device. A vehicle may be directed to stay in a particular lane, change lanes, make turns, pull over, and so on. Vehicles maneuvers may be at a medium-level description of what to do, but not at an operational level. If a driver of an autonomous vehicle, for example, does not agree with a decision provided by the system 2200, the driver may take action to modify the autonomous system 2200 decision. For example, the driver may intervene and override decisions by inputting information (e.g., through the user interface 2206). In a specific example, the driver may verbally state "stay in this lane" or "turn right instead."

Figure 24D:
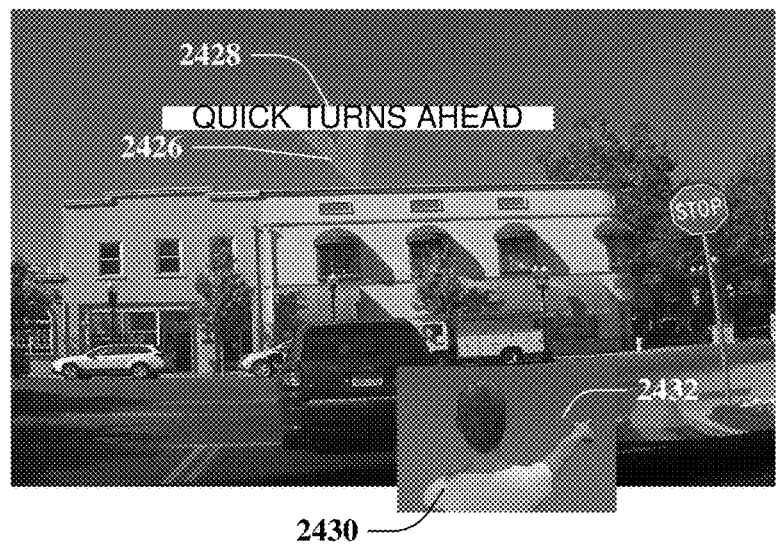
FIG. 24D illustrates a further example scenario related to allowing a vehicle occupant to monitor and/or control navigation information according to one or more embodiments of this disclosure.

According to some implementations, the vehicle occupant may use gestures, alone or at substantially the same time as other form or input (e.g., speech, touch screen, and so on). For example, FIG. 24D illustrates a further example scenario 2424 related to allowing a vehicle occupant to monitor and/or control navigation information according to one or more embodiments of this disclosure. In this example, another avatar 2426 is provided as well as an optional text description 2828, which in this example indicates that there are "quick turns ahead." As illustrated, the driver 2430 (or another occupant) may gesture the desired action. For example, as illustrated at 2432, the driver 2430 is pointing in the desired direction of travel). However, other gestures may be utilized, such as a thumbs-down signal to indicate no, nodding the head to indicate yes, and so on).

For example, one or more sensor components 570 and/or the user interface 2206 (both of FIG. 22) may take advantage of the motion and spatial expression of gestures to indicate spatial relationship information. Thus, one or more sensor components 570 (or another system component, such as the user interface 2206) may detect the gesture or other information (e.g., verbal commands, changes input directly onto a touch screen, and so on). This information may be conveyed to a modification controller 2208, which may determine whether the change requested by the driver or vehicle operator may be performed.

According to an implementation, the modification controller 2208 may alter at least a portion of the route based on an indication of a change received at the user interface 2206 and/or a sensor component 570. In addition, the navigation component 540 may regenerate the route between the first location and the second location as a function of the indication of the change. In an implementation, the indication of the change is received from the driver and/or from a passenger in the vehicle.

The indication of the change may be based on a gesture detected by the user interface 2206 and/or the sensor component 570. According to another implementation, the indication of the change may be based on a verbal command detected by the user interface 2206 and/or the sensor component 570.

For example, the navigation component 540 may determine that the vehicle should turn left at the next light (e.g., based on a recommended route to a destination location). However, the driver sees a fast food restaurant on the right side of the street and wants to stop at the fast food restaurant. Thus, the driver may attempt to override the instruction and request the vehicle to turn right. The modification controller 2208 may determine if there is a street, or driveway, and may turn right, as instructed by the driver. If the turn is possible, the modification controller 2208 may provide the instruction to the navigation component 540, which may recalculate the route.

If the modification controller 2208 determines there is no place to turn right (e.g., no street or driveway at the expected location), the modification controller 2208 may inform the driver of this fact. According to some implementations, more input may be requested from the driver. In this example, the driver may respond with the restaurant name and, therefore, the modification controller 2208 may determine that the right turn is located another 500 feet up the road (not directly across from where the vehicle was going to turn left). Thus, the modification controller 2208 may determine the route change is permissible and notifies the navigation component 540 to make the alteration to the route.

In such a manner, changes to a route may be performed on-the-fly or in real-time based on changing circumstances or other information that may not be detectable by the system 2200 (e.g., driver is hungry or thirsty, driver sees their friend's vehicle broken down on the side of the road and wants to help, and so on). Such changes may be implemented by the driver or other vehicle occupant by interfacing with one or more system components.

Figure 25:
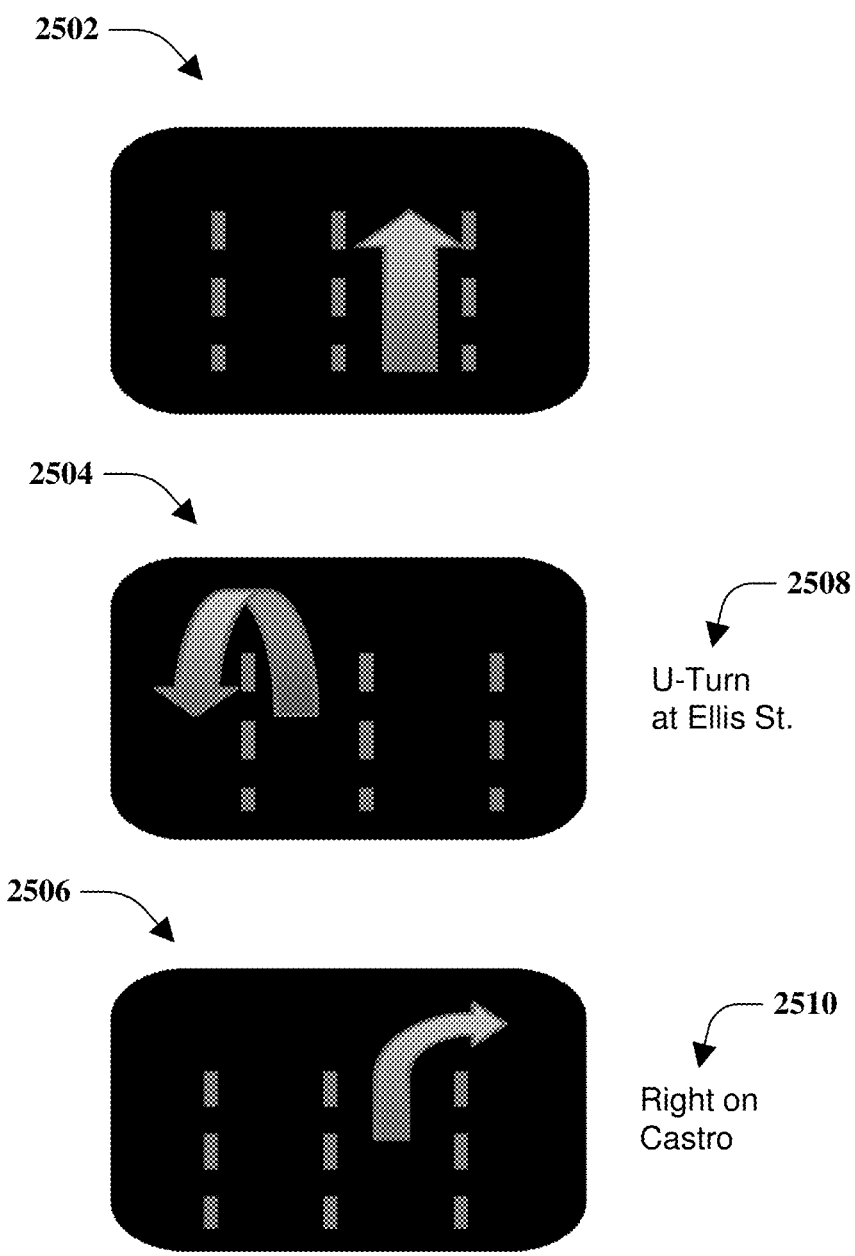
FIG. 25 illustrates example, non-limiting, indications of future maneuvers that may be utilized according to one or more embodiments of this disclosure.

FIG. 25 illustrates example, non-limiting, indications of future maneuvers that may be utilized according to one or more embodiments of this disclosure. For maneuvers that are further in the future that may be out of visual range of the vehicle occupants, each maneuver may be represented by an icon (or avatar). For example, a first example maneuver icon 2502 may be an indication that the vehicle will proceed in the current direction (e.g., straight ahead). A second example maneuver icon 2504 may be an indication that the vehicle will be performing a u-turn. A third example maneuver icon 2506 may be an indication that the vehicle will perform a right turn. Additional maneuver icons may be utilized with the disclosed aspects, although not shown or described herein.

The various maneuver icons may be rendered on a windshield, on a HUD display, on a vehicle device, on a mobile device, or on another device communicatively coupled to the vehicle. Thus, the maneuver icons may be displayed spatially and/or temporarily.

According to some implementations, the maneuver icons may be provided with an optional text description. For example, the second example maneuver icon 2504 may include a text description 2508 that indicates where the U-turn will take place (e.g., "U-turn at Ellis Street). In another example, the third example maneuver icon 2506 may include a text description 2510 that indicates where the turn will take place (e.g., "right on Castro").

Further, as illustrated in FIG. 25, at substantially the same time as the maneuver type is rendered, a relevant context (such as lane position) may be provided. For example, the first example maneuver icon 2502 may indicate the vehicle in a right hand lane. In another example, the second example maneuver icon 2504 indicates the vehicle should perform the U-turn maneuver from a middle or left hand lane. Further, the third example maneuver icon 2506 indicates the right turn should be from the curb lane.

Figure 26:
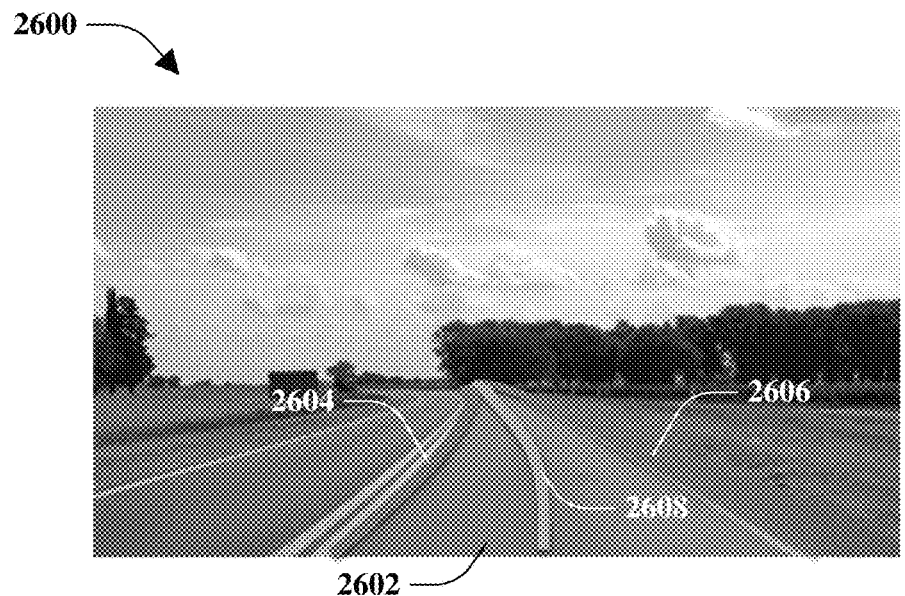
FIG. 26 illustrates an example scenario related to providing visual guides for a current level of steering control according to one or more embodiments of this disclosure.

FIG. 26 illustrates an example scenario 2600 related to providing visual guides for a current level of steering control according to one or more embodiments of this disclosure. At the operational level, visual information may be provided to indicate a current steering and speed control of the vehicle (which may be the lowest levels of control).

A HUD (or other device) may output perceived lane boundaries and center steering trajectory. These visual guides may be used to indicate the current level of steering control. For example, boundaries of a lane 2602 may be determined by a lane marking manager 2210 that may determine lane boundaries and a center steering trajectory of a lane of traffic. For example, the lane boundaries may be indicated by a first boundary line 2604 and a second boundary line 2606 of FIG. 26. Further, the center steering trajectory may be determined by the lane marking manager 2210 to be a center of the lane and displayed as a centerline 2608. Alternatively, the centerline 2608 may be determined by the lane marking manager 2210 to be a centerline that is located between the first line 2604 and the second line 2606, which might not be the center of the traffic lane.

The lane marking manager 2210 may distinguish the lines such as by marking the lines in a color that is different than the coloring of the actual (real world) lane markings. For example, the first boundary line 2604 and second boundary line 2606 may be a first color and the centerline 2602 may be a second color. According to other implementations, the lines may be distinguished from each other in another manner, such as dashes, symbols, and so on.

Figure 27:
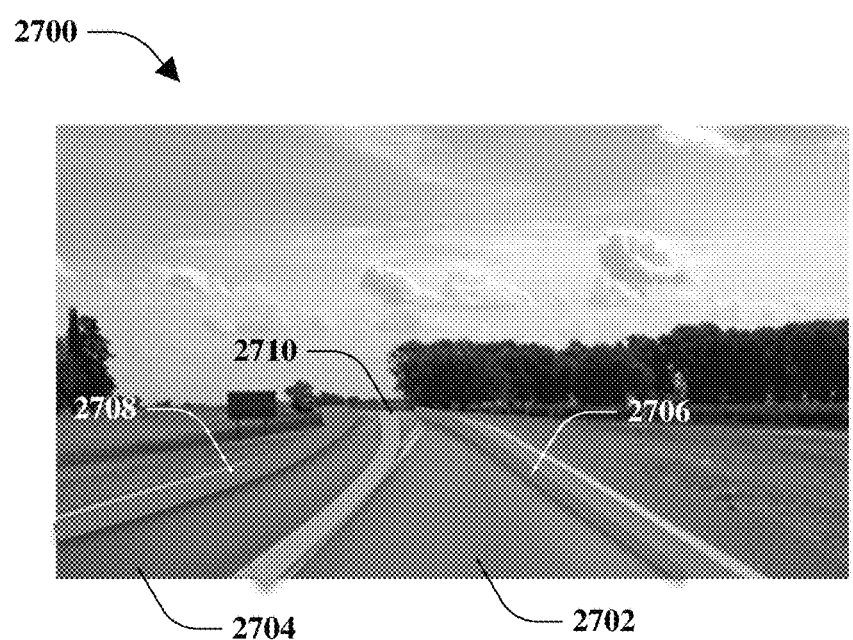
FIG. 27 illustrates an example scenario related to an incorrect determination of a current level of steering control according to one or more embodiments of this disclosure.

FIG. 27 illustrates an example scenario 2700 related to an incorrect determination of a current level of steering control according to one or more embodiments of this disclosure. Visual guides may be used to indicate the current level of steering control. However, the determination of the edge lines and/or centerline may be incorrect.

For example, in the scenario 2600 of FIG. 26, the boundary lines and centerline were correctly determined by the lane marking manager 2210. However, the system 2200 (e.g., the lane marking manager 2210) may incorrectly perceive the driving lane. As illustrated in FIG. 27, there is a first lane 2702, in which the vehicle is currently traversing and which is headed in a first direction. There is also a second lane of traffic 2704, which is headed in a second direction, opposite the first direction (e.g., oncoming traffic).

In this case, the lane marking manager 2210 correctly determines that the curb edge of the first lane 2702 is a first boundary line 2706. However, in this example, the lane marking manager 2210 incorrectly determines that the other side (e.g., curb edge) of the opposite lane 2704 of traffic is the other side (e.g., the opposite boundary) of the current lane of traffic 2702. Thus, the lane marking manager incorrectly marks the curb of the opposite lane of traffic 2704 as the second boundary line 2708 of the current lane of traffic 2702. Further, the lane marking manager incorrectly places the steering line 2710 between the first boundary line 2706 and the second boundary line 2708 and, therefore, the center of the road between the two lanes of traffic is incorrectly indicated as the steering line (e.g., the vehicle will attempt to stay centered on this steering line). This error may result in a dangerous situation due the vehicle being instructed to drive down the middle of the road.

With reference again to FIG. 22, if the vehicle (e.g., the lane marking manager 2210) has perceived an incorrect driving lane, the driver should be notified (e.g., an alarm should be activated). However, the system 2200 is not aware that an error has occurred. If the system 2200 did know that an error had occurred, the system 2200 would automatically correct the error.

Therefore, according to an implementation, a confidence level determiner 2212 may assign a level of confidence to the determination of steering control. Further, the confidence level determiner 2212 may assign respective confidence levels to the lane boundaries and the center steering trajectory.

For example, the lane marking manager 2210 may determine the boundary lines and centerlines, but the system 2200 may determine that there is no oncoming lane of traffic. If the system 2200 has prior knowledge about the road being traversed and the knowledge indicates that the oncoming lane of traffic is not contiguous with the current lane (e.g., it is a divided highway), the confidence level may be high. However, if the system 2200 does not have prior knowledge of the road, or the knowledge is from a source whose trust is unknown, the level of confidence may be assigned a lower level.

Figure 28:
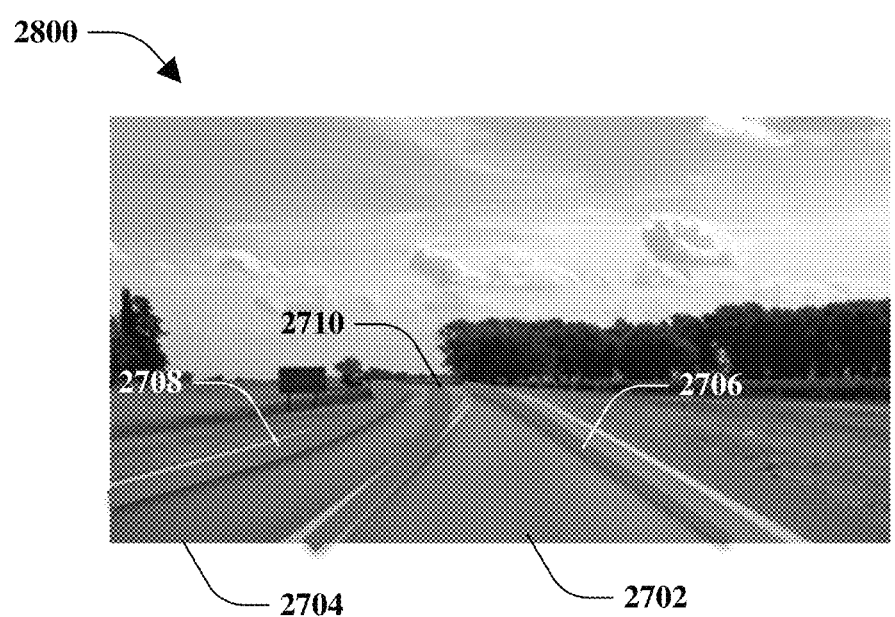
FIG. 28 illustrates an example scenario related to an output indicating a confidence level associated with a current level of steering control according to one or more embodiments of this disclosure.

As illustrated in FIG. 28, the confidence level determiner 2212 may assign different colors (e.g., color cues) to the boundary lines and/or center line to illustrate a degree of uncertainty. Thus, the first boundary line 2706, the second boundary line 2708, and the centerline 2710 are output (e.g., by the user interface 2206, the HUD component, or another system component) such as by showing dashed lines or as red lines. According to some implementations, another type of output may be utilized to draw attention to the level of uncertainty. For example, the lines may be displayed as exclamation points, question marks, geometric shapes, different colors, and so on.

Further, each line may have a different level of confidence. For example, the confidence level determiner 2212 may determine that the first edge line 2706 is correct based on the current position of the vehicle. Therefore, the first boundary line 2706 is output normally, showing a high degree of certainty that the line is correct. However, it may be determined by the confidence level determiner 2212 that the second boundary line 2708 and the centerline 2210 might not be correct and, therefore, these lines may be output in order to bring attention to the lower level of certainty.

In an alternate or additional implementation, the confidence level determiner 2212 (or another system 2200 component) may output a notification based on a determination that at least one confidence level of the respective confidence levels is below a threshold level. In an example, the notification may be an alarm to advise the occupants of the vehicle about the uncertainty level. For example, a multi-modal alarm, such as audio or vibration alerts may be utilized. In another example, the notification may be represented as a visual indicator that is rendered to appear as overlaying real world portions of the lane of traffic.

According to some implementations, the various alerts may be utilized to let one or more passengers monitor the potential mismatch between perceived and actual road lanes. For example, a passenger may perceive a cue or an alert and may notice that the lane markings are not correct. The passenger (or the driver) may inform the system 2200 that the lane markings are incorrect. Such information may be conveyed through one or more sensors components 570, through the user interface 2206, or through another system component. Thus, the system 2200 may attempt to automatically correct the information and/or may receive input from the vehicle occupants for correction of the mismatch.

Figure 29:
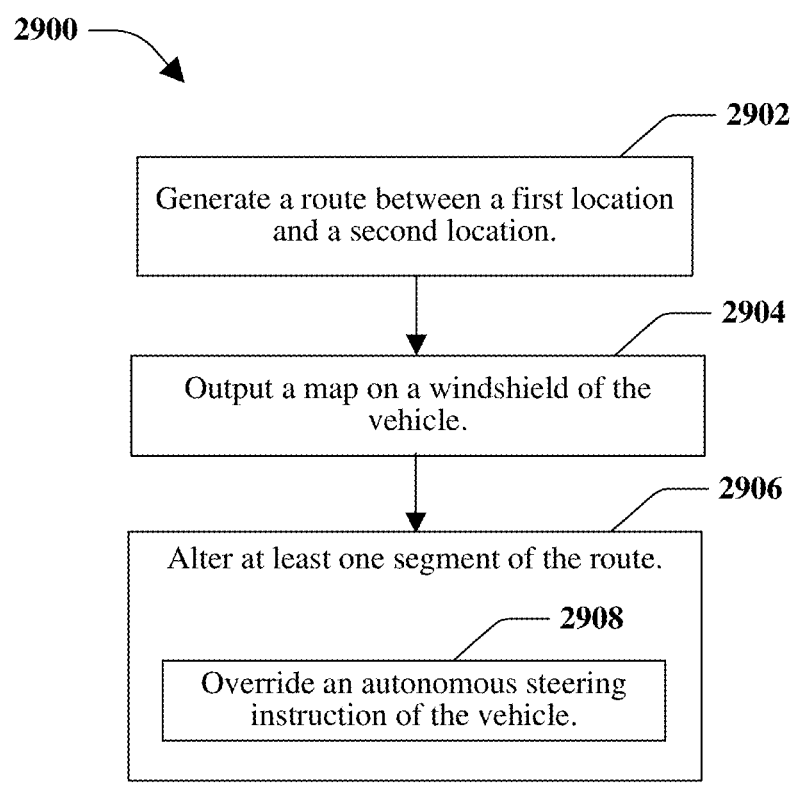
FIG. 29 illustrates an example, non-limiting, method that provides multi-level driver monitoring and control according to one or more embodiments of this disclosure.

FIG. 29 illustrates an example, non-limiting, method 2900 may provide multi-level driver monitoring and control according to one or more embodiments of this disclosure. At 2902, a route may be generated between a first location and a second location. For example, the first location may be determined based on a current location of a vehicle and the second location may be determined based on a received destination location. For example, a driver of the vehicle may enter an address or other identifier that provides the information related to the destination location.

At 2904, a map is output on a windshield of the vehicle. The map may include segments of the route. Further, the segments are transparent and, therefore, a view of real world objects through the windshield are not obstructed by the segments.

At least one segment of the route may be altered, at 2906. The segment may be altered based on an indication of a change to the at least one segment. According to an implementation, altering the segment may include overriding an autonomous steering instruction of the vehicle, at 2908.

According to some implementations, altering the at least one segment of the route may include detecting a gesture performed by a vehicle occupant. Further to this implementation, altering the at least one segment may include interpreting the gesture as a command to change a driving instruction related to the at least one segment.

Figure 30:
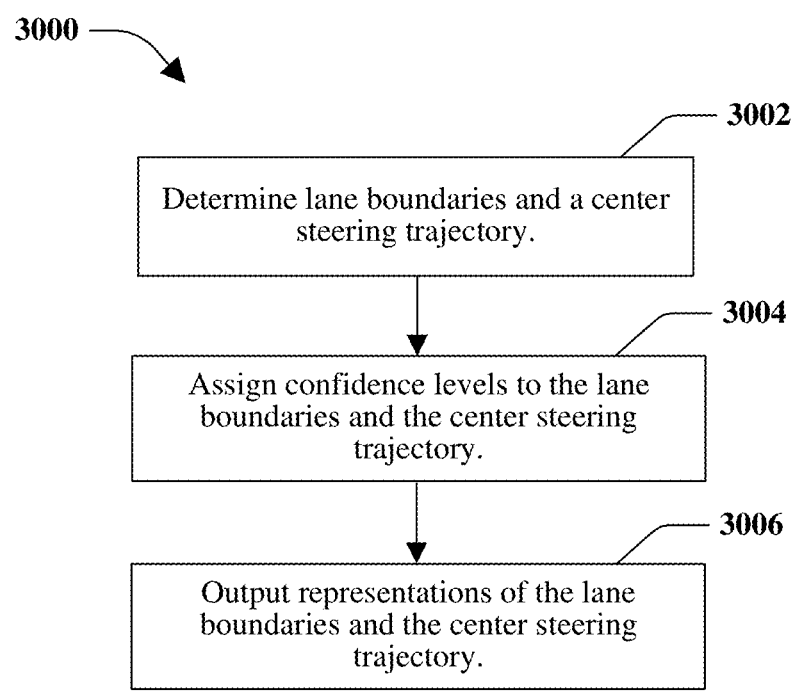
FIG. 30 illustrates an example, non-limiting method for navigation monitoring and control of a vehicle according to one or more embodiments of this disclosure.

FIG. 30 illustrates an example, non-limiting method 3000 for navigation monitoring and control of a vehicle according to one or more embodiments of this disclosure. At 3002, lane boundaries and a center steering trajectory are determined. For example, a first boundary line, a second boundary line, and a centerline of a current lane of travel may be determined.

At 3004, confidence levels may be assigned to the lane boundaries and the center steering trajectory. For example, a first confidence level may be assigned to the first boundary line, a second confidence level may be assigned to the second boundary line, and a third confidence level may be assigned to the centerline.

Representations of the lane boundaries and the center steering trajectory are output, at 3006. According to an implementation, representations of the first boundary line, the second boundary line, and the centerline are based, at least in part, on the first confidence level, the second confidence level, and the third confidence level. For example, if one confidence level of the respective confidence levels is below a threshold amount, the representation associated with that confidence level may be displayed differently than the other representations.

As discussed herein, according to one aspect, a vehicle heads-up display device for displaying graphic elements in view of a driver of a vehicle includes a first projector and a first actuator. The first projector may project a first graphic element on a first focal plane in view of the driver. The first focal plane may be oriented substantially perpendicularly to a line-of-sight of the driver and a distance away from the vehicle. The first projector may be mounted on the first actuator. The first actuator may linearly move the first projector. Linearly moving the first projector may cause the first focal plane of the first graphic element to move in a direction of the line-of-sight of the driver.

According to another aspect, a vehicular heads-up display system includes a vehicle heads-up display device and a controller. The vehicle heads-up display device displays graphic elements in view of a driver of a vehicle, and includes a first projector and a second projector. The first projector may project a first graphic element on a first focal plane in view of the driver. The first focal plane may be oriented substantially perpendicularly to a line-of-sight of the driver. The first projector may move the first focal plane in a direction of the line-of-sight of the driver. The second projector may project a second graphic element on a second focal plane in view of the driver. The second focal plane may be static and oriented substantially parallel to a ground surface. The controller may communicate with one or more associated vehicle control systems and to control the vehicle heads-up display device to display the first and second graphic elements based on communication with one or more of the associated vehicle control systems.

According to yet another aspect, a method for presenting augmented reality graphic elements in a vehicle heads-up display includes projecting a first graphic element on a first focal plane in view of a driver, and a second graphic element on a second focal plane in view of the driver. The first focal plane may be oriented substantially perpendicularly to a line-of-sight of the driver, and the second focal plane may be static and oriented substantially parallel to a ground surface. The method may include moving or adjusting the first focal plane in a direction of the line-of-sight of the driver.

One or more embodiments of techniques or systems for 3-dimensional (3-D) navigation are provided herein. For example, a system for 3-D navigation may project a graphic element or avatar that appears to move in view of an occupant of a vehicle. In one or more embodiments, a heads-up display component (HUD) component may project the graphic element or avatar on one or more focal planes in an environment surrounding a vehicle. The HUD component may project graphic elements or avatars at adjustable distances or adjustable focal planes to provide an occupant of a vehicle with the perception that an avatar or graphic element is moving, flying, animated, etc.

As an example, the HUD component may 'animate' or provide movement for an avatar by sequentially projecting the avatar on one or more different focal planes. Projection on to these focal planes may be achieved utilizing an actuator to move a projector of the HUD component, for example. As a result, depth cues such as accommodation and vergence associated with a graphic element or avatar are generally preserved. When a route is generated from a first location to a second location, the HUD component may generate one or more graphic elements for a driver or occupant of a vehicle to 'follow'. The HUD component may project onto multiple focal planes or move projected graphic elements from one focal plane to another, therefore, graphic elements or projected images may appear much more 'real', similar to an image seen in a mirror.

When an occupant of a vehicle requests navigation guidance, a graphic element, such as an avatar, may be provided. The avatar may appear to move, glide, fly, etc. in front of the vehicle, similar to what an occupant or driver would see if they were following a friend's vehicle, for example. Additionally, the avatar might appear to navigate around obstructions, obstacles, pedestrians, debris, potholes, etc. as a real vehicle would. In one or more embodiments, the avatar might 'drive', move, appear to move, etc. according to real-time traffic. For example, if a route takes a driver or a vehicle across train tracks, the avatar may stop at the train tracks when a train is crossing. As another example, the avatar may change lanes in a manner such that the avatar does not appear to 'hit' another vehicle or otherwise interfere with traffic.

In one or more embodiments, a sensor component may track or detect one or more objects or information associated with the environment in which a vehicle is travelling. This information may be passed to the vehicle control component. The vehicle control component may aggregate, collect, or receive information about the environment around the vehicle from different sources. A controller component may utilize this information to make decisions regarding whether or not to project a graphic element at a location or on a focal plane and attributes or models to utilize when rendering the graphic element. A HUD component may render or project the graphic element based on the controller component decision.

For example, if a sensor component detects a pedestrian in a crosswalk across a road segment along a route which involves having the vehicle turn onto that road segment, the controller component may order or command the HUD component to project a graphic element on or around the pedestrian to alert a driver or occupant of the vehicle of the presence of the pedestrian. Further, the sensor component may actively track the pedestrian such that the HUD component may project graphic elements, such as pointers, which follow or track the pedestrian in real-time as he or she crosses the crosswalk. Additionally, the controller component may identify or recognize when the pedestrian has finished crossing or steps onto a sidewalk and communicate to the HUD component to cease projecting graphic elements for the pedestrian.

A system for 3-D navigation may enable identification or projection of early warning graphic elements. For example, if a driving is turning from a first road segment to a second road segment (e.g., making a left turn or a right turn from one road to another), information received by the vehicle control component, such as environment information or traffic condition information may be utilized by the controller component to make a determination that an early warning graphic element should be rendered for an occupant or driver of a vehicle. The controller component may order or command the HUD component to render a graphic element which points to an object (e.g., a hazard, road condition, etc.) which may not necessarily be in view of the driver. When looking out of the windshield of the vehicle, a driver may not see a hazard on his or her left, for example. However, the HUD component may project a graphic element which directs the driver's attention to his or her left, (e.g., off the windshield or outside of the view of the driver). Safety may be promoted by providing drivers or occupants of a vehicle with advance notice of objects within an environment.

Additionally, the HUD component may project or render details pertaining to objects within the environment, such as a name of a business, address markers, final destination markers, parking graphic elements, reviews, etc.

One or more embodiments of techniques or systems for 3-dimensional (3-D) navigation are provided herein. A heads-up display (HUD) component may project, render, display, or present graphic elements on focal planes around an environment surrounding a vehicle. The HUD component may cause these graphic elements to appear volumetric or 3-D by moving or adjusting a distance between a focal plane and the vehicle. Objects within the environment may be tracked, identified, and corresponding graphic elements may be projected on, near, or around respective objects. For example, the HUD component may project graphic elements or pointers on pedestrians such that it may alert the driver or operator of the vehicle of their presence. These pointers may stay 'stuck' on the pedestrian as he or she is walking within the environment. Metadata associated with objects may be presented, such as address information, ratings, telephone numbers, logos, etc.

Figure 31:
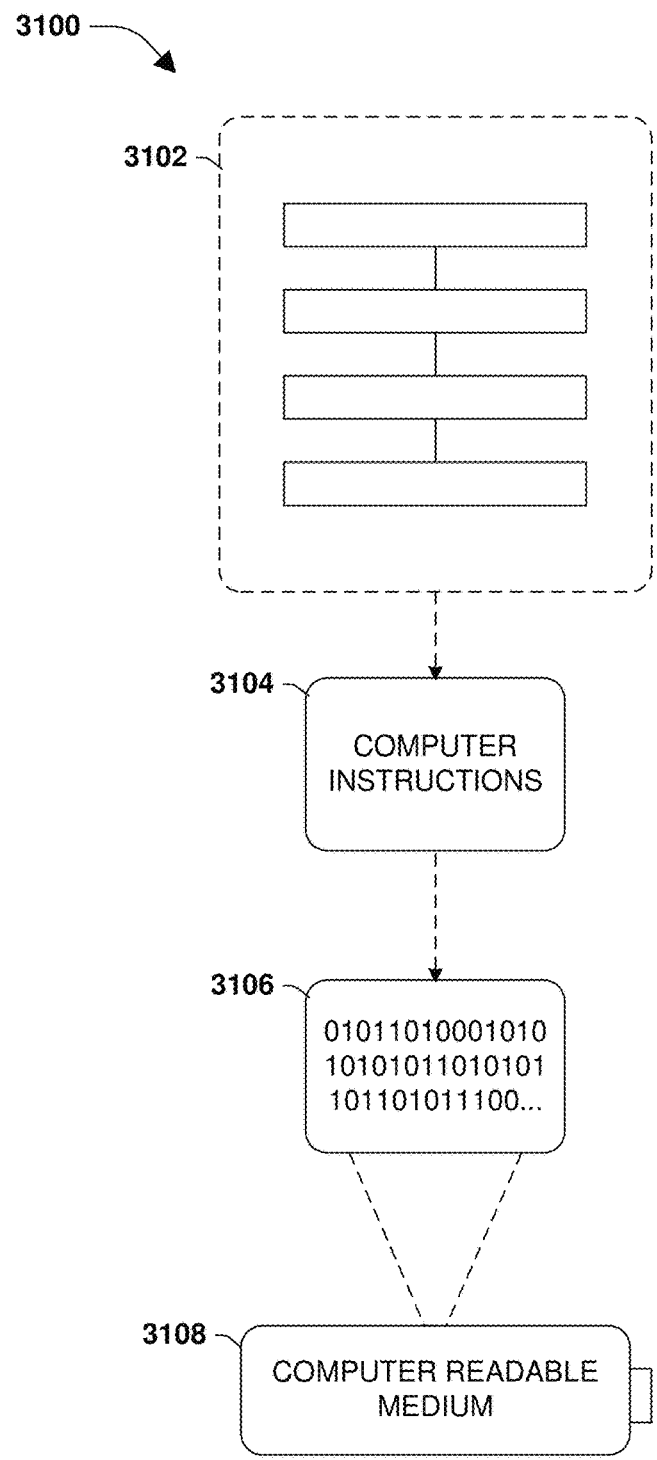
FIG. 31 is an illustration of an example computer-readable medium or computer-readable device including processor-executable instructions that embody one or more of the provisions set forth herein according to one or more embodiments of this disclosure.

Still another embodiment involves a computer-readable medium including processor-executable instructions that implement one or more embodiments of the techniques presented herein. An embodiment of a computer-readable medium or a computer-readable device that is devised in these ways is illustrated in FIG. 31, wherein an implementation 3100 includes a computer-readable medium 3108, such as a CD-R, DVD-R, flash drive, a platter of a hard disk drive, etc., on which is encoded computer-readable data 3106. This computer-readable data 3106, such as binary data including a plurality of zeroes or ones as shown in 3106, in turn includes a set of computer instructions 3104 that operate according to one or more of the principles set forth herein. In one such embodiment 3100, the processor-executable computer instructions 3104 may perform a method 3102, such as the method 2900 of FIG. 29 or the method 3000 of FIG. 30. In another embodiment, the processor-executable instructions 3104 may implement a system, such as the system 2200 of FIG. 22. Many such computer-readable media are devised by those of ordinary skill in the art that may operate in accordance with the techniques presented herein.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 32:
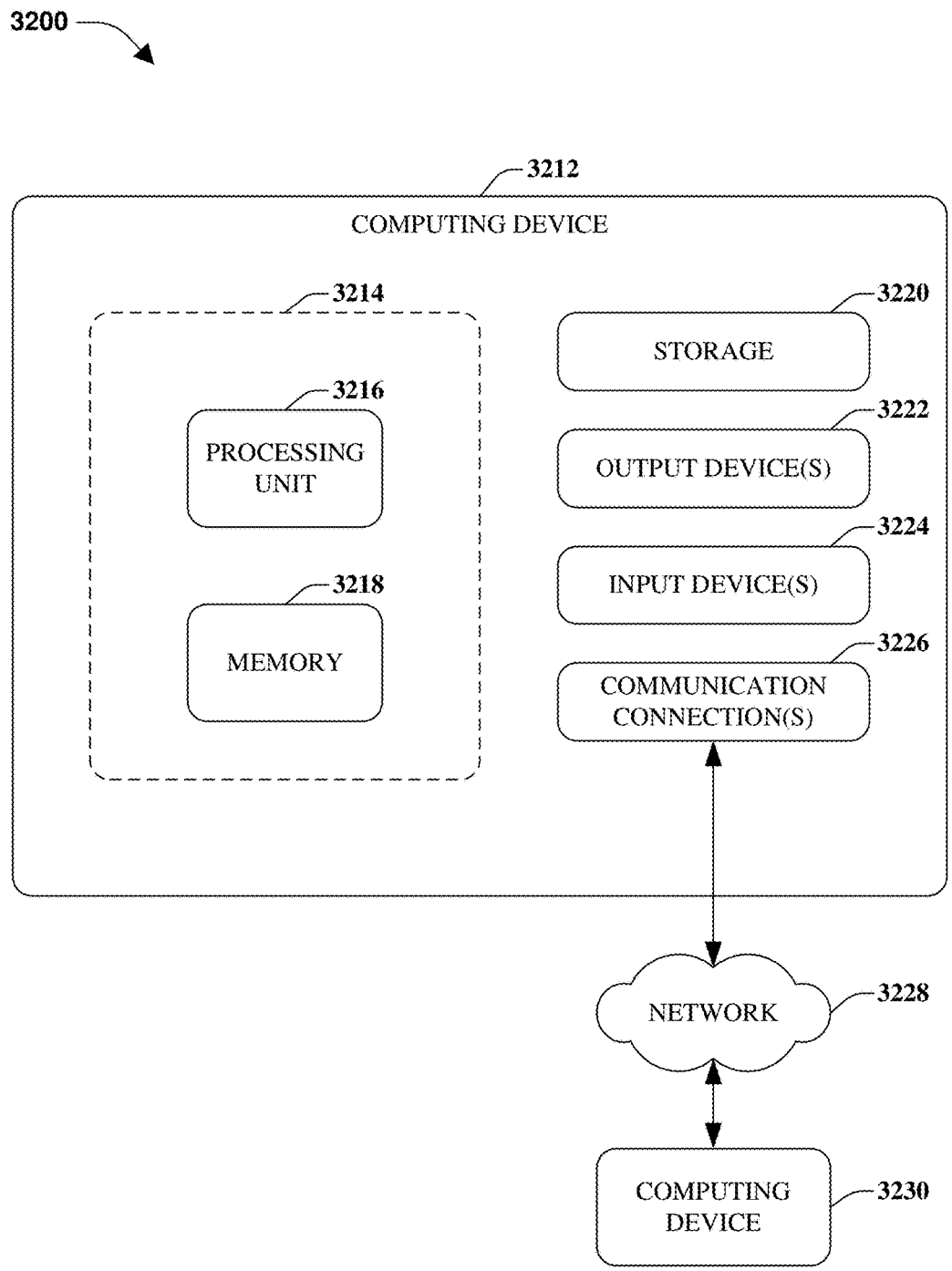
FIG. 32 is an illustration of an example computing environment where one or more of the provisions set forth herein are implemented according to one or more embodiments of this disclosure.

FIG. 32 and the following discussion provide a description of a suitable computing environment to implement embodiments of one or more of the provisions set forth herein. The operating environment of FIG. 32 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the disclosed systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 32 illustrates a system 3200 including a computing device 3212 that implements one or more embodiments provided herein. In one configuration, computing device 3212 includes one or more processing units 3216 and memory 3218. Depending on the exact configuration and type of computing device, memory 3218 may be volatile, such as RAM, non-volatile, such as ROM, flash memory, etc., or a combination of the two. This configuration is illustrated in FIG. 32 by dashed line 3214.

In other embodiments, device 3212 includes additional features or functionality. For example, device 3212 may include additional storage such as removable storage or non-removable storage, including, but not limited to, magnetic storage, optical storage, and the like. Such additional storage is illustrated in FIG. 32 by storage 3220. In one or more embodiments, computer readable instructions to implement one or more embodiments provided herein are in storage 3220. Storage 3220 may store other computer readable instructions to implement an operating system, an application program, and the like. Computer readable instructions are loaded in memory 3218 for execution by processing unit 3216, for example.

The term "computer readable media" as used herein includes computer storage media. Computer storage media includes volatile and nonvolatile, removable and non-removable media implemented in any method or technology for storage of information such as computer readable instructions or other data. Memory 3218 and storage 3220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 3212. Any such computer storage media is part of device 3212.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 3212 includes input device(s) 3224 such as keyboard, mouse, pen, voice input device, touch input device, infrared cameras, video input devices, or any other input device. Output device(s) 3222 such as one or more displays, speakers, printers, or any other output device may be included with device 3212. Input device(s) 3224 and output device(s) 3222 are connected to device 3212 via a wired connection, wireless connection, or any combination thereof. In one or more embodiments, an input device or an output device from another computing device are used as input device(s) 3224 or output device(s) 3222 for computing device 3212. Device 3212 may include communication connection(s) 3226 to facilitate communications with one or more other devices.

According to one or more aspects, a system for 3-dimensional (3-D) navigation is provided, including a navigation component that receives an origin location and a destination location. The navigation component may be associated with a vehicle and may generate a route from the origin location to the destination location. One or more portions of the route may include one or more navigation instructions associated with one or more road segments or one or more intersections of the road segments. The system may include a heads-up display (HUD) component that may project one or more graphic elements on one or more focal planes around an environment surrounding the vehicle. The HUD component may project one or more of the graphic elements in view of an occupant of the vehicle based on the route. The system may include a controller component that may adjust a distance between one or more of the focal planes of one or more of the graphic elements and the vehicle based on one or more road conditions associated with one or more portions of the route and a current position of the vehicle.

In one or more embodiments, the controller component may adjust a target position for one or more of the graphic elements based on one or more of the road conditions and the current position of the vehicle. The system may include a vehicle control component may receive one or more of the road conditions. Additionally, the system may include a sensor component may detect one or more of the road conditions. A road condition of the one or more road conditions may include traffic information of one or more of the road segments or speed limit information associated with one or more of the road segments. Additionally, road conditions may include an obstruction, an obstacle, a pedestrian, debris, or a pothole, for example.

The system may include a depth map component may build a depth map of the environment surrounding the vehicle. The HUD component may project one or more of the graphic elements based on the depth map of the environment. The depth map component may build the depth map based on depth information. In one or more embodiments, the system may include a sensor component may detect depth information from the environment surrounding the vehicle. The depth map component may receive the depth map based on a telematics channel. The system may include a depth buffering component may enable or disable rendering of one or more portions of one or more of the graphic elements based on the depth map.

The HUD component may project one or more graphic elements as a moving avatar or as a placeholder, such as a flag pole, marker, identifier, etc.

According to one or more aspects, a method for 3-dimensional (3-D) navigation is provided, including generating a route from an origin location to a destination location for a vehicle. One or more portions of the route may include one or more navigation instructions associated with one or more road segments or one or more intersections of the road segments. The method may include projecting one or more graphic elements on one or more focal planes around an environment surrounding the vehicle. One or more of the graphic elements may be projected in view of an occupant of the vehicle based on the route. The method may include adjusting a distance between one or more of the focal planes of one or more of the graphic elements and the vehicle based on one or more road conditions associated with one or more portions of the route and a current position of the vehicle. One or more portions of the method may be implemented via a processing unit.

The method may include adjusting a target position for one or more of the graphic elements based on one or more of the road conditions and the current position of the vehicle. The method may include receiving or detecting one or more of the road conditions. A road condition of the one or more road conditions may include traffic information of one or more of the road segments, speed limit information associated with one or more of the road segments, an obstruction, an obstacle, a pedestrian, debris, or a pothole.

The method may include building a depth map of the environment surrounding the vehicle, projecting one or more of the graphic elements based on the depth map of the environment, detecting depth information from the environment surrounding the vehicle, building the depth map based on the detected depth information, enabling or disabling rendering of one or more portions of one or more of the graphic elements based on the depth map, among other things.

According to one or more aspects, a computer-readable storage medium including computer-executable instructions, which when executed via a processing unit on a computer performs acts, including generating a route from an origin location to a destination location for a vehicle, wherein one or more portions of the route include one or more navigation instructions associated with one or more road segments or one or more intersections of the road segments, projecting one or more graphic elements on one or more focal planes around an environment surrounding the vehicle, wherein one or more of the graphic elements are projected in view of an occupant of the vehicle based on the route, or adjusting a distance between one or more of the focal planes of one or more of the graphic elements and the vehicle based on one or more road conditions associated with one or more portions of the route and a current position of the vehicle.

In one or more embodiments, projecting one or more of the graphic elements utilizes rastor based graphics. Additionally, one or more of the embodiments may include providing one or more of the navigation instructions via projecting one or more of the graphic elements as a moving avatar or animating the moving avatar by sequentially projecting the moving avatar on one or more different focal planes.

According to one or more aspects, a system for 3-dimensional (3-D) navigation is provided, including a sensor component, a heads-up display (HUD) component, and a controller component. The sensor component may track one or more objects in an environment surrounding a vehicle and one or more corresponding coordinates for respective objects relative to the vehicle. The HUD component may project, render, present, or display one or more graphic elements on one or more focal planes corresponding to one or more of the objects, wherein one or more of the graphic elements are projected in view of an occupant of the vehicle. The controller component may calculate one or more updated focal planes for one or more of the graphic elements based on one or more of the coordinates for respective objects.

In one or more embodiments, the HUD component may project one or more of the graphic elements on one or more of the updated focal planes for one or more of the objects. Additionally, the HUD component may cease projecting one or more of the graphic elements on one or more of the focal planes upon projecting on one or more of the updated focal planes. One or more of the graphic elements may include a pointer having information associated with one or more of the objects on which one or more of the graphic elements is projected. One or more of the objects may be an obstruction, an obstacle, a pedestrian, a construction zone, a landmark, a building, a business, or a parking spot.

The system may include a vehicle control component determining a size, a shape, a model, a color, or one or more attributes for one or more of the graphic elements. The vehicle control component may manage overlap between two or more of the graphic elements. The system may include a navigation component generating a route from an origin location to a destination location and a vehicle control component receiving information associated with one or more of the objects along the route, wherein one or more of the objects are businesses. The HUD component may project one or more of the graphic elements as a logo associated of one or more of the businesses. In one or more embodiments, the sensor component may include a navigation component or utilize telematics.

According to one or more aspects, a system for 3-dimensional (3-D) navigation is provided, including a navigation component, a controller component, and a heads-up display (HUD) component. The navigation component may receive metadata associated with one or more objects in an environment surrounding a vehicle, a layout for respective objects within the environment, and a current location of the vehicle relative to the layout. The controller component may calculate one or more focal planes for one or more graphic elements based on the layout of one or more of the objects and the current location of the vehicle. The HUD component may project, render, present, or display one or more of the graphic elements on one or more of the focal planes corresponding to one or more of the objects, wherein one or more of the graphic elements are projected in view of an occupant of the vehicle.

One or more of the graphic elements may include a pointer presenting at least a portion of the metadata associated with one or more of the objects on which one or more of the graphic elements is projected. The metadata may include a telephone number, an address, a rating, a name of a business, hours of operation, or a status associated with an object. The HUD component may project one or more of the graphic elements based on the layout of one or more of the objects and the current location of the vehicle. Additionally, the HUD component may shift from projecting a layout view or a birds-eye-view to projecting a first-person view or a third-person view.

The system may include a sensor component receiving a query from the occupant of the vehicle associated with one or more of the objects, wherein the HUD component projects one or more portions of corresponding metadata for one or more of the objects associated with the query in response to the query. The navigation component may generate a route from an origin location to a destination location, wherein the HUD component renders one or more of the graphic elements as an avatar which leads the occupant along the route. The controller component may calculate a pitch angle, roll angle, yaw angle, or velocity for the avatar (or other graphic elements). The HUD component may present, display, or render one or more of the graphic elements as a road name based on the metadata and the current location of the vehicle.

According to one or more aspects, a method for 3-dimensional (3-D) navigation is provided, including tracking one or more objects in an environment surrounding a vehicle and determining one or more corresponding coordinates for respective objects relative to the vehicle, calculating one or more focal planes for one or more graphic elements based on one or more of the coordinates for respective objects, and rendering one or more of the graphic elements on one or more of the focal planes corresponding to one or more of the objects, wherein one or more of the graphic elements are projected in view of an occupant of the vehicle. The tracking, the calculating, or the rendering may be implemented via a processing unit.

Although the subject matter has been described in language specific to structural features or methodological acts, it is to be understood that the subject matter of the appended claims is not necessarily limited to the specific features or acts described herein. Rather, the specific features and acts described herein are disclosed as example embodiments.

Various operations of embodiments are provided herein. The order in which the various operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for multi-level navigation monitoring and control, comprising:
a memory; and
a processor that executes the following computer executable components stored in the memory:
a navigation manager generating a route between a first location and a second location;
a map displayer outputting a map that includes the route and is indicative of distances of one or more surfaces, objects, obstructions, or geometries in an area around a vehicle,
wherein the map displayer outputs the route to indicate a path travelled and a future path expected to be travelled, each graphically distinguishable from one another, wherein the map displayer outputs the map on a windshield of the vehicle, wherein the map is transparent and does not obstruct a view of real world objects in a vehicle environment;
a modification controller altering at least a portion of the route based on an indication of a change received at a user interface or a sensor;
a lane marking manager determining one or more lane boundaries and a center steering trajectory of a lane of traffic; and
a confidence level determiner assigning respective confidence levels to the lane boundaries and the center steering trajectory based on a prior system knowledge of conditions of a road being traversed, respective confidence levels indicative of confidence that the lane boundaries are correct,
wherein the navigation manager regenerates the route between the first location and the second location as a function of the indication of the change and the map displayer outputs a revised map based on the regenerated route.

2. The system of claim 1, wherein the indication of the change is based on a gesture detected by the user interface or the sensor.

3. The system of claim 1, wherein the indication of the change is based on a verbal command detected by the user interface or the sensor.

4. The system of claim 1, wherein the confidence level determiner is configured to output outputting a notification based on a determination that at least one confidence level of the respective confidence levels is below a threshold level.

5. The system of claim 4, wherein the notification is a multimodal alarm.

6. The system of claim 4, wherein the notification is represented as a visual indicator that is rendered to appear as overlaying real world portions of the lane of traffic.

7. The system of claim 1, wherein the indication of the change is received from a passenger in the vehicle.

8. A method for multi-level navigation monitoring and control, comprising:
generating a route between a first location and a second location based on a determination of a current location of a vehicle and a received destination location;
outputting a map on a windshield of the vehicle, the map comprises segments of the route and are transparent, wherein a view of real world objects through the windshield are not obstructed by the segments, wherein the outputting the route includes indicating a path travelled and a future path expected to be travelled, each graphically distinguishable from one another;
altering at least one segment of the route based on an indication of a change to the at least one segment, the altering comprising overriding an autonomous steering instruction of the vehicle;
determining one or more lane boundaries and a center steering trajectory of a lane of traffic;
overlaying the lane boundaries and the center steering trajectory on a real world view of the lane of traffic;
assigning respective confidence levels to the lane boundaries and the center steering trajectory based on a prior system knowledge of conditions of a road being traversed, respective confidence levels indicative of confidence that the lane boundaries are correct; and
altering an output of the overlaid lane boundaries and the center steering trajectory based on the assigned confidence levels.

9. The method of claim 8, wherein the altering at least one segment of the route comprises:
detecting a gesture performed by a vehicle occupant; and
interpreting the gesture as a command to change a driving instruction related to the at least one segment.

10. The method of claim 8, further comprising:
determining at least one confidence level of the respective confidence levels is below a threshold amount; and
outputting a multimodal alarm based on the determining.

11. A system for navigation monitoring and control of a vehicle, comprising:
a memory; and
a processor that executes the following computer executable components stored in the memory:
a lane marking manager determining a first boundary line, a second boundary line, and a centerline of a current lane of travel;
a confidence level determiner assigning a first confidence level to the first boundary line, a second confidence level to the second boundary line, and a third confidence level to the centerline based on a prior system knowledge of conditions of a road being traversed, respective confidence levels indicative of confidence that the lane boundaries are correct; and
a user interface outputting representations of the first boundary line, the second boundary line, and the centerline based on the first confidence level, the second confidence level, and the third confidence level.

12. The system of claim 11, wherein the user interface is configured to output outputting the representations in a first format based on the respective confidence levels conforming to a predetermined threshold value, and outputting output the representations in a second format based on the respective confidence levels being below the predetermined threshold value.

13. The system of claim 11, wherein the user interface outputting is configured to output an audible alarm based on a determination that at least one of the first confidence level, the second confidence level, and the third confidence level are below a threshold amount.

14. The system of claim 11, further comprising at least one sensor receiving a modification to at least one of the first boundary line, the second boundary line, or the centerline, the confidence level determiner assigning another confidence level based on the modification, and the user interface changing the respective representation based on the modification and the other confidence level.

15. The system of claim 11, wherein the user interface is configured to output outputting the representations on a windshield, wherein the representations are rendered to overlay associated real world portions of the current lane of travel.

* * * * *

UNITED STATES PATENT AND TRADEMARK OFFICE
CERTIFICATE OF CORRECTION

PATENT NO. : 10,215,583 B2
APPLICATION NO. : 14/856596
DATED : February 26, 2019
INVENTOR(S) : Victor Ng-Thow-Hing et al.

Page 1 of 1

It is certified that error appears in the above-identified patent and that said Letters Patent is hereby corrected as shown below:

In the Claims

Column 56, Claim 4, Line 64, remove the word "outputting" after the phrase "to output".
Column 57, Claim 8, Line 17, remove the first occurrence of the word "the" before the phrase "outputting the".
Column 58, Claim 12, Line 21, remove the word "outputting" after the phrase "to output".
Column 58, Claim 12, Line 23, remove the word "output" after the phrase "and outputting".
Column 58, Claim 15, Line 40, remove the word "outputting" after the phrase "to output".

Signed and Sealed this
Twenty-third Day of April, 2019

Andrei Iancu
*Director of the United States Patent and Trademark Office*